United States Patent

Washisu et al.

[11] Patent Number: 6,047,133
[45] Date of Patent: *Apr. 4, 2000

[54] IMAGE BLUR PREVENTION APPARATUS

[75] Inventors: Koichi Washisu, Tokyo; Tadasu Ohtani, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/642,074

[22] Filed: May 1, 1996

Related U.S. Application Data

[63] Continuation of application No. 08/218,414, Mar. 25, 1994, abandoned.

[30] Foreign Application Priority Data

Mar. 26, 1993 [JP] Japan ................................. 5-090516
Sep. 28, 1993 [JP] Japan ................................. 5-263046
Jan. 28, 1994 [JP] Japan ................................. 6-024942

[51] Int. Cl.$^7$ .................................................. G03B 17/00
[52] U.S. Cl. .............................................................. 396/55
[58] Field of Search ........................... 354/70, 400, 410, 354/430, 195.1; 348/208; 359/554, 557; 256/231.1, 230, 239; 73/653, 655; 396/55, 53

[56] References Cited

U.S. PATENT DOCUMENTS

| | | | |
|---|---|---|---|
| 4,869,108 | 9/1989 | Washisu | 73/517 B |
| 4,965,619 | 10/1990 | Shikaumi et al. | 354/410 |
| 5,020,369 | 6/1991 | Washisu et al. | 73/517 A |
| 5,153,633 | 10/1992 | Otani | 354/430 |

*Primary Examiner*—Howard B. Blankenship
*Attorney, Agent, or Firm*—Fitzpatrick, Cella, Harper & Scinto

[57] ABSTRACT

A movable optical unit includes a light beam deflector for preventing an image blur or the like. A position detector detects a position of the movable optical unit. The position detector incudes an arrangement for substantially pre-matching a center position of a displacement of the optical unit with a mechanical initial position of the optical unit. The mechanical initial position is, for example, a balanced position with gravity or a lock position. Thus, the center position of displacement can be pre-matched with the mechanical initial position. In addition, characteristics of the matching operation may be varied corresponding to an output of the position detector. Thus, the matching operation can be quickly performed.

30 Claims, 49 Drawing Sheets

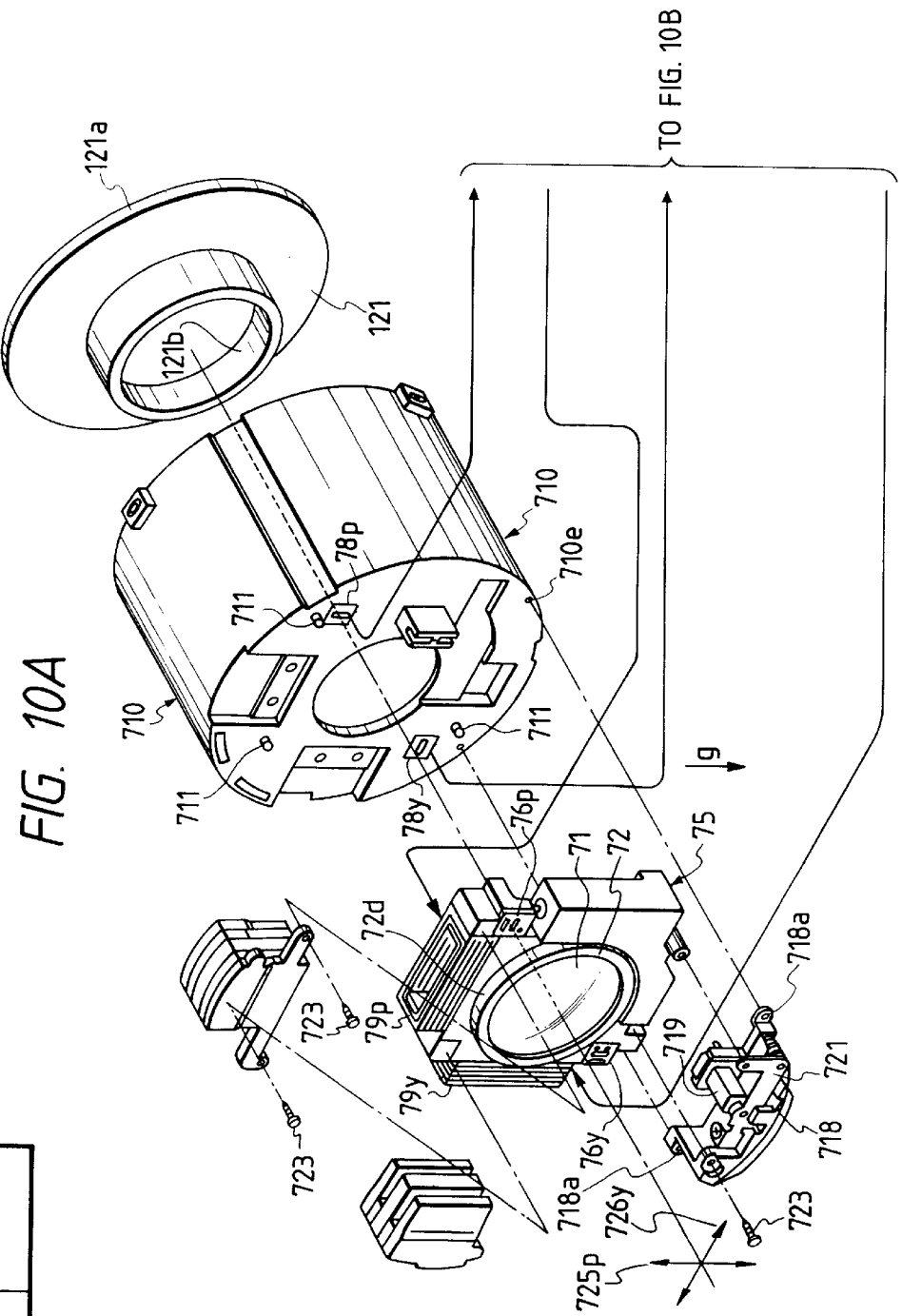

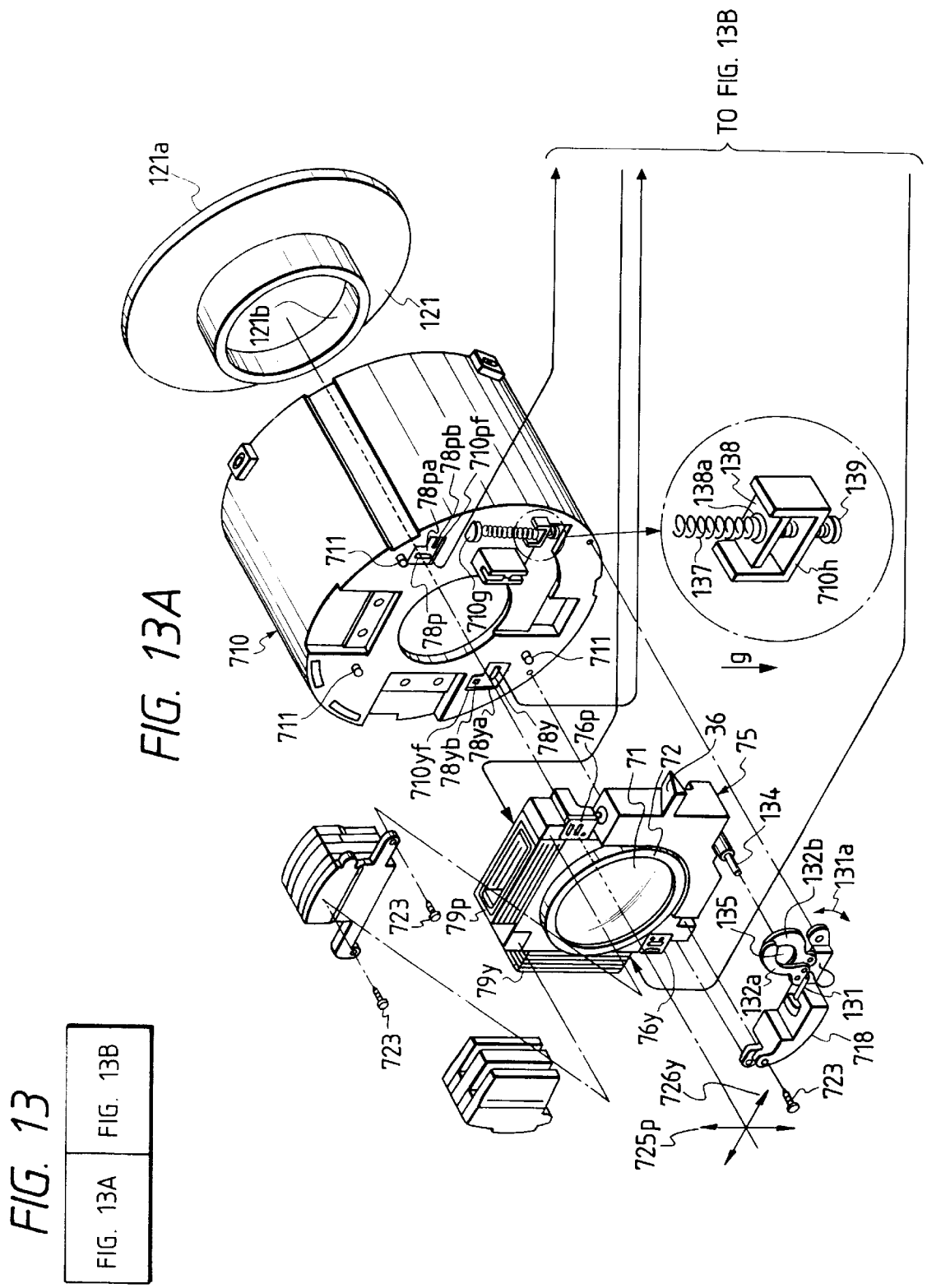

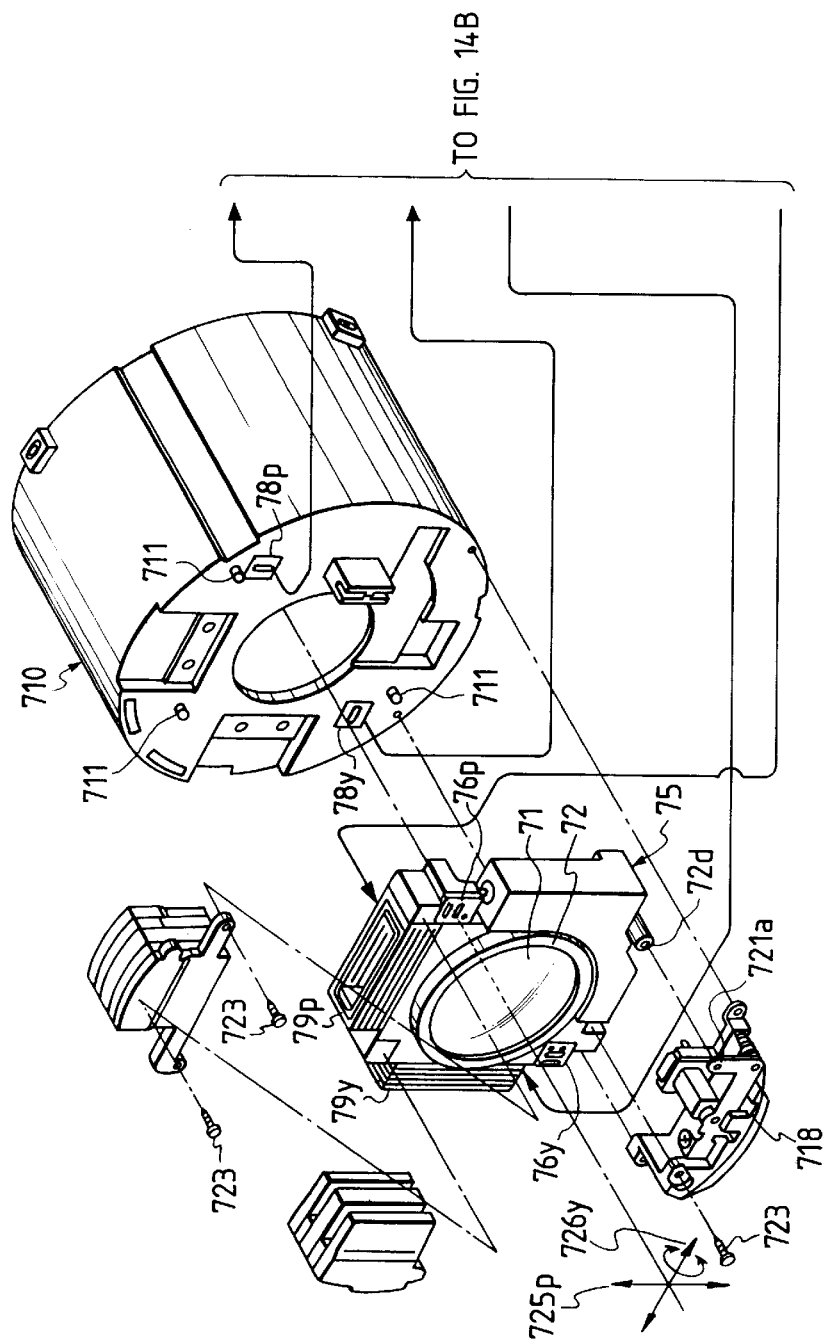

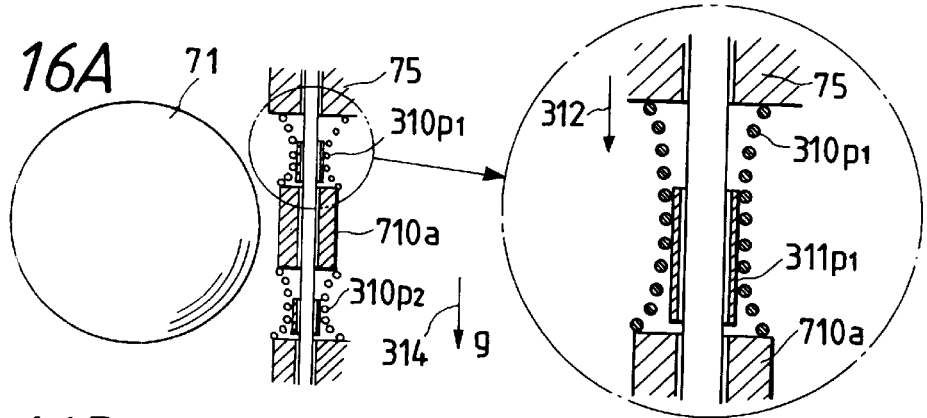
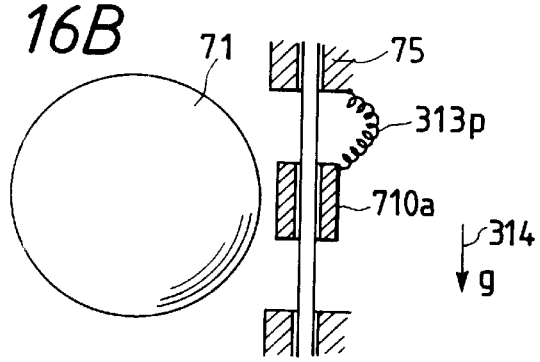
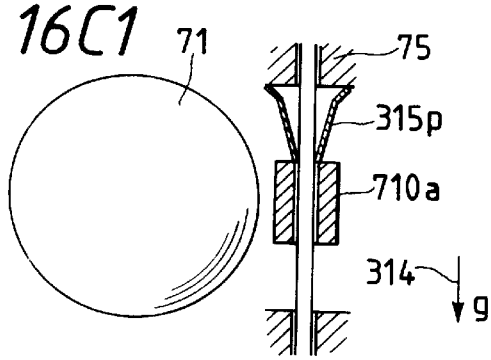
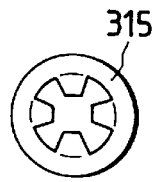
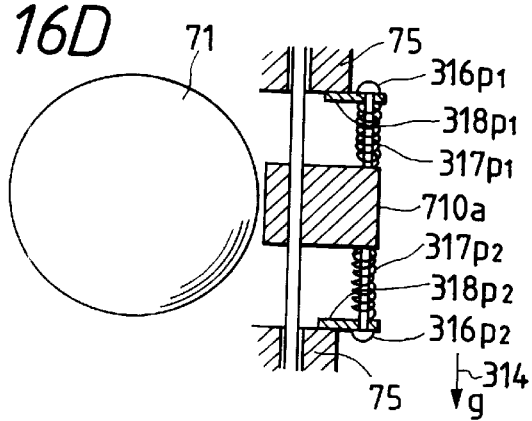

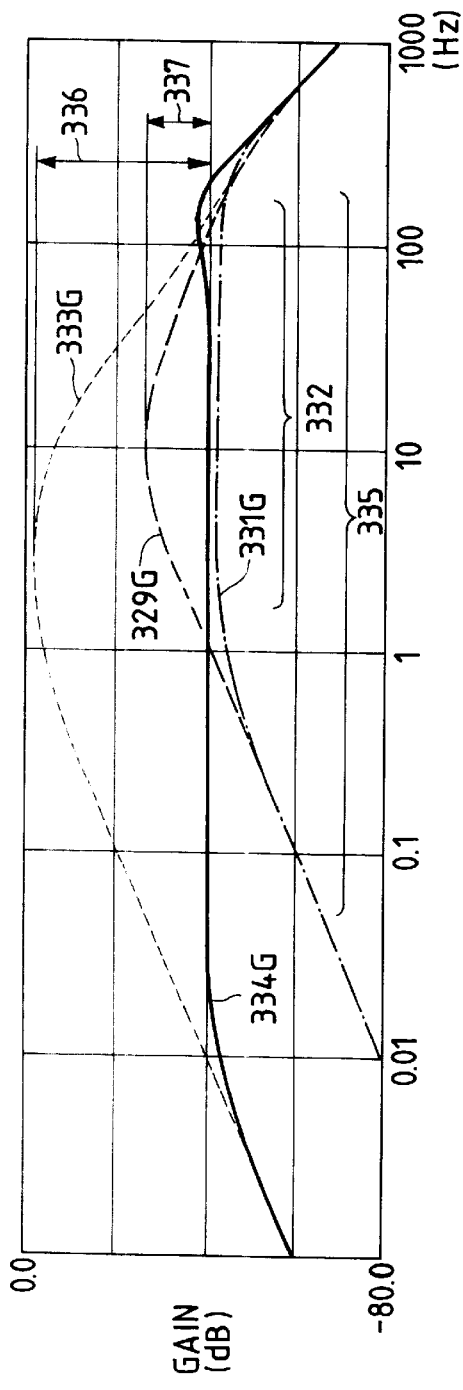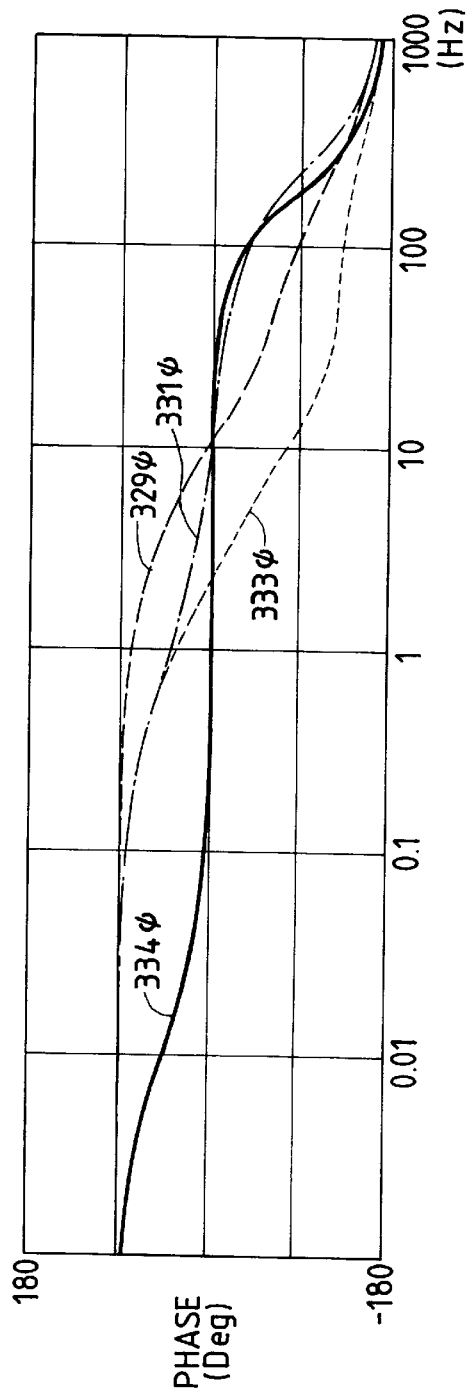

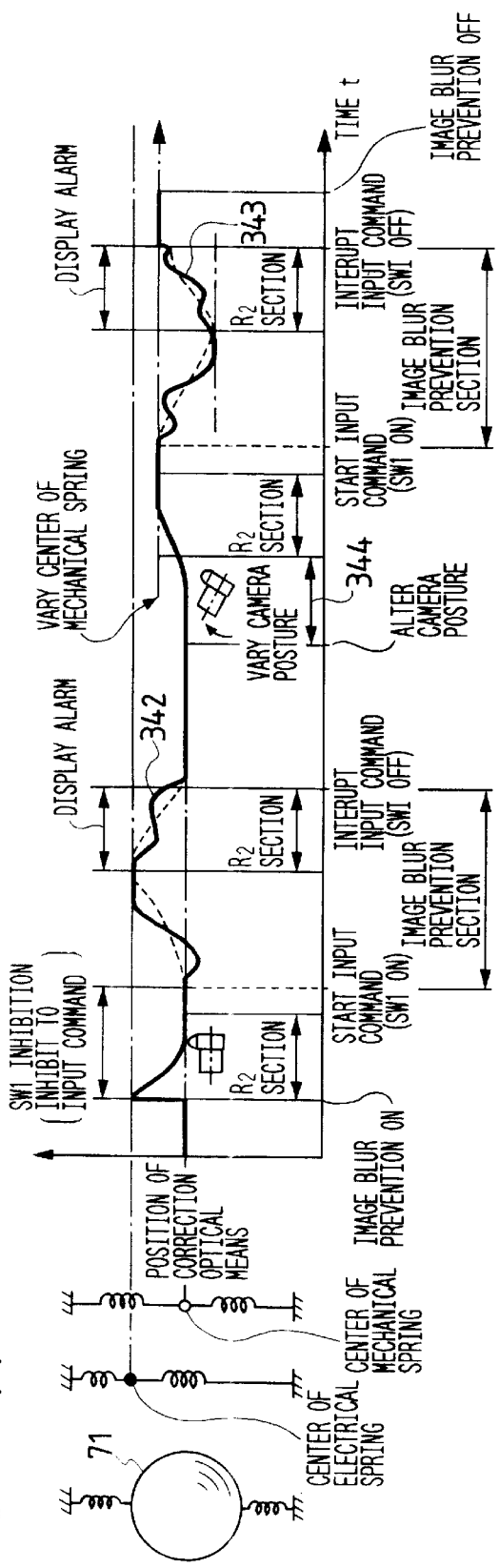
FIG. 21A
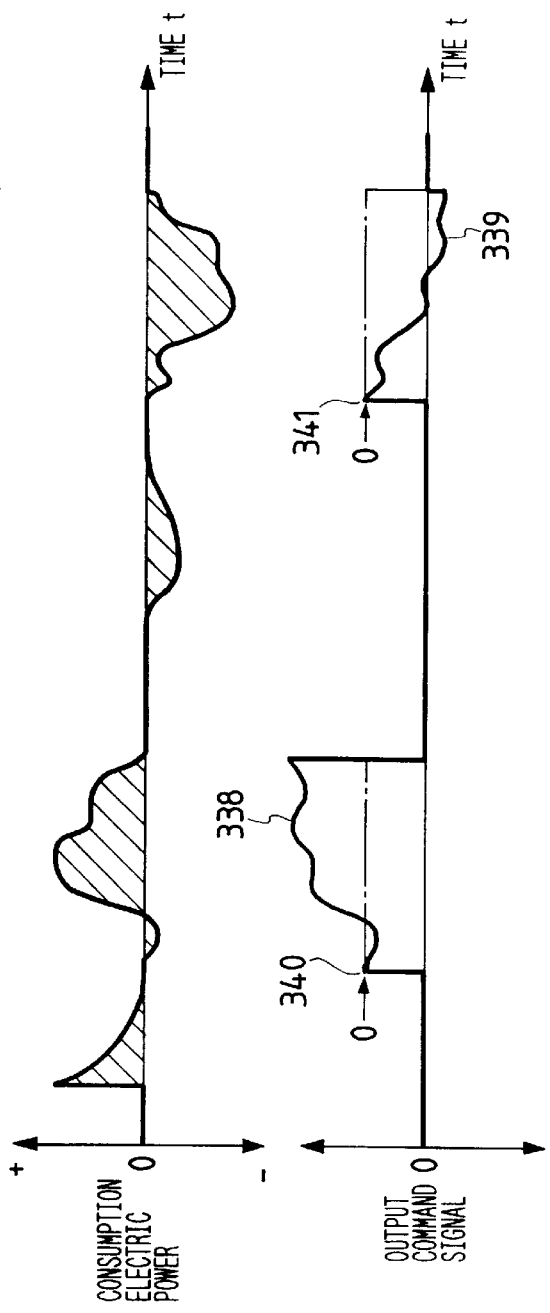
FIG. 21B
FIG. 21C

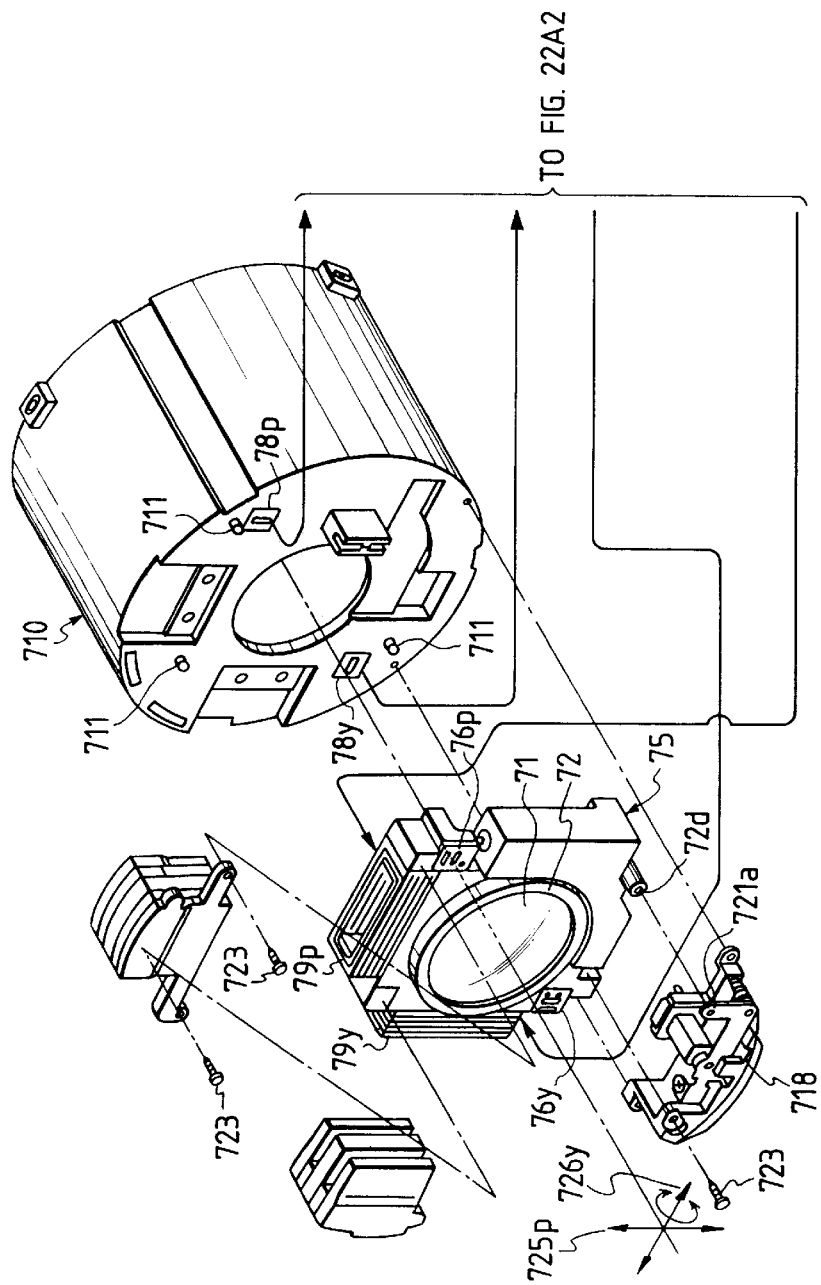
FIG. 22A1

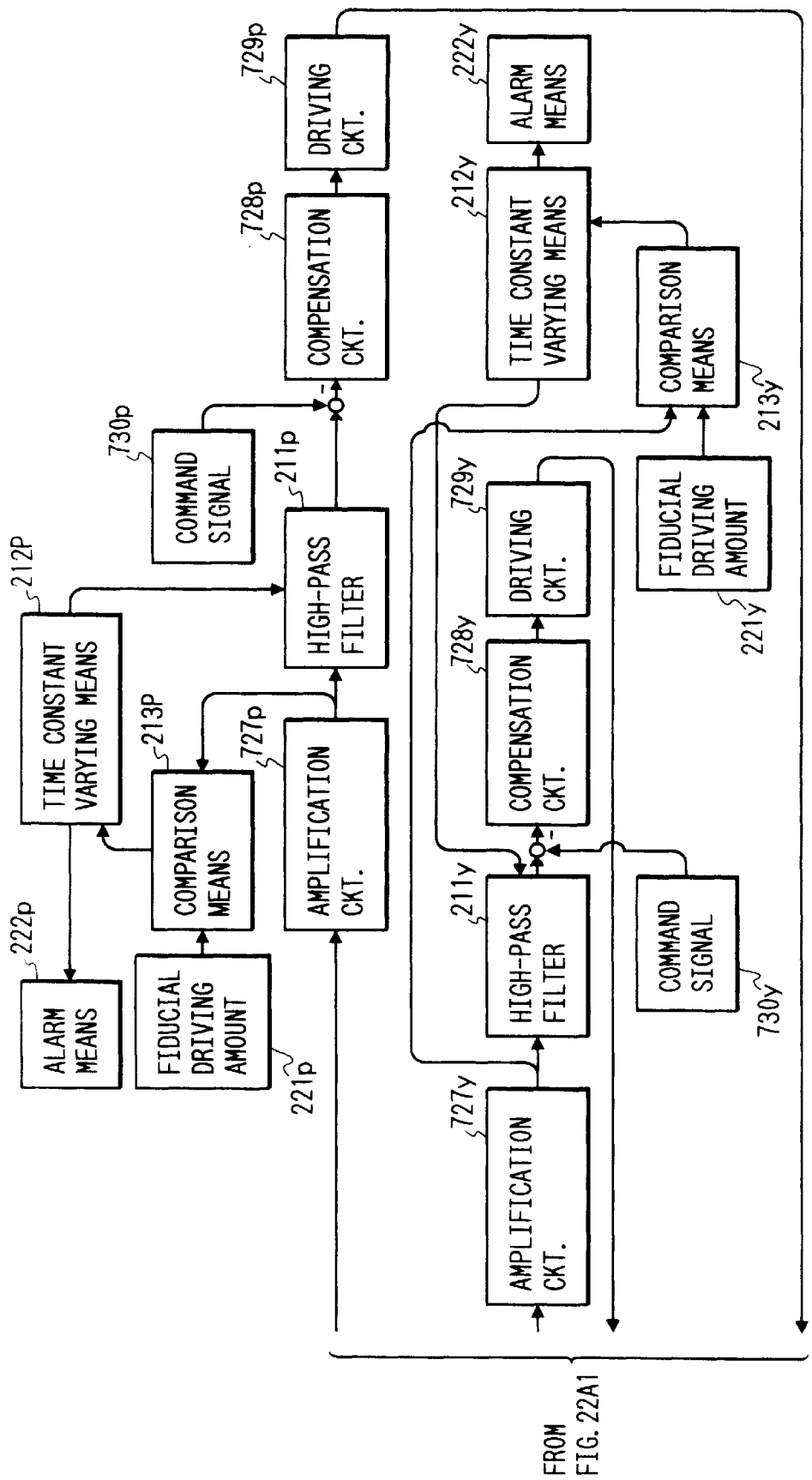
FIG. 22A2

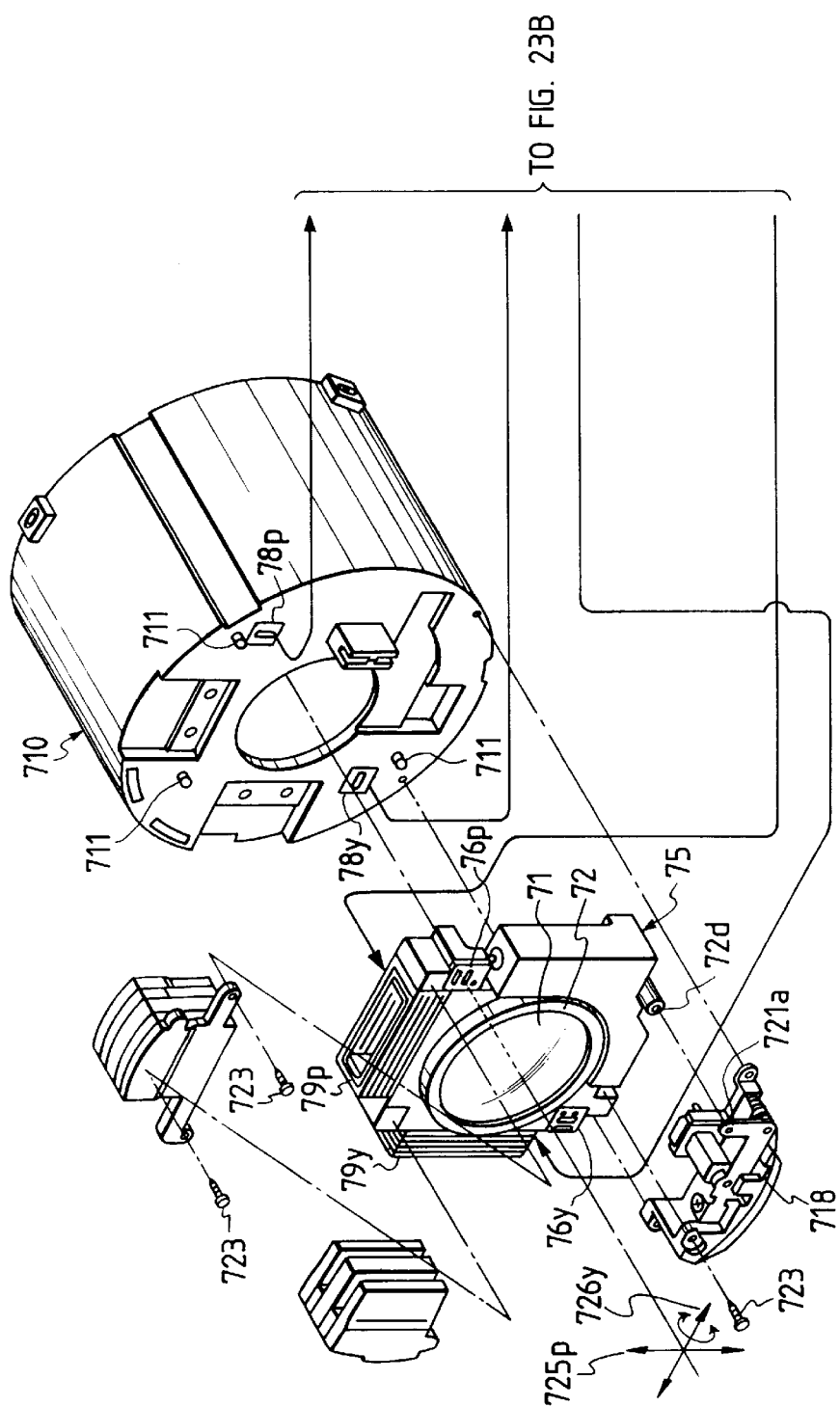

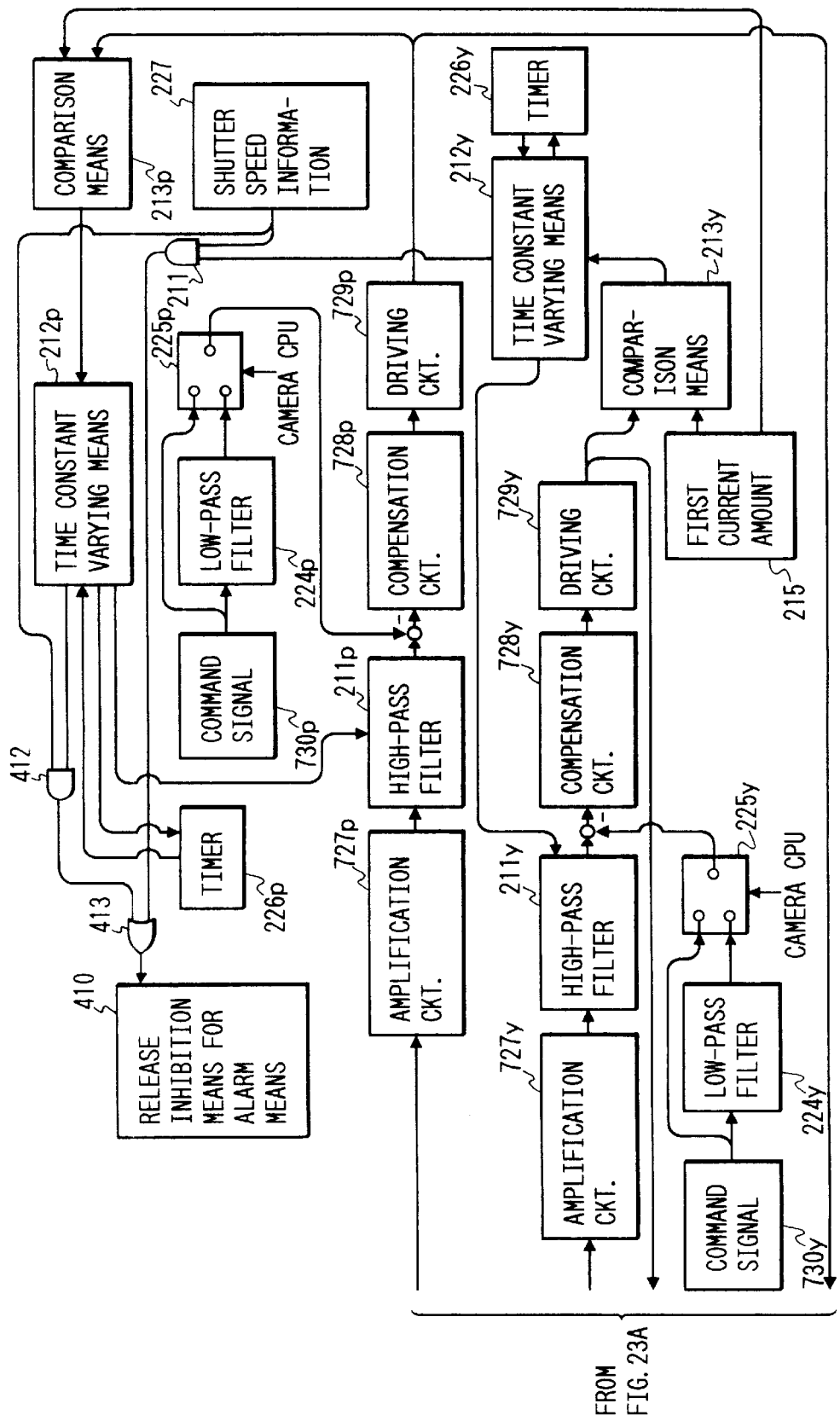

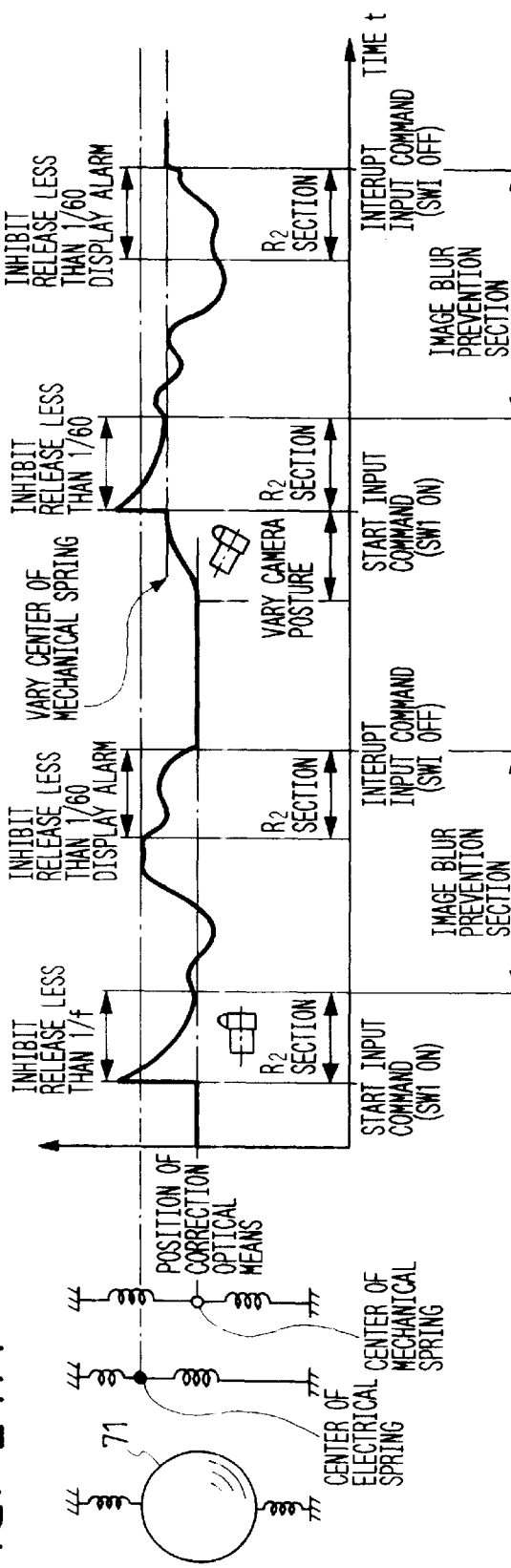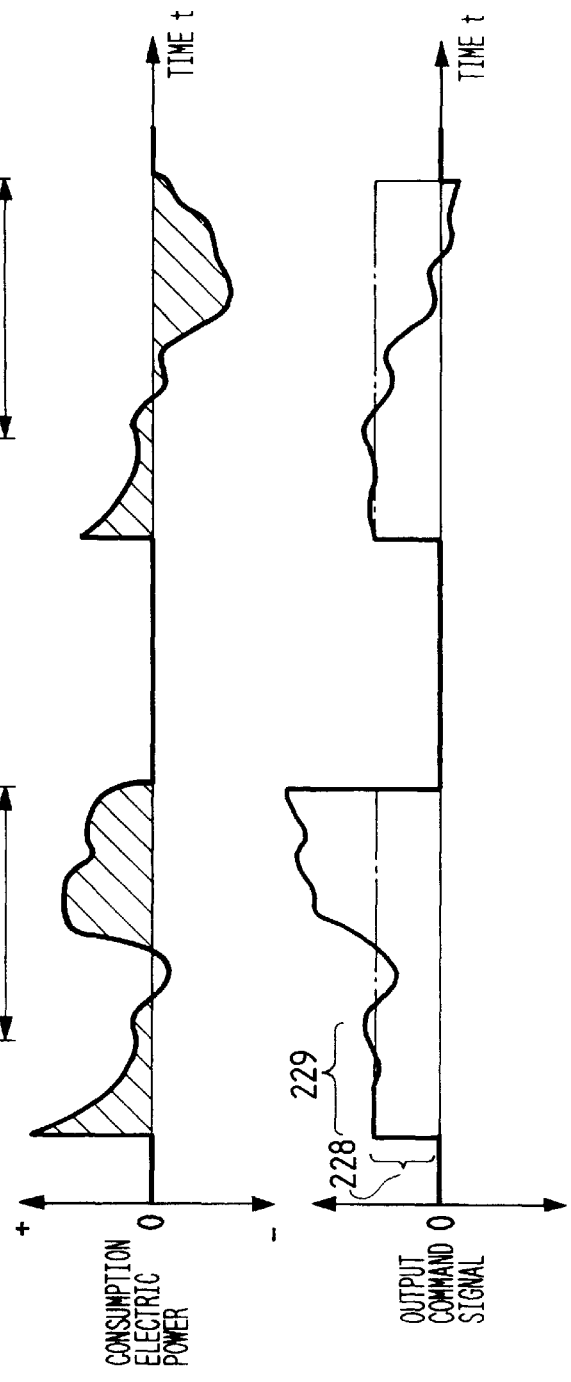
FIG. 24A
FIG. 24B
FIG. 24C

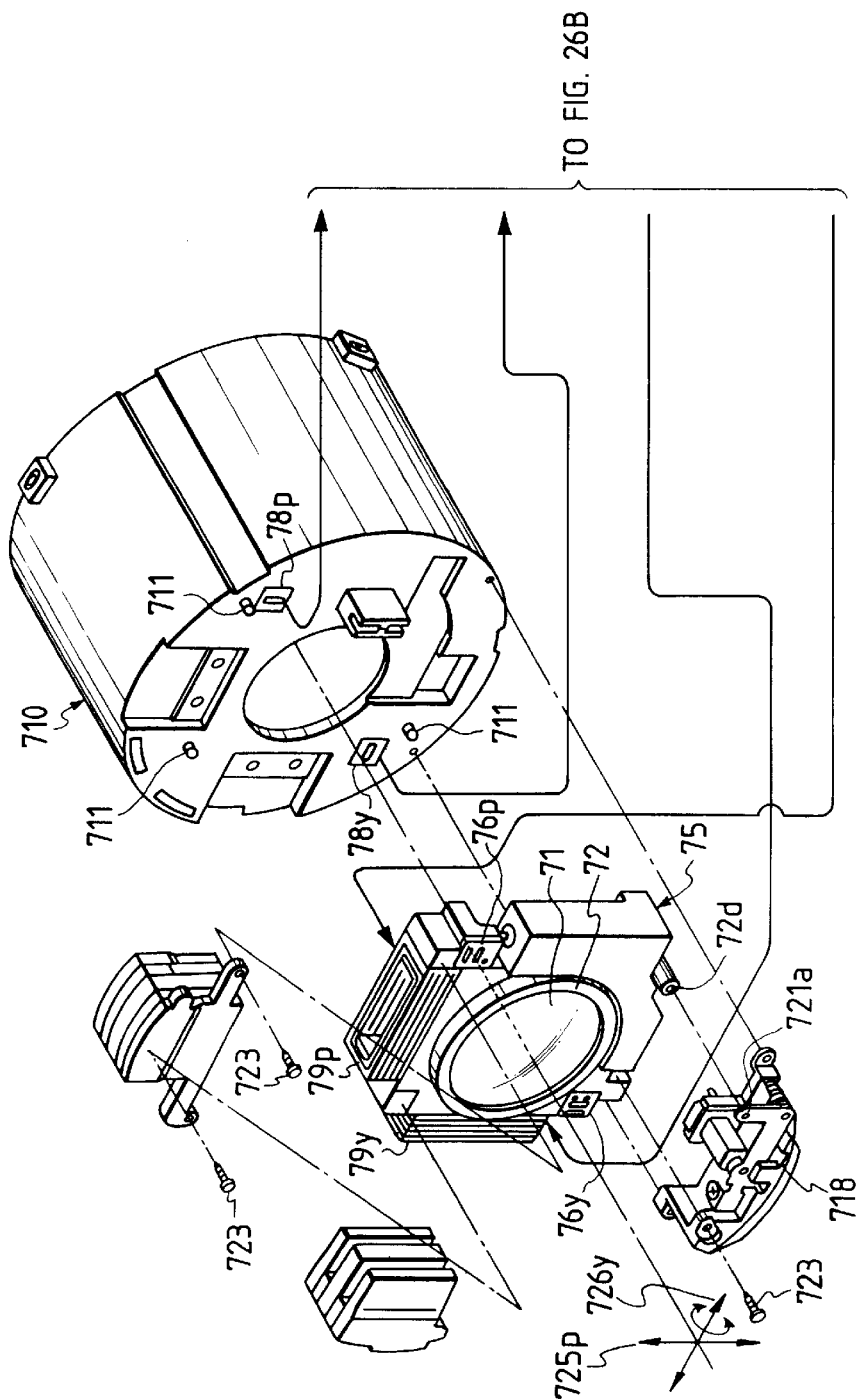

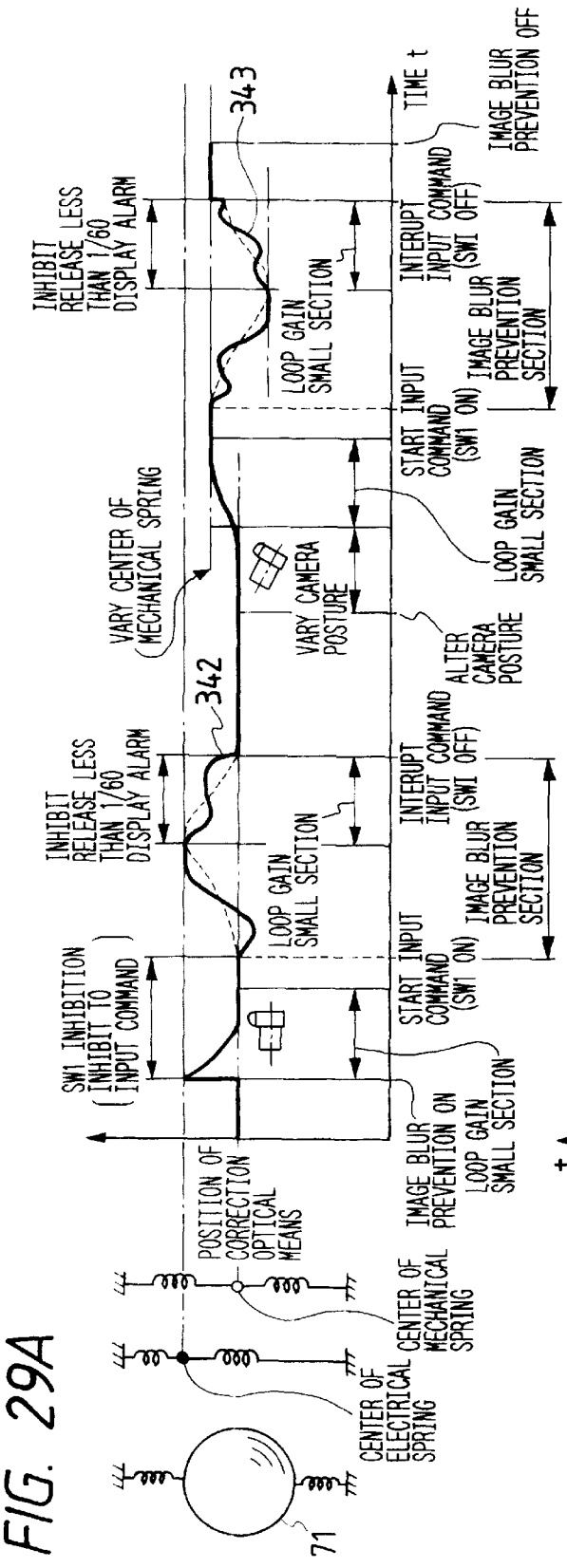
FIG. 29A
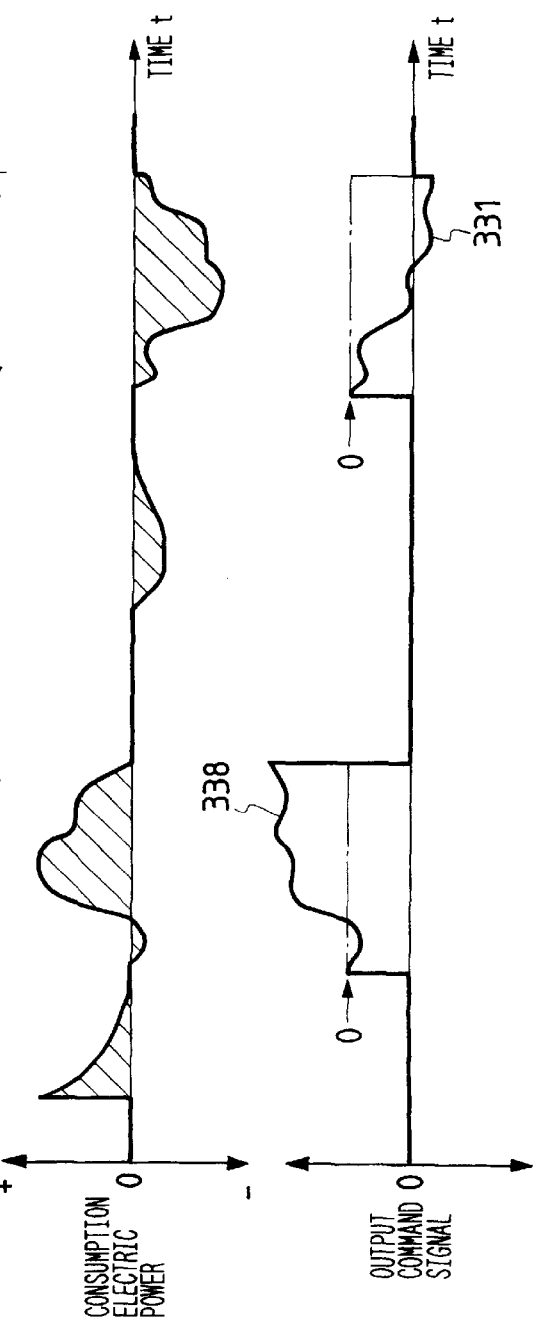
FIG. 29B
FIG. 29C

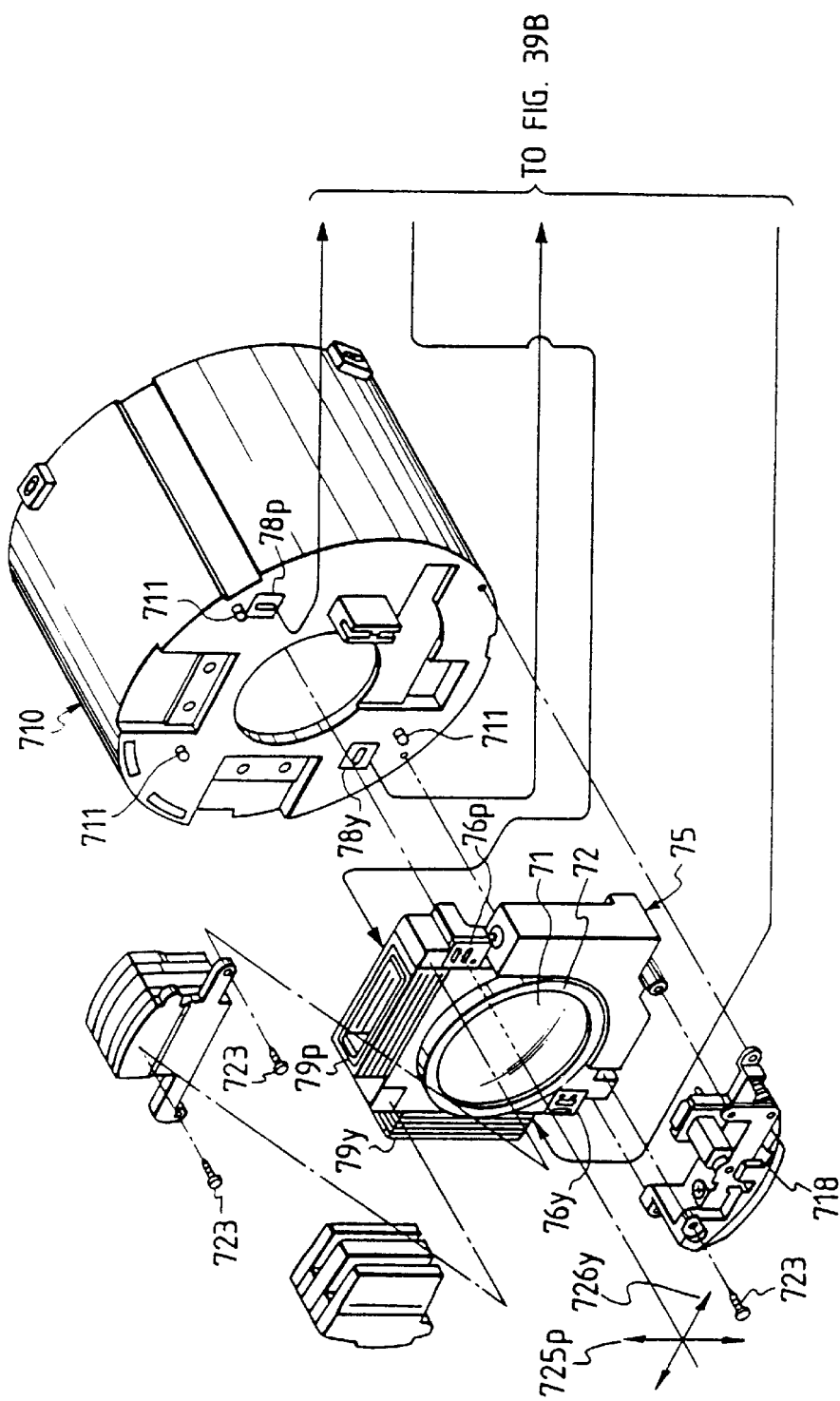

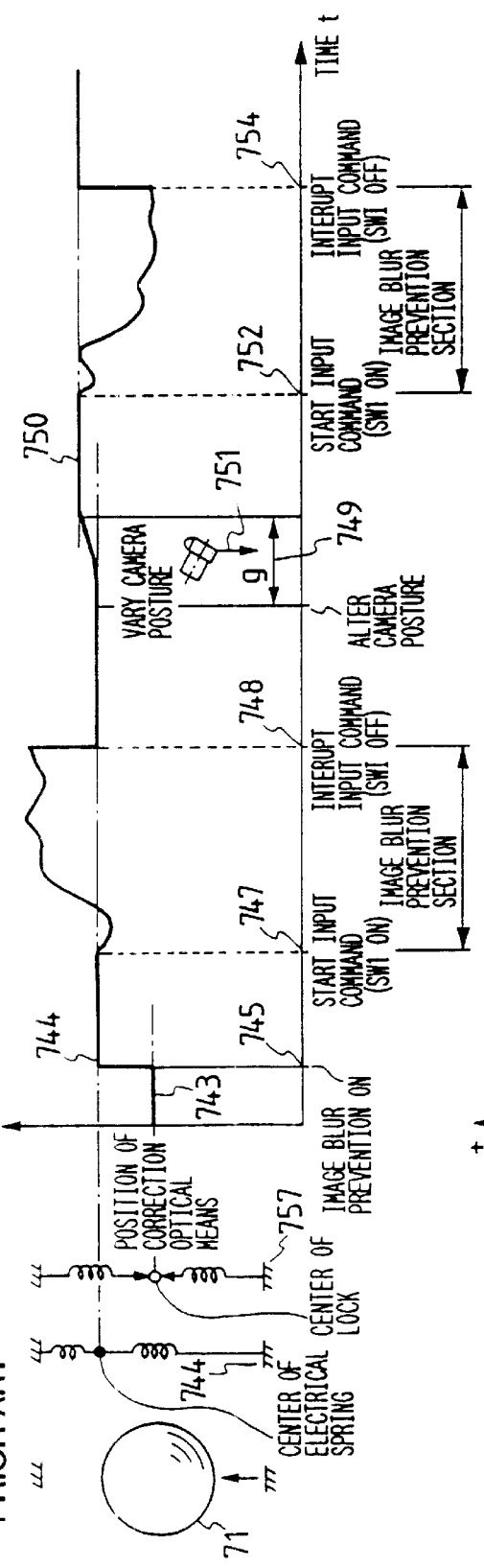
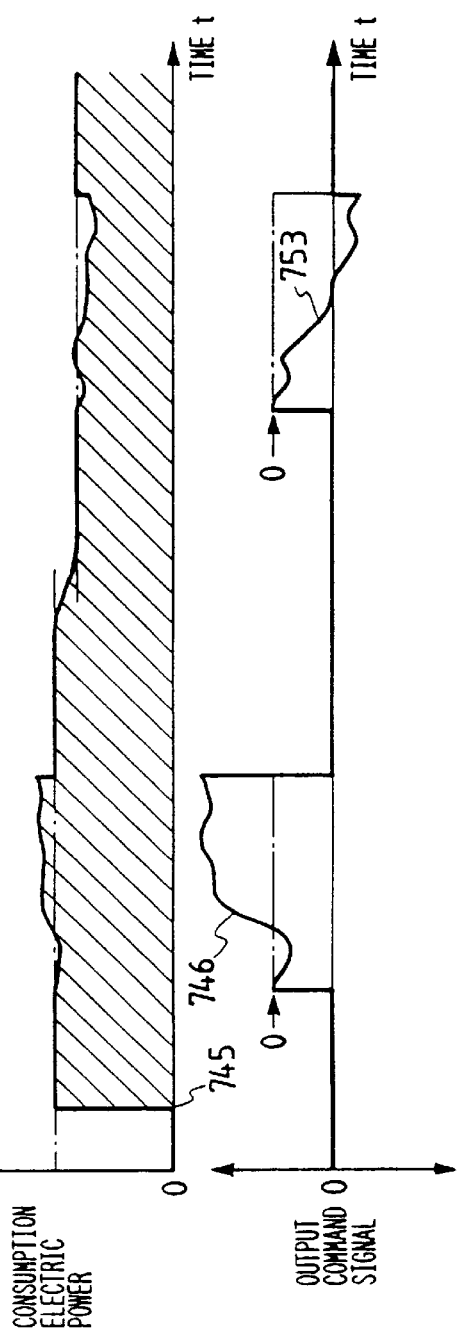
FIG. 45A PRIOR ART
FIG. 45B PRIOR ART
FIG. 45C PRIOR ART

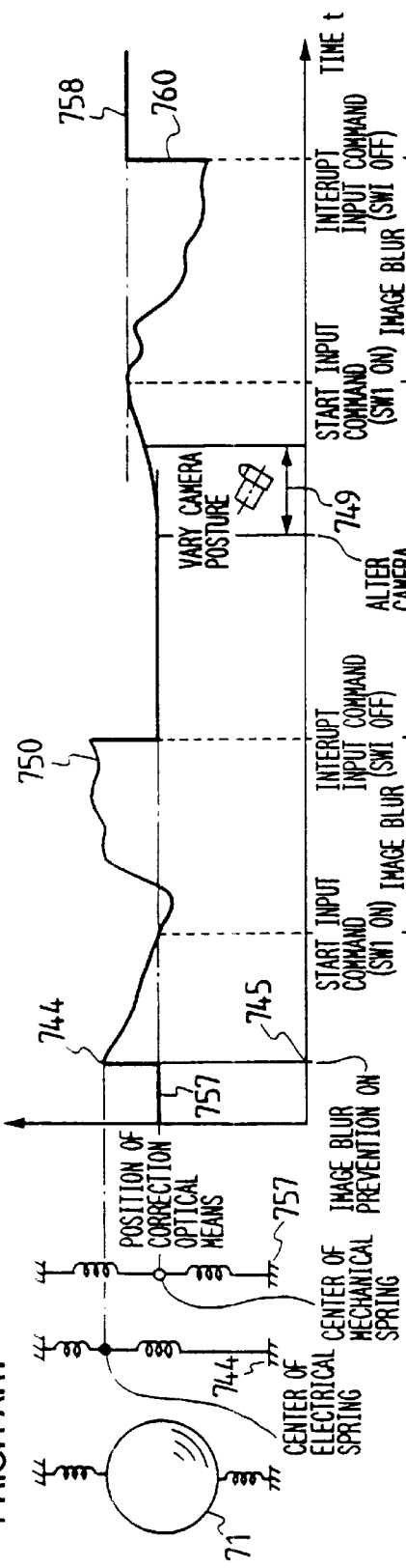
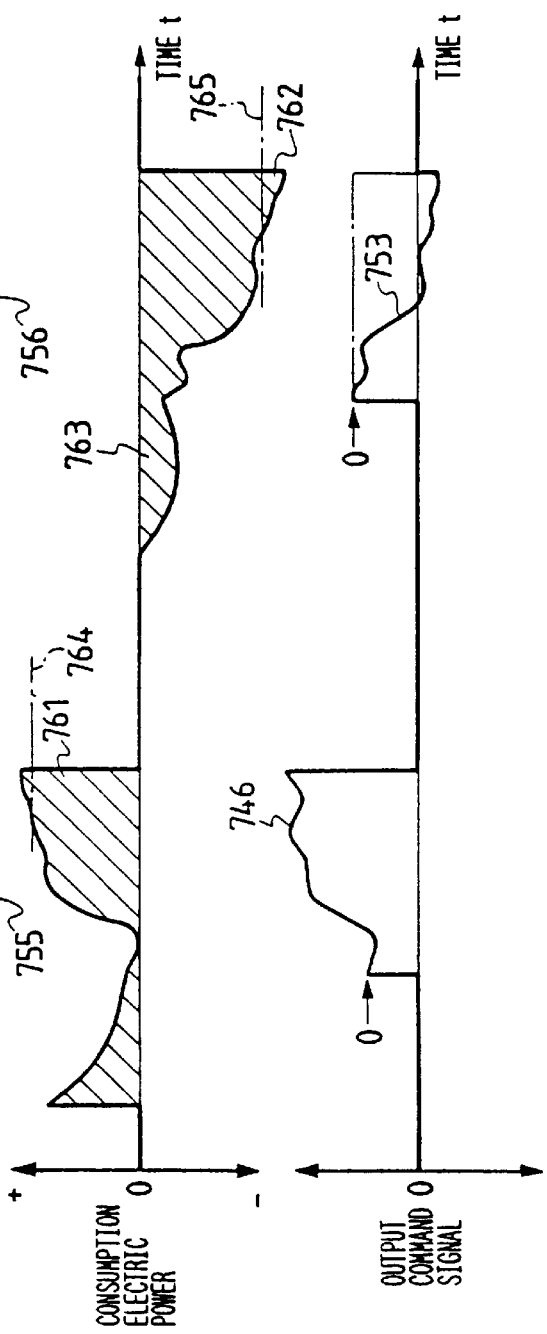
FIG. 46A PRIOR ART
FIG. 46B PRIOR ART
FIG. 46C PRIOR ART

IMAGE BLUR PREVENTION APPARATUS

This application is a continuation of application Ser. No. 08/218,414 filed Mar. 25, 1994, now abandoned.

BACKGROUND OF THE INVENTION

1. Field of the Invention

The present invention relates to an optical apparatus having a movable optical unit for use as an optical means that optically compensates an image blur.

2. Related Background Art

An optical apparatus with an optical unit that is movable in a light beam deflecting direction has been applied to an apparatus that optically prevents an image blur.

Next, an image blur prevention apparatus will be described.

In modern cameras, all important operations such as an exposing operation and focusing operation are automatically performed. Thus, even if the user of such a camera is not familiar with its operations, chances of mistakes of photographing are very low. However, so far automatic prevention of mistakes of photographing due to vibration has been difficult.

In recent years, cameras that can prevent mistakes of photographing due to vibration have been intensively studied. In particular, cameras that can prevent mistakes of photographing due to vibration caused by the user have been developed and studied.

The frequencies of vibration of cameras are normally in the range from 1 Hz to 12 Hz. When the shutter of the camera is released, vibration takes place. To correctly photograph images without an image blur regardless of whether or not vibration takes place, the vibration of the camera should be detected and an auxiliary lens should be displaced corresponding to a detected value. Thus, to photograph images free from an image blur, first the vibration of the camera should be accurately detected. Second, the displacement of optical axis due to the vibration should be compensated.

The vibration (of a camera) can be theoretically detected with a vibration sensor that detects angular acceleration, angular velocity, angular displacement, or the like and a camera vibration detection means that electrically or mechanically integrates an output signal of the vibration sensor and outputs information as the angular displacement. The detected information is sent to a correction optical means. The correction optical means deflects a photographic optical axis corresponding to the detected information.

Next, an image blur prevention system with such an angular displacement detection means will be described with reference to FIG. 37.

FIG. 37 shows a system that suppresses an image blur caused by a vertical vibration 41$p$ and a horizontal vibration 41$y$ that are applied to a camera. The vertical vibration 41$p$ and the horizontal vibration 41$y$ are denoted by arrows of FIG. 37.

In FIG. 37, reference numeral 42 is a lens barrel. Reference numeral 43$p$ is an angular displacement detection means for detecting an angular displacement of the camera's vertical vibration 44$p$. Reference numeral 43$y$ is an angular displacement detection means for detecting an angular displacement of the camera's horizontal vibration 44$y$. Reference numeral 45 is a correction optical means. (Reference numerals 46$p$ and 46$y$ are coils that supply thrusting force to the correction optical means 45. Reference numerals 47$p$ and 47$y$ are position detection devices that detect a position of the correction optical means 45). The correction optical means 45 has a position control loop (that will be described later). The correction optical means 45 is driven corresponding to outputs of the angular displacement detection means 43$p$ and 43$y$ so as to stabilize an image plane 48.

FIG. 38 is an exploded perspective view showing a construction of the aforementioned correction optical means.

A lens 71 is caulked in a support frame 72. A bearing 73$y$ is fitted to the support frame 72 under pressure. A support shaft 74$y$ is supported by the bearing 73$y$ so that the support shaft 74$y$ is axially slidable. A cavity portion 74$ya$ of the support shaft 74$y$ is hooked by a nail 75 of the support arm 75. A bearing 73$p$ is fitted to the support arm 75 under pressure. The support shaft 74$p$ is supported so that it is axially slidable.

FIG. 38 also shows a rear view of the support arm 75 and a partial front view of the nail 75$a$.

The support frame 72 has holes 72$pa$ and 72$ya$ for light emitting devices 76$p$ and 76$y$ such as IREDs or the like. Terminals of the light emitting devices 76$p$ and 76$y$ are soldered to lids 77$p$ and 77$y$ that serve as adhering boards, respectively. (The lids 77$p$ and 77$y$ are adhered to the support frame 72.) The support frame 72 has slits 72$pb$ and 72$yb$. Rays of light emitted from the light emitting devices 76$p$ and 76$y$ are transmitted to PSDs 78$p$ and 78$y$ (that will be described later) through the slits 72$pb$ and 72$yb$, respectively. Coils 79$p$ and 79$y$ are adhered to the support frame 72. Terminals of the coils 79$p$ and 79$y$ are soldered to the lids 77$p$ and 77$y$, respectively.

A support ball 711 is fitted in the lens barrel 710 (at three positions). The cavity portion 74$pa$ of the support shaft 74$p$ has a hooking nail portion 710$a$.

Yokes 712$p$1, 712$p$2, 712$p$3, and a magnet 713$p$ are layered and adhered to each other. Likewise, yokes 712$y$1, 712$y$2, 712$y$3, and a magnet 713$y$ are layered and adhered to each other. Polarities of the magnets 713$p$ and 713$y$ are denoted by arrows of the drawing.

The yokes 712$p$2 and 712$y$2 are secured to cavity portions 710$pb$ and 710$b$ of the lens barrel 710 with screws, respectively.

The position detection devices 78$p$ and 78$y$ made of for example a PSD are adhered to sensor bases 714$p$ and 714$y$ (reference numeral 714$y$ not shown), respectively. Terminals of the position detection devices 78$p$ and 78$y$ are soldered to a flexible board 716 through sensor masks 715$p$ and 715$y$, respectively. Protrusion portions 714$pa$ and 714$ya$ (reference numeral 714$ya$ not shown) of the sensor bases 714$p$ and 714$y$ are inserted into holes 710$pc$ and 710$yc$ of the lens barrel 710, respectively. The flexible board 716 is secured to the lens barrel 710 through a flexible stay 717 with a screw. Edge portions 716$pa$ and 716$ya$ of the flexible board 716 are secured to the yokes 712$p$1 and 712$y$1 through holes 710$pd$ and 710$yd$ of the lens barrel 710, respectively. The terminals for the coil and the light emitting device on the lids 77$p$ and 77$y$ are connected to round portions 716$pb$ and 716$yb$ of the edge portions 716$p$ and 716$ya$ on the flexible board 716 with a polyurethane coated copper cable (three-wire stranded cable).

A plunger 719 is secured to a mechanical lock chassis 718 with a screw. The plunger 719 is fitted to a mechanical lock arm 721 charged with a spring 720. The plunger 719 is rotatably secured to the mechanical lock chassis 718 with a shaft machine screw 722.

The mechanical lock chassis 718 is secured to the lens barrel 710 with a screw. Terminals of the plunger 719 are soldered to the round portion 716$b$ of the flexible board 716.

An adjusting screw 723 has a spherical head. The adjusting screw 723 is secured to a yoke 712p and the mechanical lock chassis 718 (at three positions). A sliding surface (hatched portion 72c) of the support frame 72 is surrounded by the adjusting screw 723 and the support ball 711. The adjusting screw 723 is secured so that it is opposed to the sliding surface with a small clearance.

A cover 724 is adhered to the lens barrel 710 so as to cover the correction optical means.

FIGS. 39A and 39B are schematic diagrams for explaining a drive control operation of the correction optical means shown in FIG. 38.

The outputs of the position detection devices 78p and 78y are amplified by amplifying circuits 727p and 727y, respectively. The outputs of the amplifiers 727p and 727y are sent to the coils 79p and 79y. Thus, the support frame 72 is driven and thereby the outputs of the position detection devices 78p and 78y vary. When the coils 79p and 79y are driven in the directions that the outputs of the position detection devices 78p and 78y decrease (namely, negative-feedback is performed), the support frame 72 is stably placed at a position where the outputs of the position detection devices 78p and 78y become almost zero. Addition circuits 731p and 731y add outputs of the position detection devices 78p and 78y and command signals 730p and 730y that are received from the outside of the apparatus, respectively. Compensation circuits 728 and 728y stabilize a control system. Drive circuits 729p and 729y compensate currents that flow in the coils 79p and 79y.

When the command signals 730p and 730y are sent to the system shown in FIGS. 39A and 39B through the addition circuits 731p and 731y, respectively, the support frame 72 is accurately driven according to the command signals 730p and 730y.

The technique for controlling a coil with a negative feedback of a position detection output as in the system shown in FIGS. 39A and 39B is referred to as position control technique. When the amount of vibration is given as the command signals 730p and 730y, the support frame 72 is driven corresponding to the amount of vibration.

FIG. 40 is a circuit diagram showing the drive control system of the correction optical means shown in FIGS. 39A and 39B. With reference to this drawing, the drive control system for a pitch direction 725p will be described (this is because the drive control system for a yaw direction 725y is similar to that for the pitch direction 725p).

The light emitting device 76p causes optical currents 727i1 and 727i2 to flow in the position detection device 78p (constructed of resistors R1 and R2). Current-voltage conversion amplifiers 727a and 727b convert the optical currents 727i1 and 727i2 into voltages, respectively. A differential amplifier 727c obtains the difference between the outputs of the current-voltage conversion amplifiers 727a and 727b (namely, the output proportional to the position of the support frame 72 in the.pitch direction 725p). The amplifier 727p shown in FIGS. 39A and 39B is constructed of the current-voltage conversion amplifiers 727a and 727b, the differential amplifier 727c, and resistors R3 to R10.

A command amplifier 731a adds the command signal 730p, which is received from the outside of the system, and a differential signal of the differential amplifier 727c. The addition circuit 731p shown in FIGS. 39A and 39B is constructed of the command amplifier 731a and resisters R11 to R14.

Resistors R15 and R16 and a condenser C1 construct a known phase advancing circuit. The phase advancing circuit is equivalent to a compensation circuit 728p shown in FIGS. 39A and 39B.

An output of the addition circuit 731p is sent to a drive amplifier 729a through the compensation circuit 728p. The drive amplifier 729a generates a drive signal of the pitch coil 79p. With the drive signal, the correction optical means is displaced. The drive amplifier 729a, a resistor R17, and transistors TR1 and TR2 construct the drive circuit 729p shown in FIGS. 39A and 39B.

An addition amplifier 732a adds the outputs of the current-voltage conversion amplifiers 727a and 727b (namely, total amount of light received by the position detection device 78p). The output of the addition amplifier 732a is sent to a drive amplifier 732b. Thus, the drive amplifier 732b drives the light emitting device 76p corresponding to the output signal of the addition amplifier 732a. The addition amplifier 732a, the drive amplifier 732b, resistors R18 to R22, and a condenser C2 construct a drive circuit (not shown in FIGS. 39A and 39B) of the light emitting device 76p.

The amount of light emitted by the emitting device 76p unstably varies depending on changes of temperature. Thus, the position detection sensibility of the differential amplifier 727c accordingly varies. However, when the drive circuit controls the light emitting device 76p so that the total amount of light received becomes constant, the fluctuation of the position detection sensitivity can be reduced.

As described above, when the correction optical means shown in FIGS. 38 to 39B is driven, if no command is received from the vibration detection means, the support frame 72 is stably placed at a position where the position detection output of the position detection means (constructed of the light emitting devices 76p and 76y, the slits 72pb and 72yb, and the position detection devices 78p and 78y) becomes almost zero. In other words, when the pitch direction 725p (shown in FIGS. 39A and 39B) is the direction of gravity, the support frame 72 is always gravitated. Thus, to stabilize the support frame 72, a drive current flows in the coil 79p so as to support the support frame 72 against gravity.

To do that, coil springs 61pa, 61pb, 61ya, and 6lyb are disposed between the lens barrel 710 (nail portion 710a) and the support frame 72 so that the support frame 72 and the lens barrel 710 are surrounded by such elastic members.

In FIG. 41, the coil springs 61pa and 61pb have the same spring constant and are disposed around the support shaft 74p. One end of each of these coil springs 61pa and 61pb is in contact with the nail portion 710a. The other end of the coil spring 61pa is in contact with an inner surface 75b of a rear flange portion of the support arm 75, whereas the other end of the coil spring 61pb is in contact with an inner surface 75c of a rear flange of the support arm 75. In such a manner, the coil springs 61pa and 61pb are pre-charged.

Likewise, the coil springs 61ya and 6lyb have the same spring constant and are disposed around the support shaft 74y. One end of each of the coil springs 61ya and 6lyb is in contact with the nail member 75a of the support arm 75. The other end of the coil spring 61ya is in contact with an opposed wall 72d of the support frame 72, whereas the other end of the coil spring 6lyb is in contact with an opposed wall 72e of the support frame 72.

Thus, the support frame is surrounded by the pre-charged springs with the same spring constant. When the length of the coil spring 61pa becomes the same as the length of the coil spring 61pb and when the length of the coil spring 61ya becomes the same as the length of the coil spring 6lyb, the support frame 72 is balanced. Thus, the support frame 72 can be supported by the spring force against the gravity. As a result, the amount of currents that flow in the coils 79*p* and 79*y* can be reduced.

However, the balanced positions of the support frame 72 by the springs do not always accord with the zero positions of the position detection devices 78*p* and 78*y*. This is because there are many error factors such as accuracies of the springs, part accuracies of the support frame 72, the support arm 75, and the lens barrel 710, the mounting accuracies of the position detection devices 78*p* and 78*y* against the lens barrel 710, the relative error of a detecting chip 78*a* against a package 78*b* of each position detection device, and so forth.

As shown in FIG. 41, if an error 6 takes place between a balance point 63 of the springs in a drive direction 65 of the support frame 72 against the gravity g in a direction denoted by an arrow 62 and a center 64 at which the output of the position detection device 78*p* becomes zero (this center 64 is referred to as output zero center), a current equivalent to force 2δk should continuously flow in the coil 79*p* so as to keep the support frame 72 at the output zero center 64 (where k is the spring constant of the coil springs 61*pa* and 61*pb*).

The spring constant k of the coil springs 61*pa* and 61*pb* cannot be decreased. In other words, when the spring constant k is decreased, the balance point against the gravity g lowers. Thus, the relative distance between the nail portion 710*a* and the flange inner surface 75*c* shortened and thereby the drive stroke of the support frame 72 against vibration becomes small. Consequently, the apparatus cannot be prevented from large vibration. As a result, the force 2δk cannot be reduced. In other words, the amount of coil current cannot be remarkably decreased in comparison with a construction that does not use coil springs.

As described above, in the conventional image blur prevention apparatus, currents that flow in coils are required so as to keep the apparatus against gravity or the force of coil springs. Thus, the conventional image blur prevention apparatus is not suitable for home-use appliances such as still cameras and video cameras that have limited batteries.

In the conventional construction shown in FIGS. 37 to 41, a securing means of the correction optical means is constructed of the mechanical lock chassis 718, the plunger 719, the mechanic arm 721, and so forth. The securing means is secured to the lens barrel 710 with a screw. While an image blur prevention function is not working, the securing means secures the support frame 72 so that it does not move in directions of arrows denoted by 725*p* and 726*y* as shown in FIGS. 39A and 39B. While the image blur prevention function is working, the image blur prevention lens system is designed so that its optical characteristics do not degrade even if the lens 71 moves in the directions of the arrows 725*p* and 726*y*. Thus, while the support frame 72 is secured, even if the optical axis of the lens 71 does not accord with the optical axis of the lens barrel, satisfactory optical characteristics can be obtained. Thus, so far it was not necessary to designate the secured positions of the lens 71 in the directions of the arrows 725*p* and 726*y*. In other words, the lens 71 could be secured at any position in the directions of the arrows 725*p* and 726*y*.

However, in the case that the secured position of the lens 71 largely deviates from the optical axis of the lens barrel, if the image blur prevention function is not used, the following problems take place.

In FIG. 42, when a user aims an image blur prevention camera at an object 61 (while the image blur prevention function is not working, the correction optical means is secured by the securing means), if a photographic optical axis is deviated by the correction optical means, the orientation of the image blur prevention camera 62 deviates from the photographic optical axis so as to improve a framing. Thus, the user can take a picture without a strange feeling.

In addition, as described above, while the image blur prevention function is working, the securing means is detached from the correction optical means. The correction optical means is stably placed at a position where the outputs of the position detection devices 78*p* and 78*y* become almost zero. The correction optical means is driven based on this position corresponding to the output of the vibration detection means. Thus, if the secured position of the correction optical means deviates from the output zero points of the position detection devices 78*p* and 78*y*, the following problem will take place.

In FIG. 43A, vertical axis represents positions of the correction optical means in the directions 725*p* and 726*y*. (In this drawing, the positions of the correction optical means in the direction 725*p* are shown.) While the image blur prevention function is working, the correction optical means is secured at a position represented by a solid line 51. A solid line 52 represents a position at which the outputs of the position detection devices 78*p* and 78*y* become zero. A one-dashed line represents the optical axis of the lens barrel.

When the user aims the camera at an object for a framing and turns on the image blur prevention function, the position of the correction optical means moves from the position 51 to the position 52. Thus, as shown in FIG. 43B, the object 54, namely framing, varies as shown by a dotted line 55.

To restore the original framing, the user should change the orientation of the image blur prevention lens. At this point, if the user changes the orientation (posture) of the camera as shown by the one-dashed line 57 of FIG. 44, the original framing is supposed to take place. However, since the image blur prevention function is working, even if the orientation of the image blur prevention lens is changed, the framing is not immediately changed. Thus, the user tends to excessively change the orientation of the camera. As a result, as shown by a solid line 58, the user cannot immediately aim the camera at the object.

Next, with reference to FIGS. 37 to 41, the operation of the image blur prevention function of the conventional correction optical means will be described time by time.

In FIG. 45A, reference numeral 743 is a position of the correction optical means when the support frame 72 is locked by the mechanical lock arm 721. Reference numeral 744 is a position of the correction optical means when the mechanical lock arm 721 is detached and a position control is performed for the lens 71. The position 744 is the center of an electric spring. When the image blur prevention function is turned on by an external switch operation (at point 745), the mechanical lock arm 721 is detached from the support frame 72. Thus, the lens 71 is moved from the position 743 to the position 744. When a release button is pressed by half, a switch SW1 is turned on (at point 747). At this point, as shown in FIG. 45C, a command signal 746 with a level of zero is input to the correction optical means. Thus, the correction optical means is driven according to the command signal 746. When the user releases the release button (at point 748), the correction optical means returns to the position 744. It should be noted that the image blur prevention function may be turned on by the switch SW1 and thereby the mechanical lock arm 721 may be detached from the support frame 72.

When the orientation of the camera is changed (749), the correction optical means moves to position 750. This is because the direction of the gravity g (751) varies and thereby the balance position of the weight of the lens 71, the gravity, and the electric spring force varies.

At this point, when the release button is pressed by half, the switch SW1 is turned on (point 752). Thus, the correction optical means is driven corresponding to a command signal 753 with a level of zero. When the user releases the release button (at point 754), the correction optical means returns to the position 750.

FIG. 45B shows power consumption of the coils 78p and 78y of the correction optical means. As shown by a hatched region, after the image blur prevention function is turned on, a large amount of constant power is required. (In contrast, the power consumption for image blur correction function in image blur prevention sections 755 and 756 is much smaller than the power consumption of the entire power consumption of the system.) Such a large amount of power is required for always keeping the correction optical means at the center of the electrical spring against the gravity g (751). When the direction of the gravity g varies as the orientation of the camera varies in a period 749, the power consumption slightly decreases. When the camera is oriented upward so as to prevent the correction optical means from being gravitated in the drive direction thereof, the power consumption for the gravity g is eliminated.

However, since the camera is likely to be used in its flat position, constant power is always required. However, since the battery of the camera only has a limited amount of power, the number of films that the camera can photograph is limited.

To prevent such a problem, a related art reference as disclosed in Japanese Patent Laid-Open Application No. 4-39616 is known. In the related art reference, a correction optical means is mechanically supported by a spring. In addition, a high-pass filter with a large time constant is connected in series with a position control loop. Thus, the correction optical means does not work for a DC component such as gravity.

In this case, as shown in FIG. 46A, when the image blur prevention function is turned on (at point 745), the correction optical means moves to the center position 744 of the electrical spring. However, due to the high-pass filter, the correction optical means gradually moves to a center position 757 of a mechanical spring. Thus, as shown in FIG. 46B, the power consumption gradually decreases to zero. Even if the posture of the camera varies (in period 749), the direction of the gravity g varies and thereby the center of mechanical spring moves to position 758. However, due to the high-pass filter, the correction optical means gradually moves to the center position of the mechanical spring. Only while the correction optical means is moving to the center position of the mechanical spring, power consumption takes place (763). However, power is not consumed for the gravity g. Thus, in comparison with the construction shown in FIG. 45B, power consumption can be much reduced. However, in this related art reference, there is the following problem.

After the image blur prevention function has been turned on (point 745), while the posture of the camera is changing (749) and thereby the correction optical means is moving to the center position of the mechanical spring 757, power consumption takes place (763). Thus, the quicker the correction optical means moves to the center position of the mechanical spring 757, the less power is consumed. However, in such a construction, the correction optical means gradually moves to the center position of the mechanical spring 757 while the image blur prevention function is working (745) and the posture of the camera is changing (749). Thus, it takes a relatively long time.

In addition, in the construction of the abovementiond related art reference, since the correction optical means is supported by springs, when the correction optical means is driven corresponding to the command signals 746 and 753 as shown in FIG. 46C, the correction optical means should be driven against the spring force. Thus, the power consumption in the image blur prevention sections 755 and 756 is large. Moreover, the amplitudes of the command signals become large time by time. The spring force that moves the correction optical means becomes large (due to large stroke). Thus, the power consumption becomes large. When the power consumption exceeds threshold values 764 and 765, the power supply to other functions of the camera is adversely affected.

SUMMARY OF THE INVENTION

A first aspect of the present invention is an optical apparatus or a control apparatus for use with an optical apparatus, comprising:

position detection means for detecting a position of a movable optical unit; and matching means for substantially pre-matching a mechanical initial position of the optical unit with a center position determined by said position detection means.

Thus, a problem that takes place due to nonconformity of the mechanical initial value and the detected center position can be solved.

A second aspect of the present invention is an optical apparatus or a control apparatus for use with an optical apparatus, comprising:

position detection means for detecting a position of a movable optical unit;

matching means for removing a deviation between a mechanical initial position of the optical unit and a center position determined by said position detection means from an output of said position detection means so as to substantially match the mechanical initial position of the optical unit with the center position; and varying means for varying offset characteristics of said matching means.

Thus, a problem that takes place due to nonconformity of the mechanical initial value and the detected center position can be solved.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 16A to 16D are schematic diagrams showing various examples of elastic means with the characteristics of FIG. 15;

FIGS. 20A and 20B are graphs showing gain and phase of a high-pass filter with different time constants according to the ninth embodiment of the present invention;

FIGS. 21A to 21C are timing charts of an operation of an image blur prevention function of the correction optical means of FIGS. 14A and 14B;

FIG. 22A is comprised of FIGS. 22A1 and 22A2 showing schematic diagrams of principal portions of a blur prevention apparatus according to a tenth embodiment of the present invention;

FIG. 22B is a schematic diagram showing a member of FIGS. 22A1 and 22A2;

FIG. 23 is comprised of FIGS. 23A and 23B showing schematic diagrams of principal portions of a blur prevention apparatus according to an eleventh embodiment of the present invention;

FIGS. 24A to 24C are timing charts for an operation of an image blur prevention function of the correction optical means of FIGS. 23A and 23B;

FIGS. 29A to 29C are timing charts of an operation of an image blur prevention function of the correction optical means of FIGS. 26A and 26B;

FIGS. 45A to 45C are timing charts of an example of an operation of an image blur prevention function performed by a conventional correction optical means and its drive means; and FIGS. 46A to 46C are timing charts of another example of an operation of an image blur prevention function performed by a conventional correction optical means and its drive means.

DETAILED DESCRIPTION OF THE PREFERRED EMBODIMENTS

Next, with reference to the accompanying drawings, embodiments of the present invention will be described. In the embodiments that follow, vibration of a camera is detected so as to detect an image blur.

Figure 41:
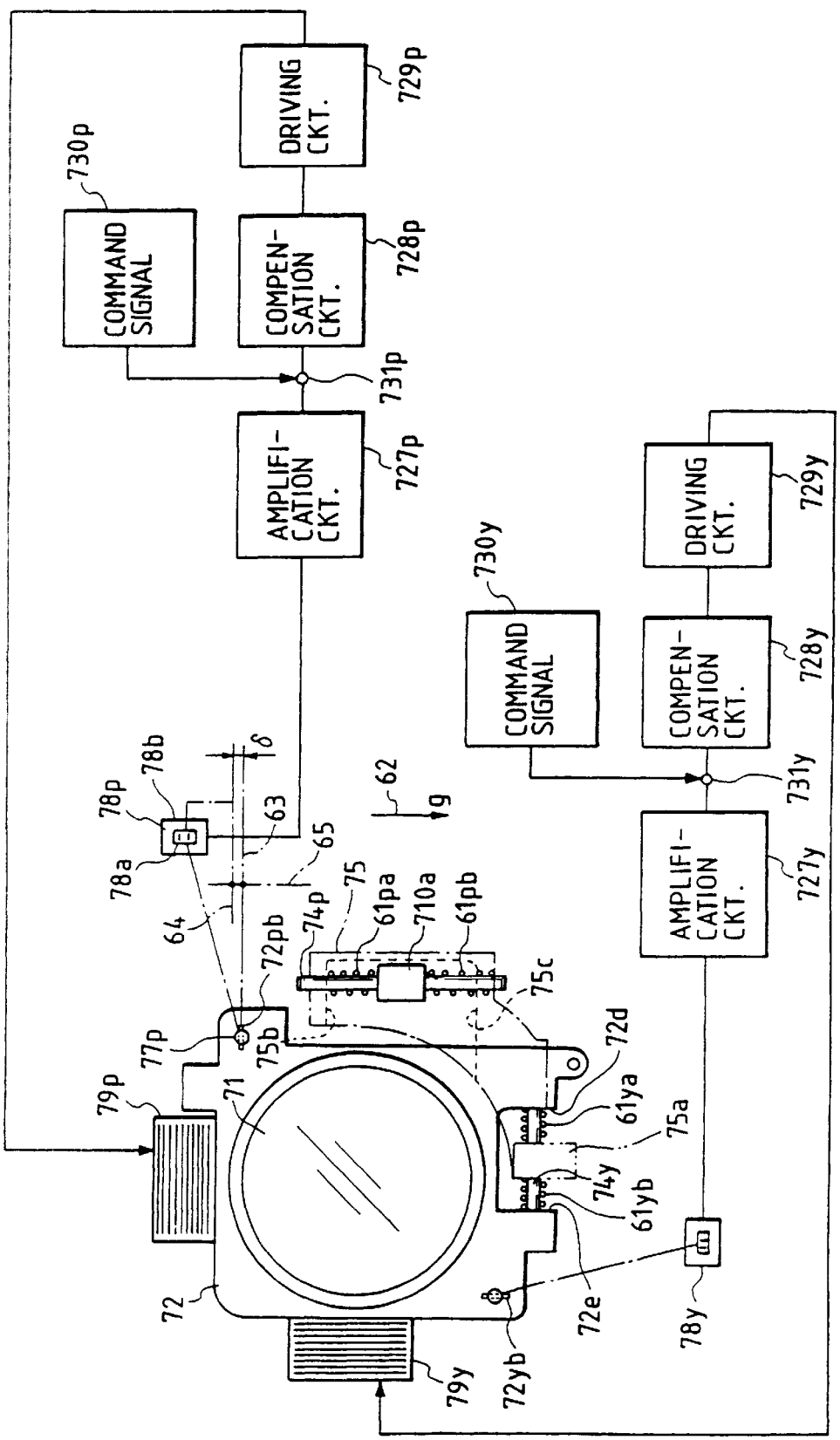
FIG. 41 is a schematic diagram for explaining a problem involved in a conventional image blur prevention apparatus.
Figure 42:
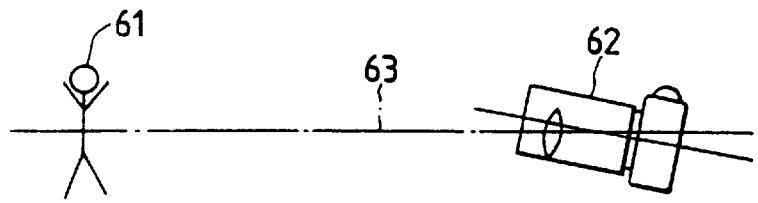
FIG. 42 is a schematic diagram for explaining a problem involved in a camera with a conventional image blur prevention apparatus.
Figure 43A:
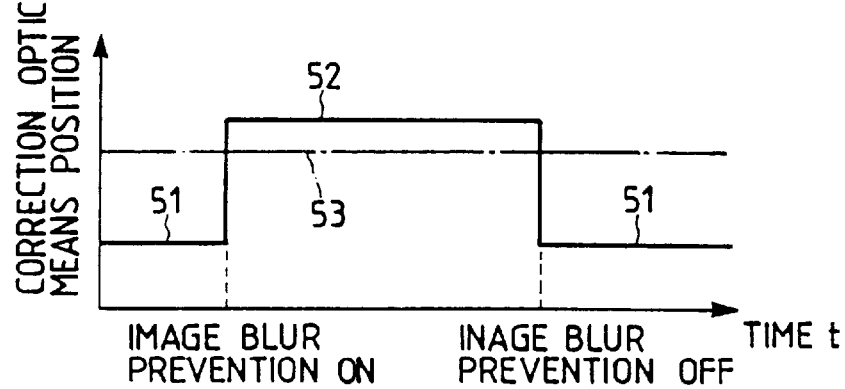
FIGS. 43A and 43B are schematic diagrams for explaining a problem involved in a camera with a conventional image blur prevention apparatus.
Figure 43B:
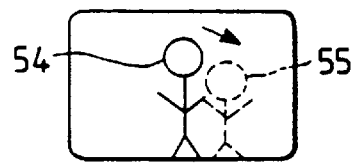
Figure 44:
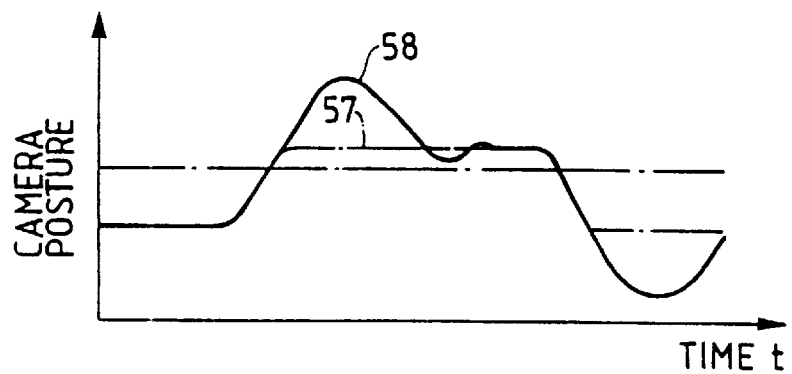
FIG. 44 is a schematic diagram for explaining a problem involved in a camera with a conventional image blur prevention apparatus.

FIGS. 1A and 1B are schematic diagrams showing principal portions of an image blur prevention apparatus according to a first embodiment of the present invention. For simplicity, in FIGS. 1A and 1B, the same portions as FIG. 41 are denoted by the same reference numerals.

In the first embodiment, a position detection device 78$p$ is secured to an adjustment base 11$p$. The adjustment base lip is fitted into a cavity portion (hatched portion in the drawing) of a lens barrel 710. The adjustment base lip is movable in a direction of an arrow 12$p$ along a guide wall 710$pf$ of the lens barrel 710. In this drawing, the guide wall 710$pf$ is disassembled from the lens barrel 710.

A forward end 14$a$ of the adjustment shaft 14 (which is shown in an enlarged perspective view of FIG. 1B) is fitted into a hole 710$pe$ of the lens barrel 710 through an elongated hole 11$pb$ of the adjustment base 11$p$. When a knob 14$c$ is turned, an ellipse portion 14$b$ pushes up the elongated hole 11$pb$. Thus, the adjustment base lip is moved slightly in the direction of the arrow 12$p$ corresponding to the amount of rotation of the knob 14$c$.

In FIGS. 1A and 1B, after the above-mentioned adjustment has been performed, a screw is inserted into a hole (not shown) of the lens barrel 710 through a hole 11$pa$ of the adjustment base lip so as to secure the adjustment base 11$p$ to the lens barrel 710. A spring 13$pb$ has a smaller spring constant than a spring 61$pa$.

In such a construction, when the position of the correction optical means is controlled, if the values of command signals 730$p$ and 730$y$ are zero, a correction optical means is stably placed at a position where the outputs of position detection devices 78$p$ and 78$y$ become zero. Before the position control is performed, the correction optical means is stably placed at a position where gravity g (in a direction of an arrow 62), and the springs 13$pb$ and 61$pa$ are balanced. Thus, after the position control is performed, there is a deviation δ that is the difference between the balance point and the zero point of the position detection device 78$p$. A current that produces thrusting force of (k1+k) δ always flows in the coil 79$p$ (where k1 is a spring constant of the coil spring 13$pb$ and k is a spring constant of the coil spring 61$pa$). (Since a spring is not disposed in the detecting direction of the position detection device 78$y$ and the gravity g does not work in this direction, a large current does not flow in the coil 79$y$.)

With the adjustment shaft 14, the position of the adjustment base lip is adjusted (for δ) so that the balance point of the spring accords with the output zero position of the position detection device 78$p$. Thus, since a large current does not flow in the coil 78$p$, power consumption can be reduced.

When the camera is gradually oriented upward (in the direction of the arrow 62 of FIGS. 1A and 1B), the direction of gravity applied to the camera varies. Thus, the balance point of the spring varies. At this point, a current that produces the thrusting force (k1+k) δ should flow in the coil 78$p$. However, since there is a relation of k1<k, the amount of current is smaller than the force of 2kδ in FIG. 34.

A construction where the spring constant of the coil spring 13$pb$ is increased and the spring constant of the coil spring 61$pa$ is decreased is not used. As described above, in this construction, the balance point downwardly deviates (namely, the point 710$a$ approaches to the point 75$c$), thereby decreasing the drive stroke. Thus, in this embodiment, the spring constant of the spring 61$pa$ that works against the gravity is larger than the spring constant of the spring 13$pa$.

As described above, a spring is not disposed in the detecting direction of the position detection device 78$y$. If the gravity is applied in this direction, a current equivalent to the thrusting force against the gravity should flow in the coil 79$y$. However, in a video camera, such a variation of gravity does not take place. In other words, the orientation of a video camera is not changed from flat position to upright position (namely, the camera is never turned by 90 deg about the optical axis thereof). In a still camera, the chances of taking photos in flat position are larger than the chances of photographing photos in upright position. Thus, the current that flows in the upright position can be omitted. As a result, the spring can be disposed only in the direction of gravity (namely, the direction of the arrow 62 shown in FIG. 1A).
(Second Embodiment)

Figure 1:
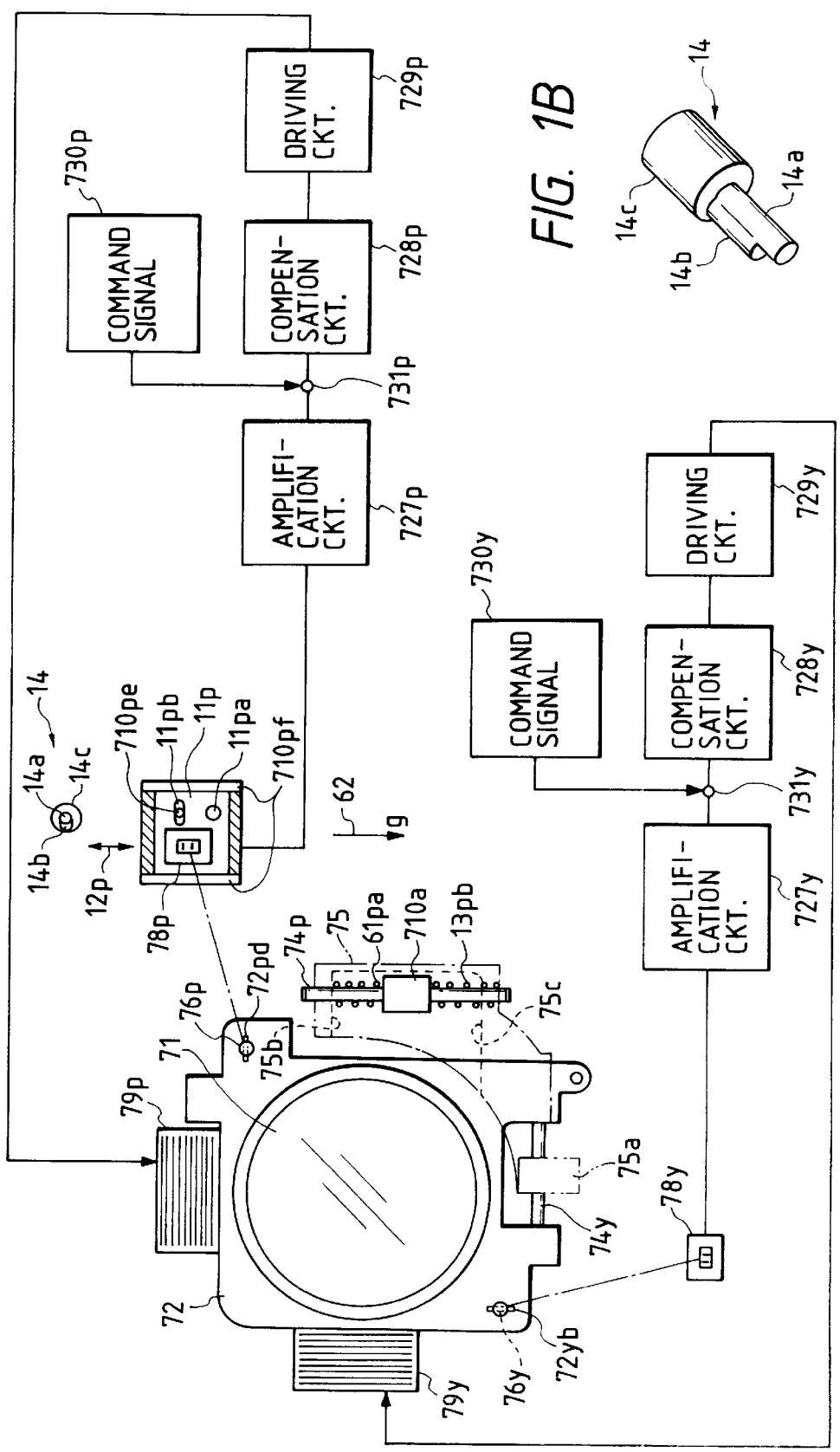
FIG. 1A is a schematic diagram showing principal portions of an image blur prevention apparatus according to a first embodiment of the present invention.
FIG. 1B is a perspective view showing a member of FIG. 1A.
Figure 2:
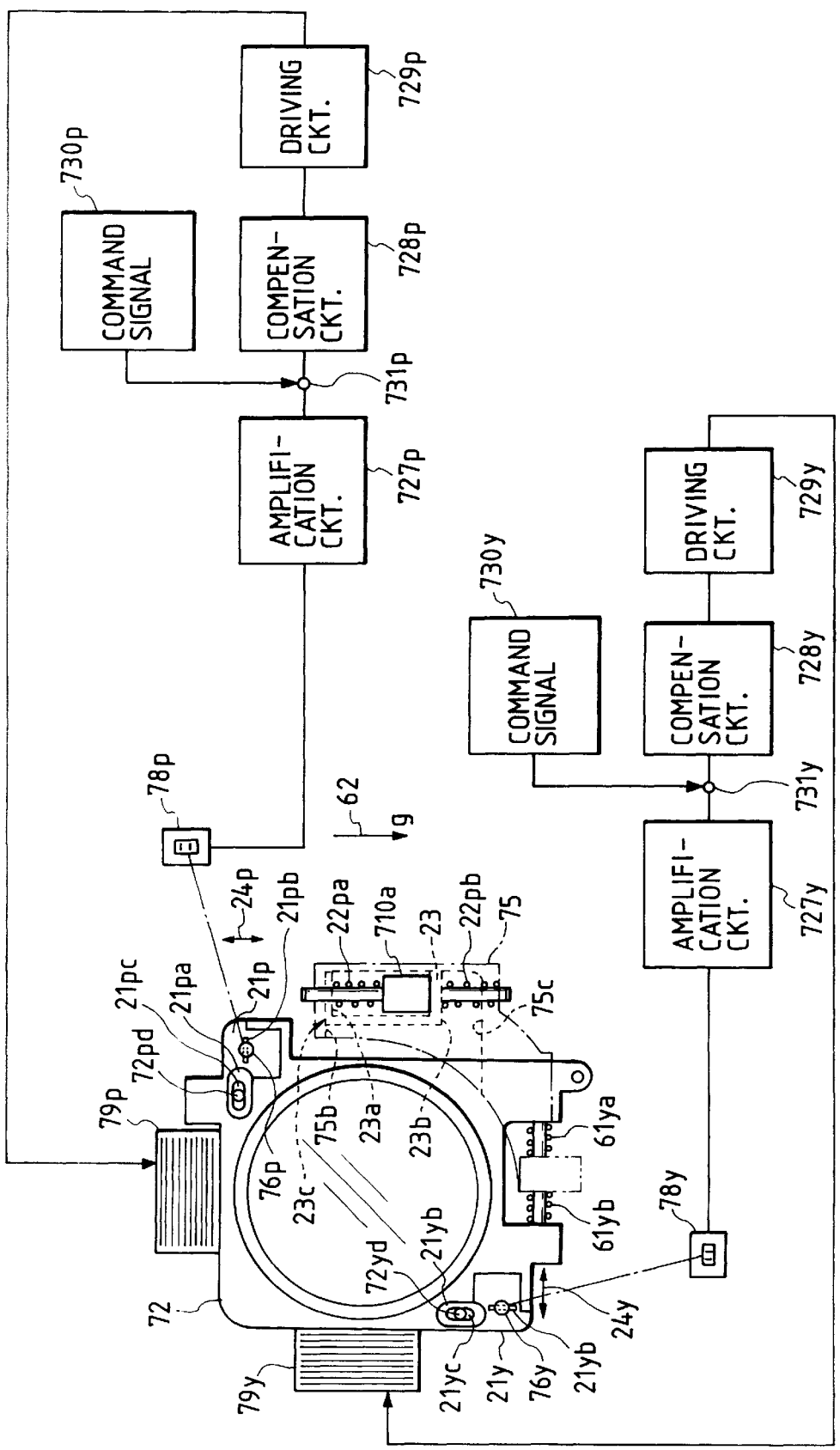
FIG. 2 is a schematic diagram showing principal portions of an image blur prevention apparatus according to a second embodiment of the present invention.

FIG. 2 is a schematic diagram showing principal portions of an image blur prevention apparatus according to a second embodiment of the present invention. For the simplicity, in this drawing, the same portions as FIGS. 1A and 1B are denoted by the same reference numerals.

In the second embodiment, light emitting devices 76$p$ and 76$y$ and slits 21$pb$ and 2l$yb$ are incorporated as an adjusting method of a position detection means so as to adjust the position detection means in the position detection direction. In addition, a coil spring 22$pa$ is pre-charged by a pre-charge member 23.

In FIG. 2, light emitting device holders 21$p$ and 21$y$ are fitted into a support frame 72 so that the holders 21$p$ and 21$y$ are movable in directions 24$p$ and 24$y$, respectively. Light emitting devices 76$p$ and 76$y$ are provided in the light emitting device holders 21$p$ and 21$y$, respectively. Slits 21$pb$ and 2l$yb$ are disposed on the light emitting devices 76$p$ and 76$y$, respectively. Arm portions 21$pa$ and 21$ya$ are incorporated into the light emitting device holders 21$p$ and 21$y$, respectively. The arm portions 21$pa$ and 21$ya$ have elongate holes 21$pc$ and 2l$yc$, respectively. A forward end 14$a$ of an adjustment shaft 14 (not shown in FIG. 2) is fitted to screw holes 72$pd$ and 72$yd$ of the support frame 72, respectively. By turning knobs 14$c$, the positions of the light emitting device holders 21$p$ and 21$y$ can be adjusted in the directions 24$p$ and 24$y$. After the adjustment has been completed, screws are inserted into screw holes 72$pd$ and 72$yd$ so as to secure the light emitting device holders 21$p$ and 21$y$ to the support frame 72.

The spring 22$pa$ has a small spring constant. The spring is pre-charged between an inner wall of the pre-charge member 23 and a nail portion 710$a$. The pre-charge force is nearly the same as the weight of the correction optical means.

An outer wall 23$c$ of the pre-charge member 23 is in contact with an inner wall 75$b$ of a flange of a support arm 75. With the pre-charge force, which is nearly the same as the weight of the correction optical means, the pre-charge member 23 is raised to the nail portion 710. Thus, the support arm 75 is supported against the gravity g.

Since the pre-charge member 23 limits the stroke of the expansion of the spring 22$pa$, the following advantage can be expected.

Since the pre-charge force is nearly the same as the weight of the correction optical means, the spring 22pa gets scarcely loose. In addition, when the posture of the camera is changed and the direction of gravity applied to the camera varies, even if the intensity of the vector component of the gravity applied to the direction of the arrow 62 decreases, the pre-charge member 23 prevents the spring 22pa from getting loose. In other words, the balance position of the correction optical means just depends on the sizes of the nail portion 710a and the pre-charge member 23 regardless of the direction of gravity.

The position adjustment of the position detection means is performed by moving the light emitting device holders 21p and 21y with an adjustment shaft (not shown) so that the outputs of the position detection devices 78p and 78y at the balance position become zero.

When the correction optical means is moved corresponding to command signals 730p and 730y, if the correction optical means is moved in the same direction as the gravity (direction of gravity 62), the pre-charge force of the spring 22pa is nearly balanced with the weight of the correction optical means, thereby offsetting the pre-charge force. Thus, the drive force should be proportional to the spring constant and displacement amount of the spring 22pa. However, since the spring constant of the spring 22pa is small, the drive force is small.

When the correction optical means is moved in the opposite direction of the gravity, drive force against the gravity is required as with the related art reference. However, such drive force is not always required.

A spring 22pb is disposed between the pre-charge member 23 and an inner wall 75c of the support arm 75. The spring 22pb works as a shock absorber that absorbs a shock applied when the gravity is applied in the opposite direction of the direction 62. Likewise, the springs 61ya and 61yb work as shock absorbers.

While the image blur prevention function is not working, since the coils 79p and 79y are not energized, if the support frame 72 freely moves in a lens barrel 710, the springs 61ya and 61yb prevent the support frame 72 from damaging the lens barrel 710. (In reality, although the support frame 72 is secured by a mechanical lock means, if the battery power goes low, neither the image blur prevention function nor the mechanical lock may not work.)

Since the springs 61ya and 61yb are provided, the balance point of the spring force and the output zero point of the position detection device 78y are adjusted by the light emitting device holder 21y.

When springs are provided in both the drive directions as shown in FIG. 2, this mechanism can be applied to the following two control systems as well as the position control system.

Figure 3:
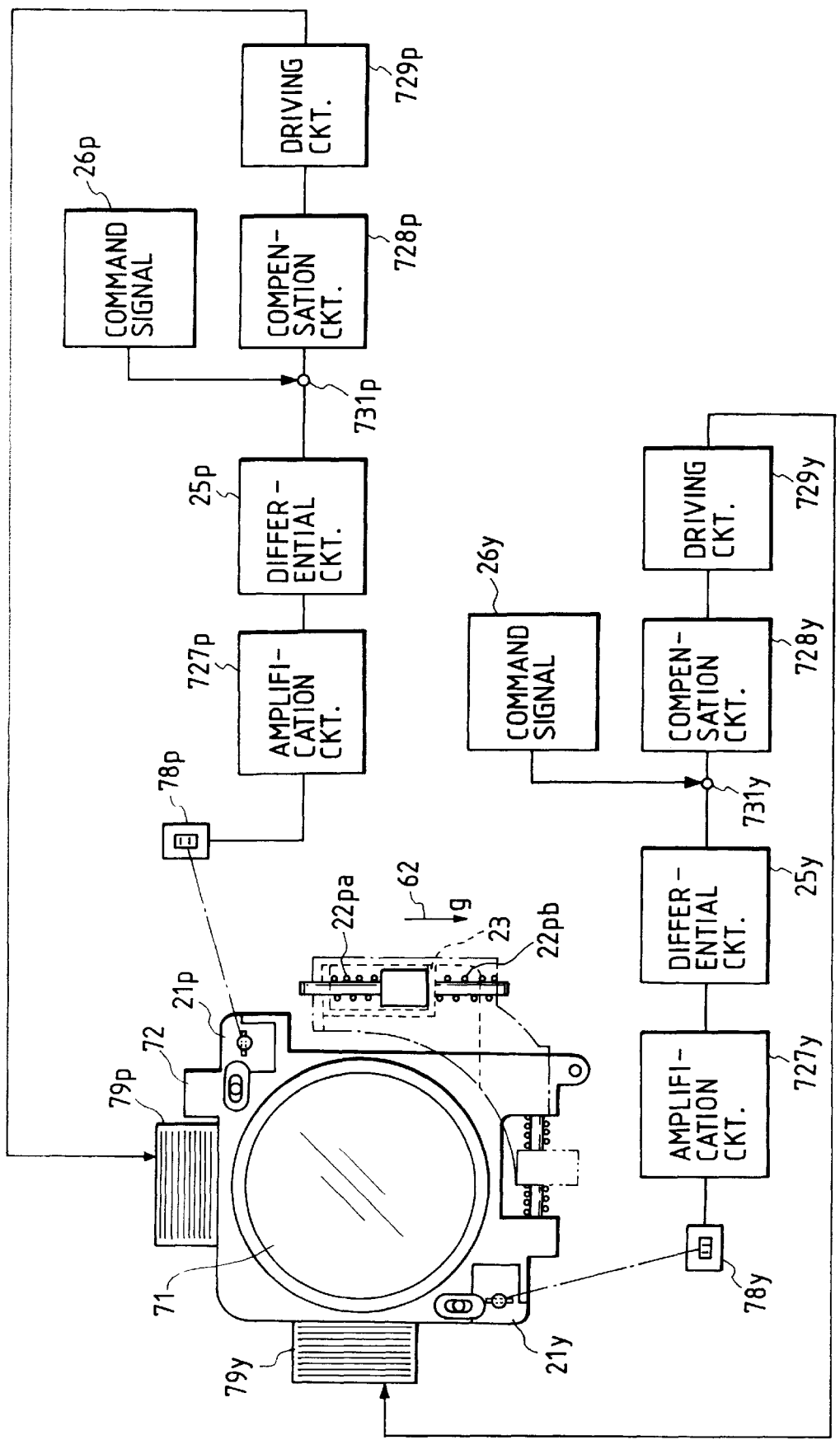
FIG. 3 is a schematic diagram showing principal portions of an image blur prevention apparatus according to a modification of FIG. 2.

FIG. 3 is a schematic diagram showing principal portions of a speed control system. In this system, the outputs of the position detection devices 78p and 78y of amplifying circuits 727p and 727y are sent to differential circuits 25p and 25y, respectively. The differential circuits 25p and 25y convert position signals into speed signals. The speed signals are negative fed back to coils 79p and 79y.

Such a drive control system using speed signals is known and referred to as speed control drive system. A driven portion (correction optical means) is accurately driven corresponding to the speed signals. As a modification of the system shown in FIG. 3, the speed of the driven portion may be directly detected with a speed sensor.

In such a speed control system, a support frame 72 is placed at a balance point of springs 22pa and 22pb against the gravity. Even if the balance point deviates from output zero points of position detection devices 78p and 78y, since the speed signals are not output to the differential circuits 25p and 25y (when the support frame 72 stops at the balance point, the speed thereof is zero). Thus, the speed signals are not output to the coils 79p and 79y. In other words, regardless of the posture of the camera, a current against the gravity is not required. The speed control drive operation is performed based on the balance point of the springs so as to perform the image blur prevention function. (In this case, the command signals 26p and 26y correspond to an angular speeds of vibration of the camera, not an angle of vibration of the camera.)

In this construction, since the spring 22pa is pre-charged by the pre-charge member 23, even if the gravity is applied, the balance point just depends on the mechanical size. Thus, the center of an auxiliary lens 1 accurately accords with the optical axis. In other words, the correction optical means can prevent an image blur at the center of the optical axis regardless of any gravity condition.

Moreover, a position detection stroke should be adjusted due to an installation error of the correction optical means. In an extreme situation, the balance point of the springs may be present at an end of the output of a position detection device. In this case, a half of the detecting stroke on the optical axis cannot be used. To prevent such a situation, the light emitting device holders 21p and 21y are adjusted so that the balance point of the springs accords with the output zero point of the light emitting devices.

Thus, regardless of any posture of the camera, the center position does not vary. In addition, a current against the gravity is not required. Moreover, the drive stroke for image blur prevention can be used.

Figure 4:
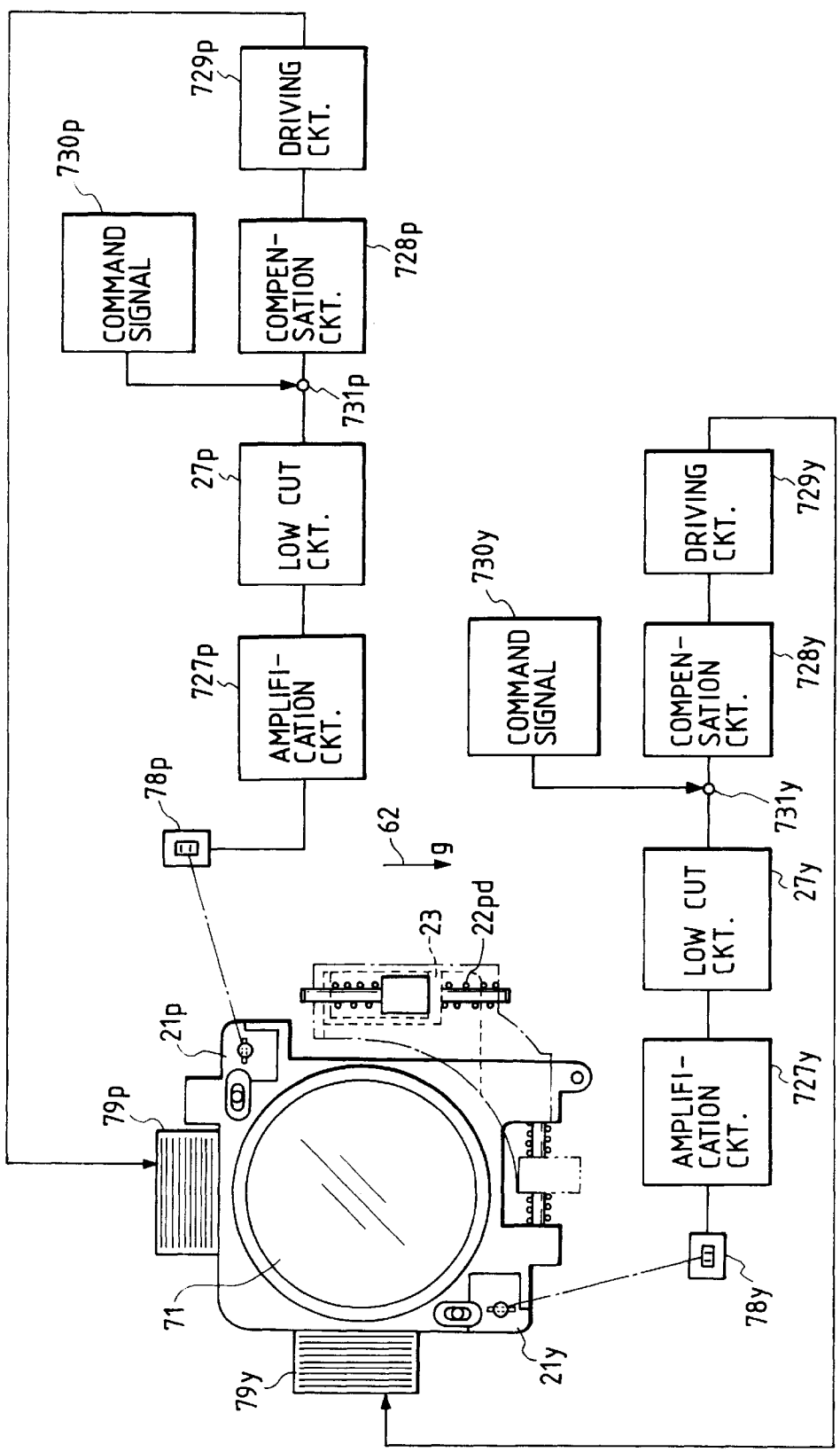
FIG. 4 is a schematic diagram showing principal portions of an image blur prevention apparatus according to another modification of FIG. 2.

FIG. 4 is a schematic diagram showing principal portions of another control system.

In this drawing, a position control drive system is shown where low-pass circuits 27p and 27y are used instead of the differential circuits 25p and 25y shown in FIG. 3. An example of this system is disclosed in Japanese Patent Laid-Open Application No. 4-39616. In this example, DC components of outputs of position detection devices are blocked and corresponding currents do not flow in coils 79p and 79y.

In this example, as with the speed control system, since a support frame 72 is prevented from vibrating based on the balance point of springs, the center position of the optical axis can be accurately detected (regardless of any gravity condition) by a pre-charge member 23. In addition, by adjusting the positions of light emitting device holders 21p and 21y, a drive stroke can be obtained.

In the examples shown in FIGS. 2, 3, and 4, when the gravity is applied to the opposite direction of the arrow 62, since a spring 22pb gets loose, the center position varies. However, when the user aims the camera at an object, the orientation of the camera may be changed vertically and horizontally. In this case, the camera is never oriented in opposite direction. In other words, the gravity varies in the range from 0 to +1 G, rather than −1 G. Thus, while the user is aiming the camera at an object, the center position does not vary.

(Third Embodiment)

In the second embodiment, the light emitting devices 76p and 76y and the slits 21pb and 2lyb are moved so as to perform the position adjustment. However, even if only the positions of slits are adjusted, the same effect of the second embodiment can be obtained. A construction where only the positions of the slits are adjusted will be described as a third embodiment of the present invention.

Figure 5:
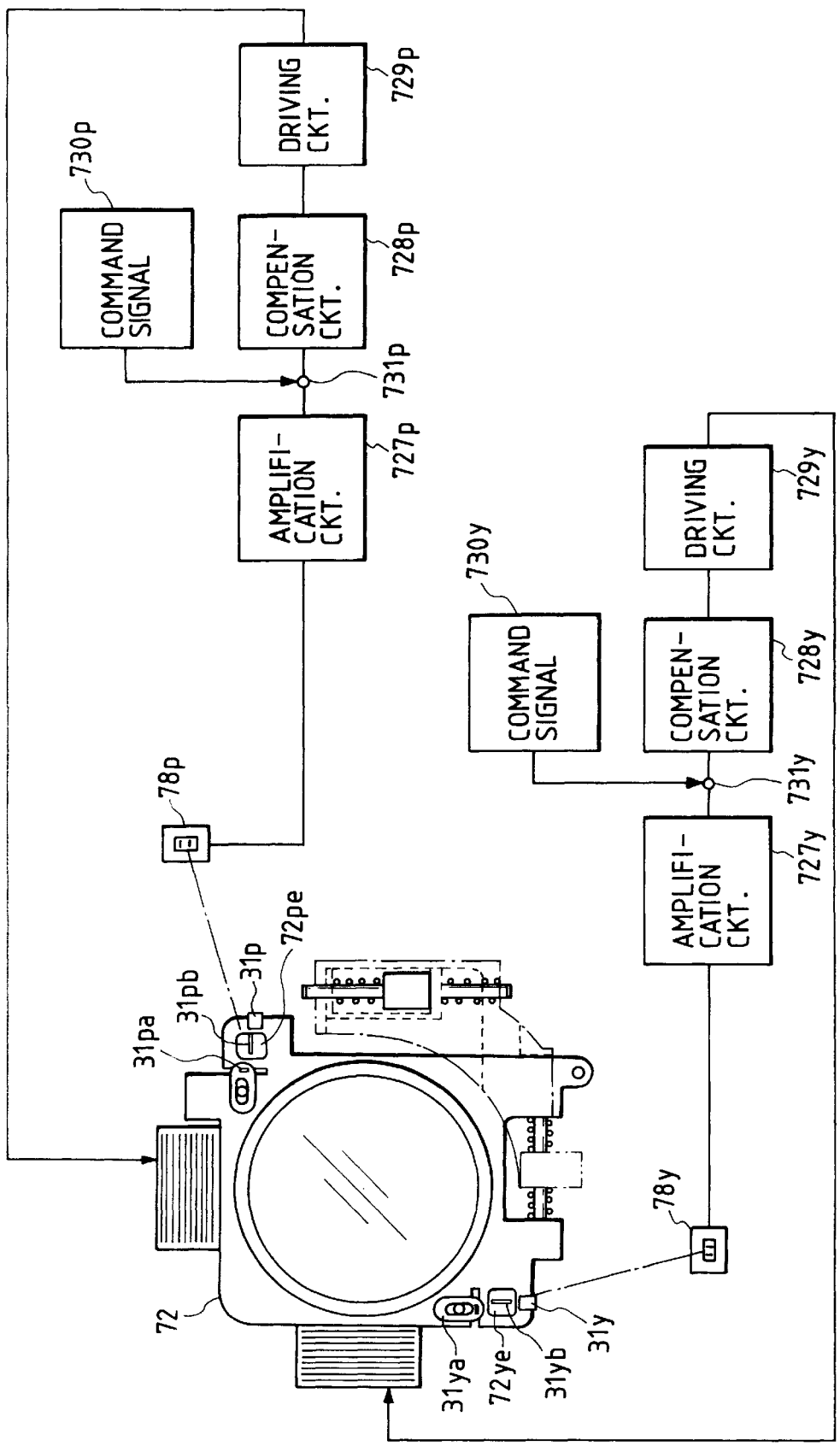
FIG. 5 is a schematic diagram showing principal portions of the image blur prevention apparatus according to the first embodiment of the present invention.

FIG. 5 is a schematic diagram showing principal portions of an image blur prevention apparatus according to the third embodiment of the present invention. For simplicity, in FIG. 5, the same portions as FIGS. 34 and 1A to 4 are denoted by the same reference numerals.

As shown in FIG. 5, in the third embodiment, a support frame 72 has holes 72pe and 72ye for light emitting devices 76p and 76y (not shown in FIG. 5). Slit plates 31p and 31y have slits 31pb and 31yb, respectively. The slit plates 31p and 31y are fitted to the support frame 72. The support frame 72 has an arm portion 31p. The arm portion 31p has an elongate hole 31pb. With the elongate hole 31pb, as with the construction shown in FIG. 3, the positions of the slits 31pb and 31yb are adjusted. Thus, the same effects as the first and second embodiments can be obtained.

(Fourth Embodiment)

Figure 6:
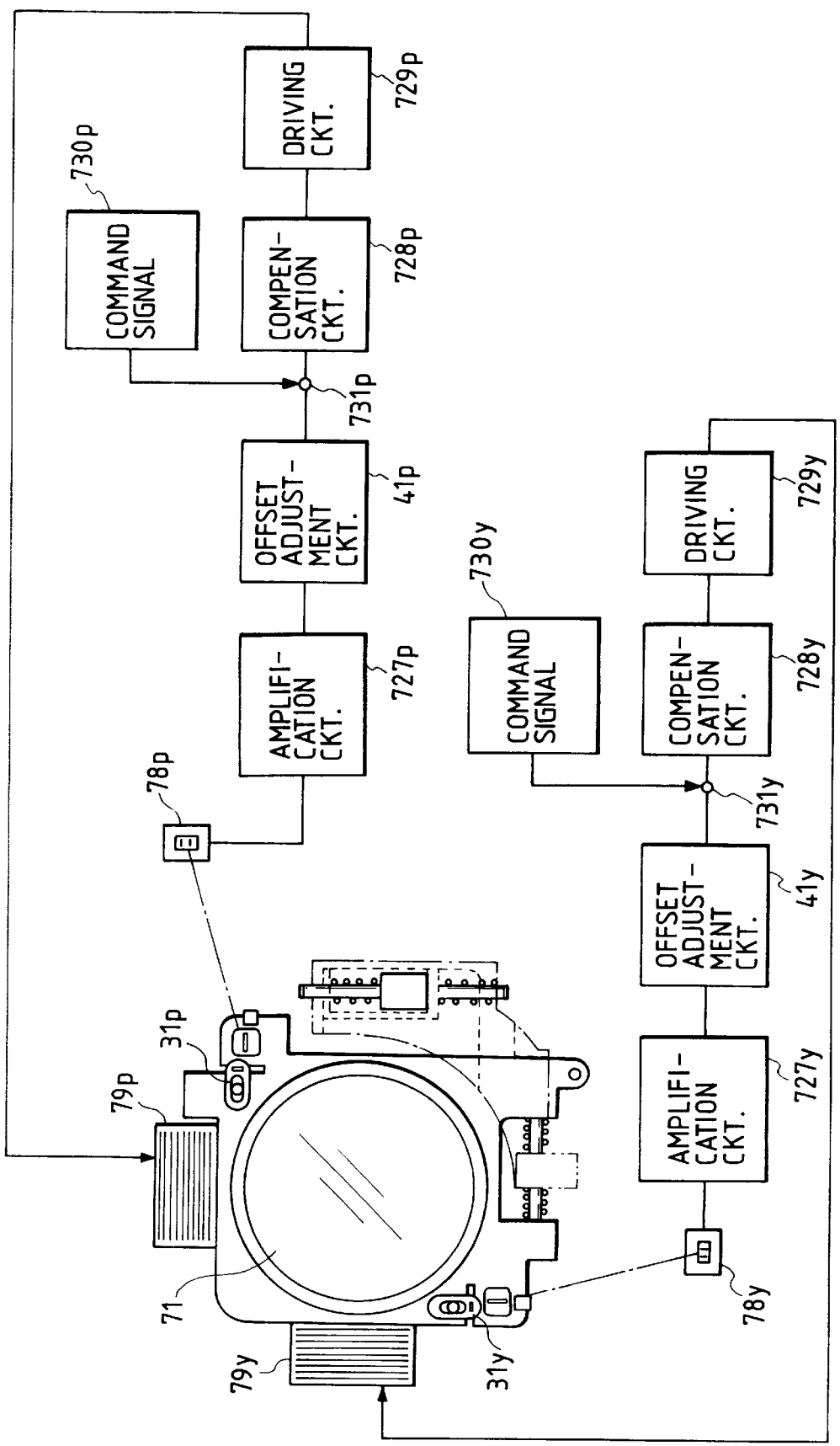
FIG. 6 is a schematic diagram showing principal portions of an image blur prevention apparatus according to a third embodiment of the present invention.

FIG. 6 is a schematic diagram showing principal portions of an image blur prevention apparatus according to a fourth embodiment of the present invention. For simplicity, in FIG. 6, the same portion as the third embodiment (FIG. 5) are denoted by the same reference numeral.

As shown in FIG. 6, in the fourth embodiment, offset adjustment circuits 41p and 41y are disposed on respective output sides of position detection devices 78p and 78y. The outputs of the position detection devices 78p and 78y are electrically offset so as to adjust output zero points. With the slit plates 31p and 31y, the position adjustment is performed so as to coarsely match the balance point of springs with zero points of position detection devices. Thereafter, with the offset adjustment circuits 41p and 41y, outputs are finely adjusted so as to reduce the amount of currents that flow in coils 79p and 79y. Thus, the power consumption can be much reduced.

In this case, without the necessity to adjust the slit plates 31p and 31y, with the offset adjustment circuits 41p and 41y, the balance point of the springs can be matched with the output zero points of the position detection devices 78p and 78y through the offset adjustment circuits. However, when the adjustments are performed only with the offset adjustment circuits 41p and 41y rather than the slit plates 31p and 31y, if output edges of the position detection devices 78p and 78y are set at zero, a drive detecting stroke cannot be obtained. Thus, with the slit plates 31p and 31y, the course adjustments are required.

However, when the detection stroke of the position detection devices 78p and 78y is large, the slit plates 31p and 31y, which serve as the position adjustment means, can be omitted, thereby simplifying the construction and reducing the size.

(Fifth Embodiment)

Figure 7:
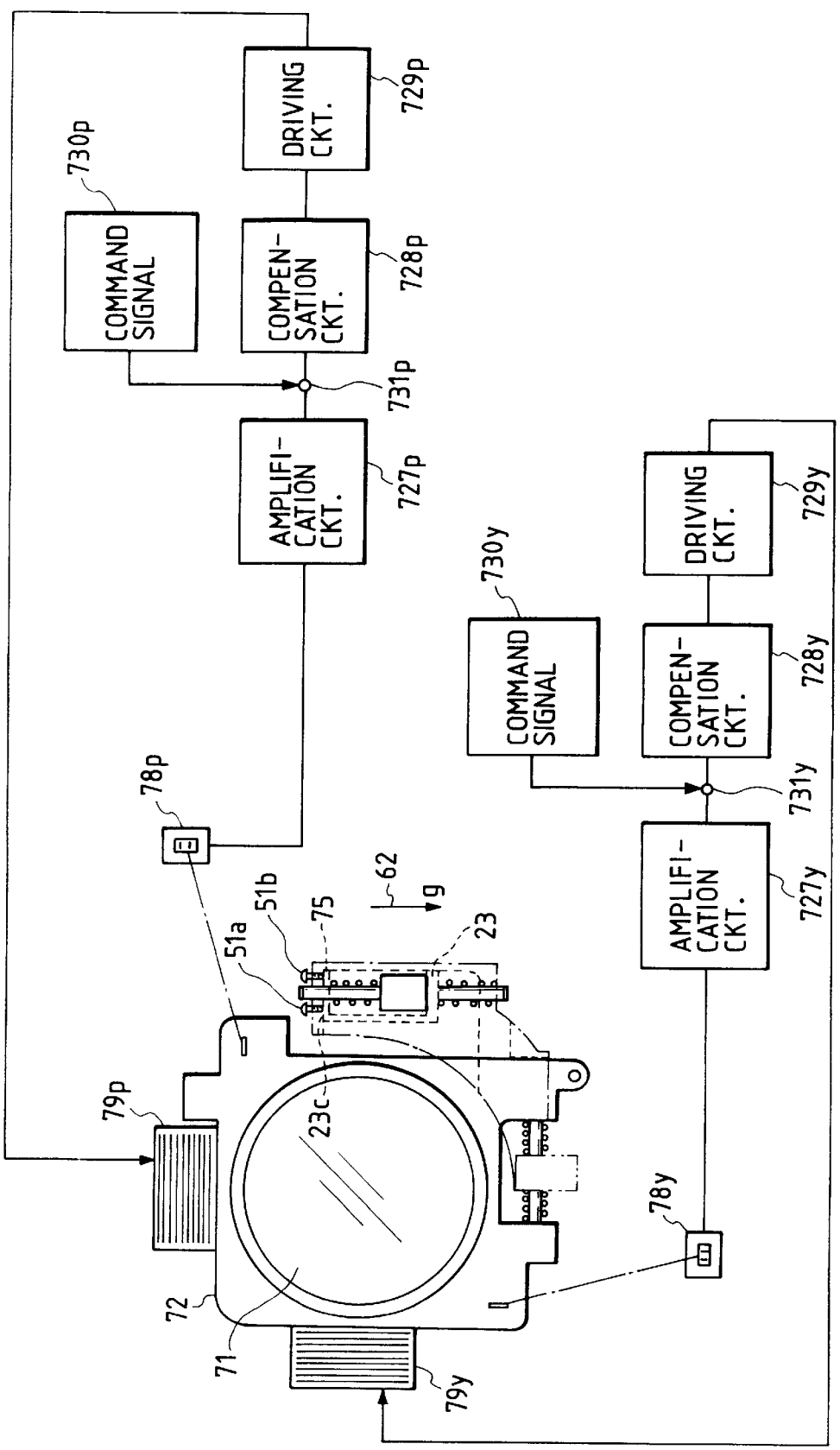
FIG. 7 is a schematic diagram showing principal portions of an image blur prevention apparatus according to a fourth embodiment of the present invention.

FIG. 7 is a schematic diagram showing principal portions of an image blur prevention apparatus according to a fifth embodiment of the present invention. For the simplicity, FIG. 7, the same portions as FIGS. 34 and 1A to 6 are denoted by the same reference numerals.

In the fifth embodiment, the balance position of springs instead of the position of a position detection means are adjusted.

In FIG. 7, screws 51a and 51b are secured to an upper end of a support arm 75. When the screws 51a and 51b are turned, they are raised or lowered from or to the support arm 75. Forward ends of the screws 51a and 51b are in contact with a top end portion 23c of a pre-charge member 23. Thus, when the screws 51a and 51b are turned, the support arm 75 is raised or lowered from or to the pre-charge member 23. In other words, with the screws 51a and 51b, the balance point of springs can be adjusted. Thus, while the output of a position detection device 78p is being observed, the screws 51a and 51b are turned so that the output of the position detection device 78p becomes zero.

Figure 31:
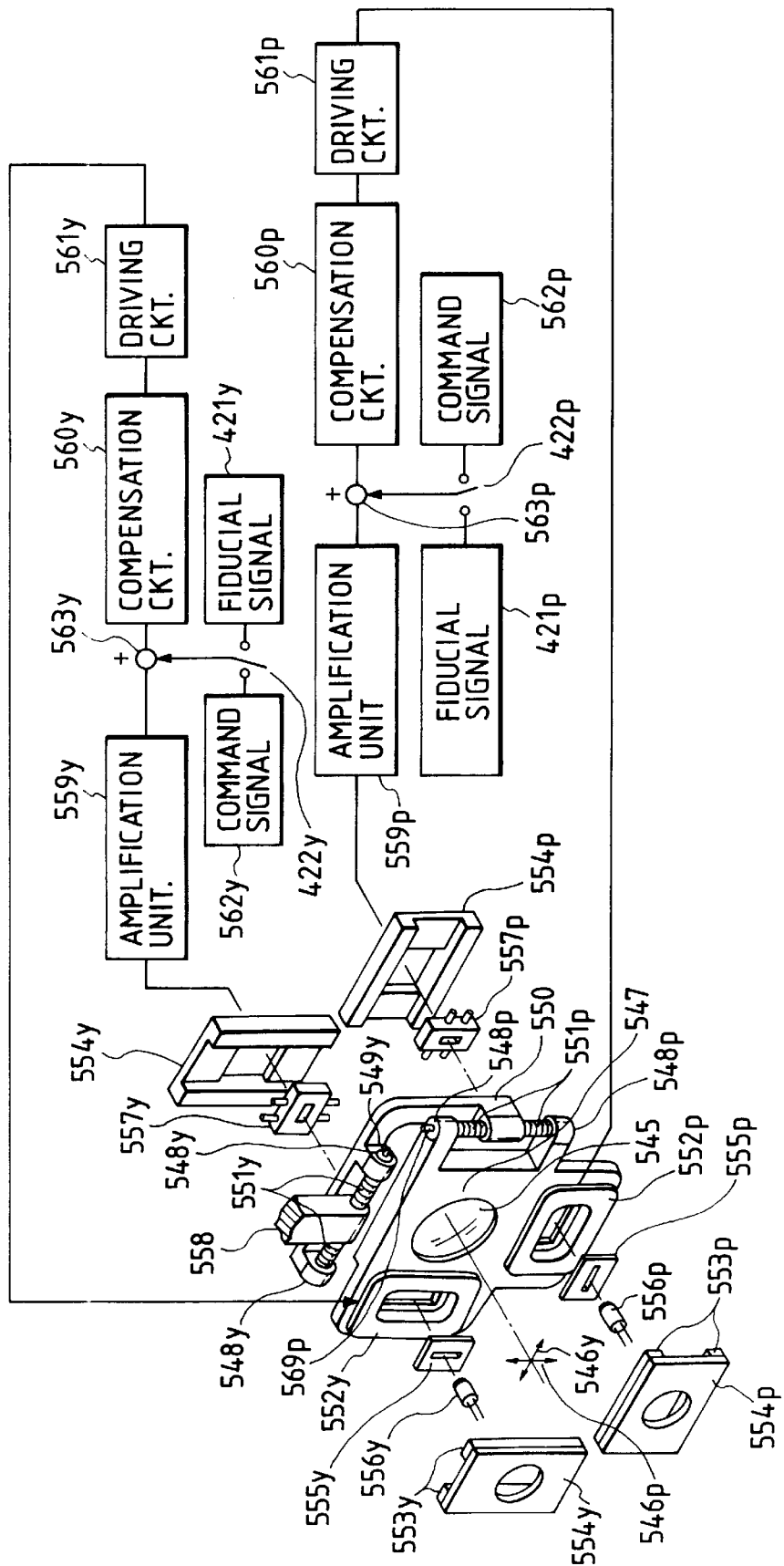
FIG. 31 is a schematic diagram showing a construction of a correction optical mechanism and its drive means of FIG. 30.

As described in the related art reference shown in FIG. 31, position detection devices 78p and 78y are adhered to a flexible board 716. In this construction, to perform position adjustment, the flexibility of the flexible board 716 should be used. Thus, the flexible board 716 is adversely affected. In addition, light emitting devices 76p and 76y are connected to edge portions 716pa and 716pb of the flexible board 716 with polyurethane copper cables, respectively. Thus, the position adjustment adversely affects the polyurethane copper cables. However, when the balance point of the springs shown in FIG. 7 is adjusted, such problems can be solved.

When the spring construction shown in FIGS. 2 to 7 (namely, the pre-charge construction with the pre-charge member) is applied to the construction of CAF No. 10655, the power against gravity in any gravity condition can be reduced. In addition, a correction optical means free of deviation of optical axis against drive center position of an auxiliary lens can be obtained.

According to the above-described embodiments, since the adjustment means (the position adjustment bases 11p and 11y, the light emitting device holders 21p and 21y, the slit plates 31p and 31y, the offset adjustment circuits 41p and 41y, and the screws 51a and 51b) that adjusts the outputs in the drive direction of the position detection means (the light emitting devices 76p and 76y, the slits 77p and 77y, and the position detection devices 78p and 78y) that detects the relative positions of the correction optical means and the lens barrel 710 is provided, a current that flows in the coil 91p against gravity is not required. In addition, since the coil springs that elastically support the correction optical means are pre-charged by the pre-charge member 23, the balance position of the correction optical means can be accurately set.

As described above, according to the first to fourth embodiments, the adjustment means that adjusts the output of the position detection means that detects the relative positions of the correction optical means and the lens barrel is provided. Since the outputs of the position detection by the adjustment means is adjusted, the influence of gravity applied to the correction optical means can be eliminated.

Consequently, a drive current that flows in the correction optical means against gravity can be eliminated.

In addition, according to the first to fourth embodiments, the correction optical means is disposed between the second elastic member and the first elastic member pre-charged by the pre-charge member in the drive direction of the correction optical means. Thus, the correction optical means is relatively and elastically supported against the lens barrel. Alternatively, the correction optical means is disposed between the first elastic member and the second elastic member in the drive direction. The spring constant of the first elastic member is larger than the spring constant of the second elastic member. Thus, the correction optical means is relatively and elastically supported against the lens barrel. The relative position of the correction optical means against the lens barrel is set by the elastic members.

Figure 8:
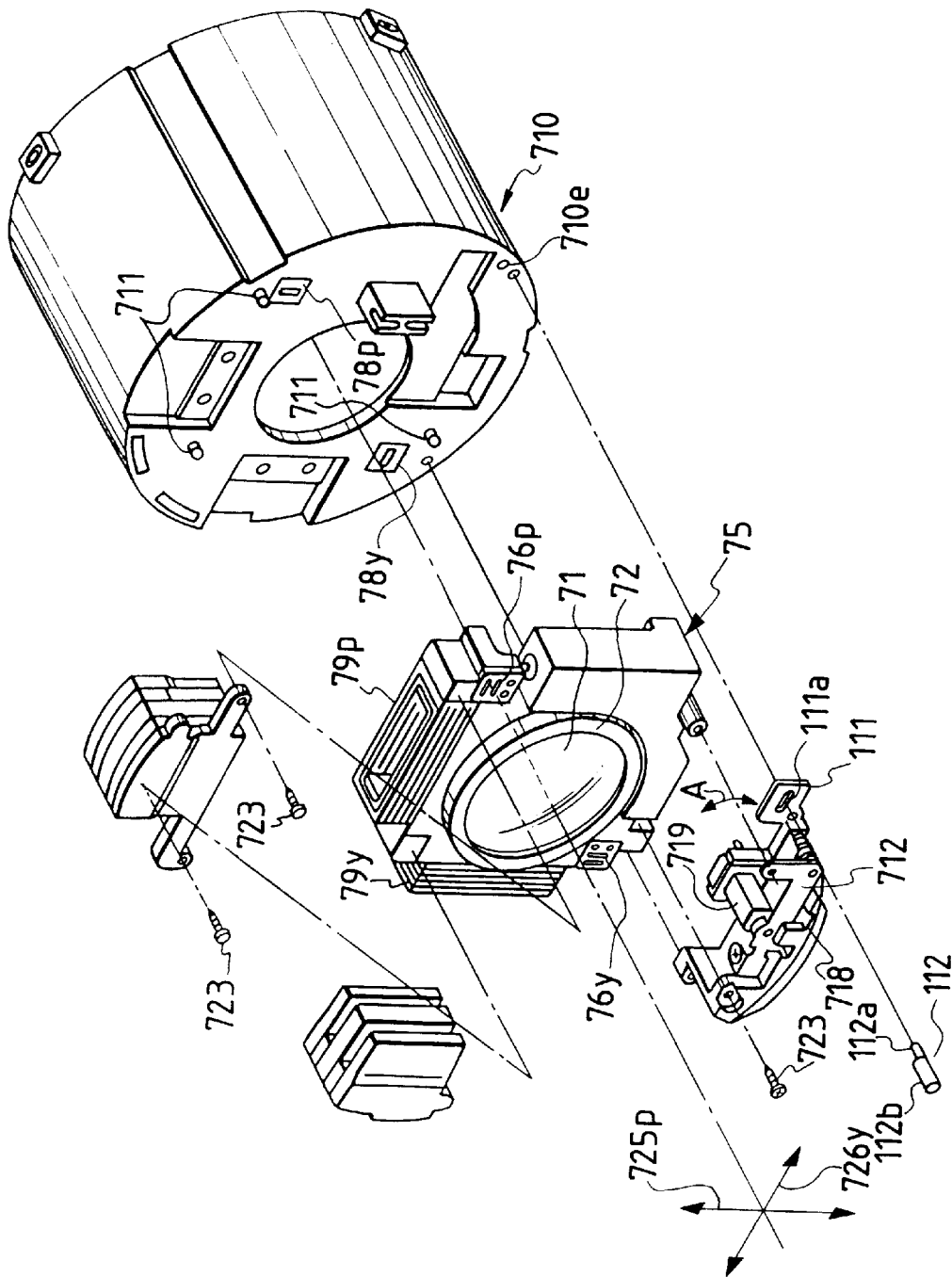
FIG. 8 is a schematic diagram showing principal portions of an image blur prevention apparatus for use with a camera according to a fifth embodiment of the present invention.

FIG. 8 is a schematic diagram showing principal portions of an image blur prevention apparatus for use with a camera according to a fifth embodiment of the present invention. For the simplicity, in FIG. 8, the same portions as FIG. 31 are denoted by the same reference numerals.

In the fifth embodiment, an adjustment plate 111 that serves as a secured position adjusting means is disposed on a mechanical lock chassis 718.

The adjustment plate 111 has an elongated hole 111a. A cylindrical adjustment member 112b of an adjustment screw 112 is fitted to the elongated hole 111a. A lens barrel 710 has a hole 710e for the adjustment screw 112. A fitting portion 112a (that is eccentric against the adjustment member 112b) is fitted to the lens barrel 710.

The mechanical lock chassis 718 is temporally fitted to the lens barrel 710. When the adjustment screw 112 is inserted into the holes 111a and 710e and then turned, the mechanical lock chassis 718 is slightly moved toward the lens barrel 710 in the direction denoted by an arrow A.

Figure 9:
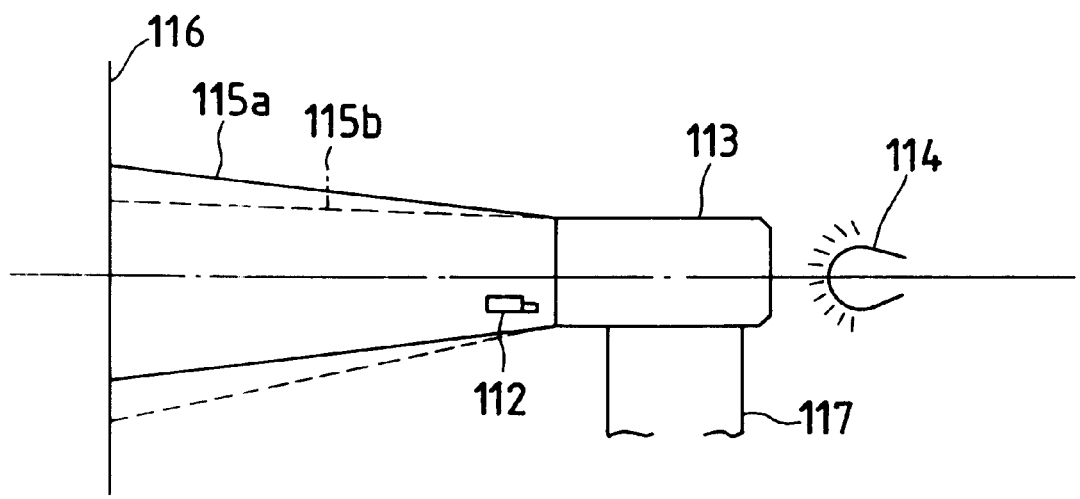
FIG. 9 is a schematic diagram for explaining a position adjustment method of a mechanical lock chassis against a lens barrel according to the fifth embodiment of the present invention.

FIG. 9 is a schematic diagram for explaining a position adjustment of the mechanical lock chassis 718 against the lens barrel 710 with the adjustment screw 112.

After the correction optical means 113 has been completed, the correction optical means 113 is secured to a base 117. A light source 114 on a lens mount side emits light to a screen 116. When the optical axis of a lens 71 of the correction optical means 113 accords with the optical axis of the lens barrel 710, light is projected on the screen 116 in a shape denoted by solid lines 115a. Otherwise, the light is projected on the screen 116 in a shape denoted by dashed line 115b.

By turning the adjustment screw 112, the shape of the emitted light is adjusted so that the light is projected on the screen in the shape denoted by the solid lines 115a. Thereafter, the mechanical lock chassis 718 is secured to the lens barrel 710.

Thus, while the image blur prevention function is not working, since the optical axis of the correction optical means accords with the optical axis of the lens barrel, the orientation of the camera accords with the object. As a result, even if the user photographs an object without observing the finder, the frame does not remarkably vary regardless of whether or not the image blur prevention function is working.

(Sixth Embodiment)

Figure 10B:
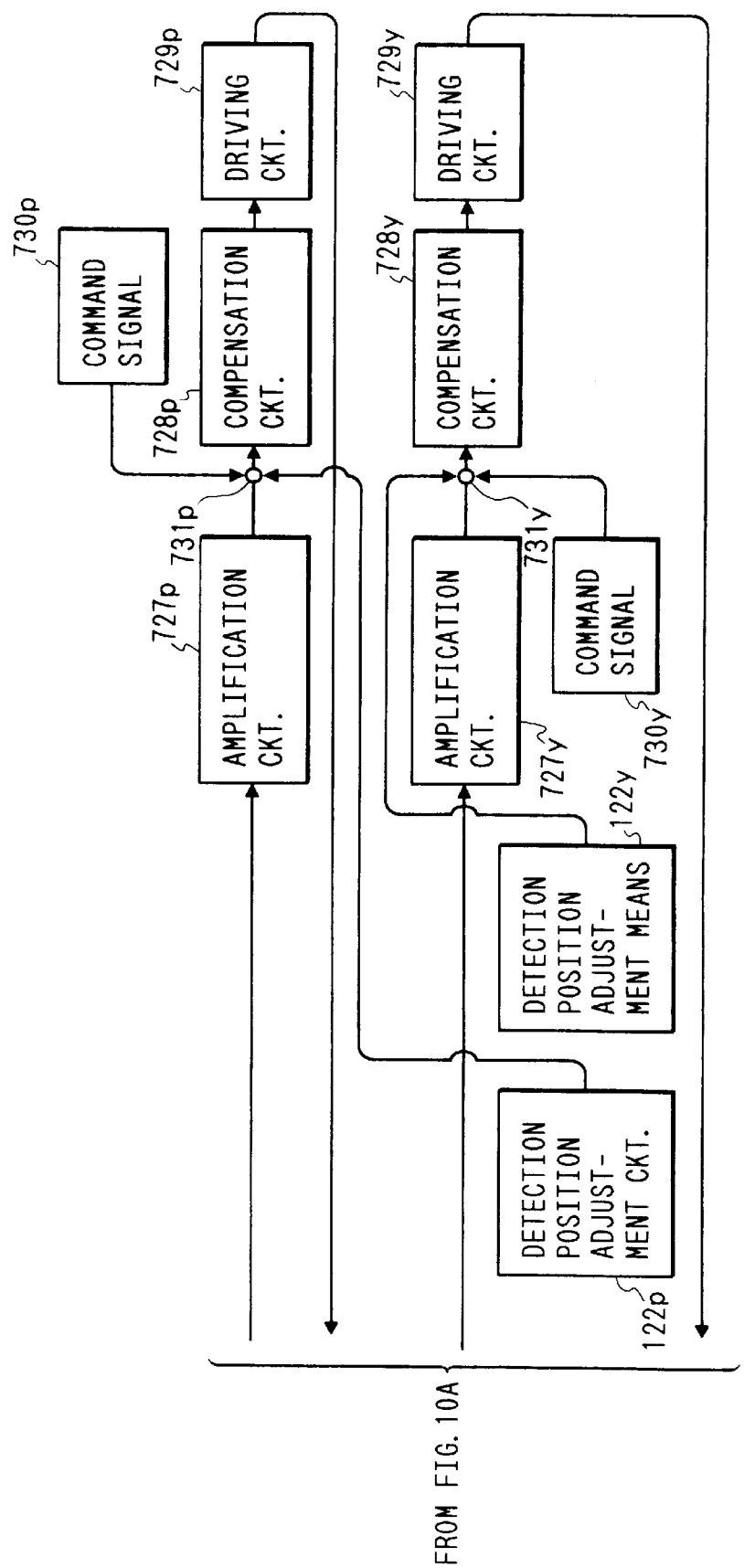
FIG. 10 is comprised of FIGS. 10A and 10B showing schematic diagrams of principal portions of an image blur prevention apparatus for use with a camera according to a sixth embodiment of the present invention.

FIGS. 10A and 10B are schematic diagrams showing principal portions of an image blur prevention apparatus for use with a camera according to a sixth embodiment of the present invention. For simplicity, in FIGS. 10A and 10B, the same portions as FIG. 8 are denoted by the same reference numerals.

In the sixth embodiment, a mechanical lock chassis 718 does not have an adjustment plate 111. Instead, the mechanical lock chassis 718 has a hole 718a for a machine screw. The machine screw is inserted into the hole 718a so that the lens barrel 710 is secured to the mechanical lock chassis 718.

The diameter of the hole 718a is larger than the diameter of the machine screw. When the machine screw gets loose, the mechanical lock chassis 718 has a play in directions of arrows 725p and 726y against the lens barrel 710.

An outer portion 121a of an adjustment base 121 is fitted to an inner portion of the lens barrel 710. An inner portion 121b is fitted to a rear surface of a lens securing frame 72d. Thus, when the adjustment base 121 is assembled, a lens 71 can be aligned to the lens barrel 710. As a result, the optical axis of the lens 71 can be matched with the optical axis of other lenses of the lens barrel 710. In this condition, the correction optical means is secured by a securing means (mechanical lock). The mechanical lock chassis 718 is secured to the lens barrel 710 without any play. After the adjustment base 121 is removed, the adjustment is completed.

In FIGS. 10A and 10B, outputs of detection position adjustment means 122p and 122y are added to outputs of amplifying circuits 727p and 727y, respectively. The detection position adjustment means 122p and 122y add adjustable voltages to the amplifying circuits 727p and 727y, respectively. Thus, downstream of the amplifying circuits 727p and 727y, zero outputs of position detection devices 78p and 78y can be adjusted.

When the correction optical means is secured (namely, the secured position is adjusted), outputs of the amplifying circuits 727p and 727y that amplify outputs of the position detection devices 78p and 78y are added to outputs of the detection position adjustment means 122p and 122y (without command signals 730p and 730y). While the added outputs are being observed, the voltages of the detection position adjustment means 122p and 122y are adjusted.

In this construction, the position of the correction optical means that is secured does not vary from the position of the correction optical means that is not secured (while the image blur prevention function is working). Thus, a frame does not vary depending on whether or not the image blur prevention function is working. As a result, a complicated operation for correcting the frame can be eliminated.

When the position of the correction optical means is controlled in the same manner as the related art reference, it is balanced when the outputs of the position detection devices 78p and 78y become almost zero. However, as shown in FIG. 11, the position of the correction optical means slightly deviates due to the gravity applied thereto.

Figure 11:
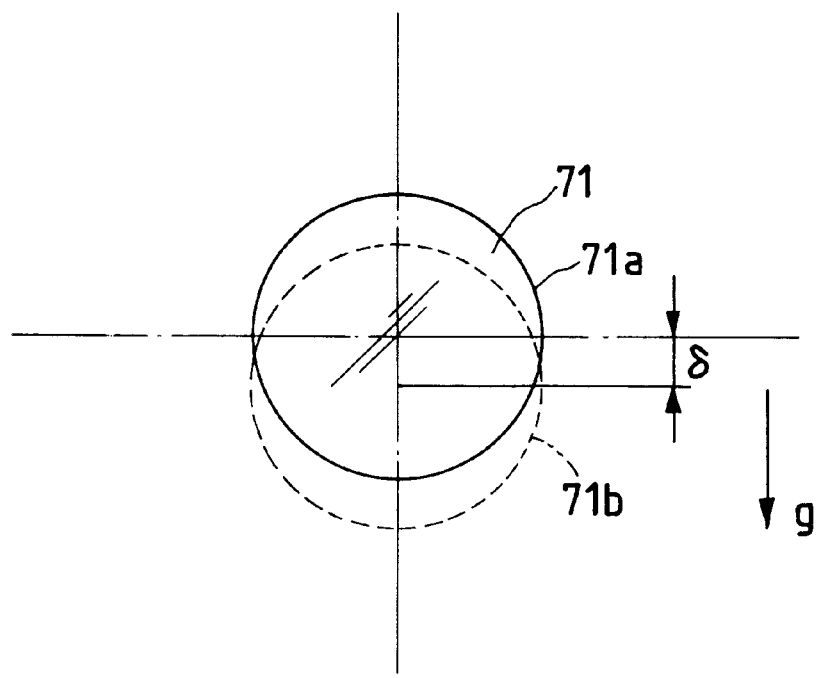
FIG. 11 is a schematic diagram for explaining a correction optical means of FIGS. 10A and 10B that is gravitated.

In FIG. 11, when the position of the correction optical means is controlled, if the gravity is not applied thereto, the lens 71 is placed at a position denoted by a solid line 71a. If the gravity g is applied to the correction optical means, the lens 71 moves to a position denoted by a dotted line 71b. Since the position of the correction optical means is controlled by an electric spring constructed of a coil and magnet, it is easily found that distortion δ takes place due to the gravity g. Since the force of the electric spring is very large, the amount of distortion δ due to the gravity is as small as for example 0.1 mm.

However, this small amount of deviation may affect a frame depending on whether or not the correction optical means is secured and whether or not the correction optical means is working.

In FIGS. 10A and 10B, when the correction optical means is secured, the detection position adjustment means 22p adds an output equivalent to the distortion δ to an output of the position detection device 78p. Thus, when the correction optical means is turned on, the secured position accords with the center position of the correction optical means. As a result, the frame does not vary regardless of whether or not the image blur prevention function is working.

The direction of the gravity g varies depending on the posture of the camera. Thus, the amount of the distortion δ also varies. However, in most cases, the gravity is applied as shown in FIGS. 10A and 10B. Even if the gravity is applied in different direction, the amount of distortion is small.

(Seventh Embodiment)

Figure 12:
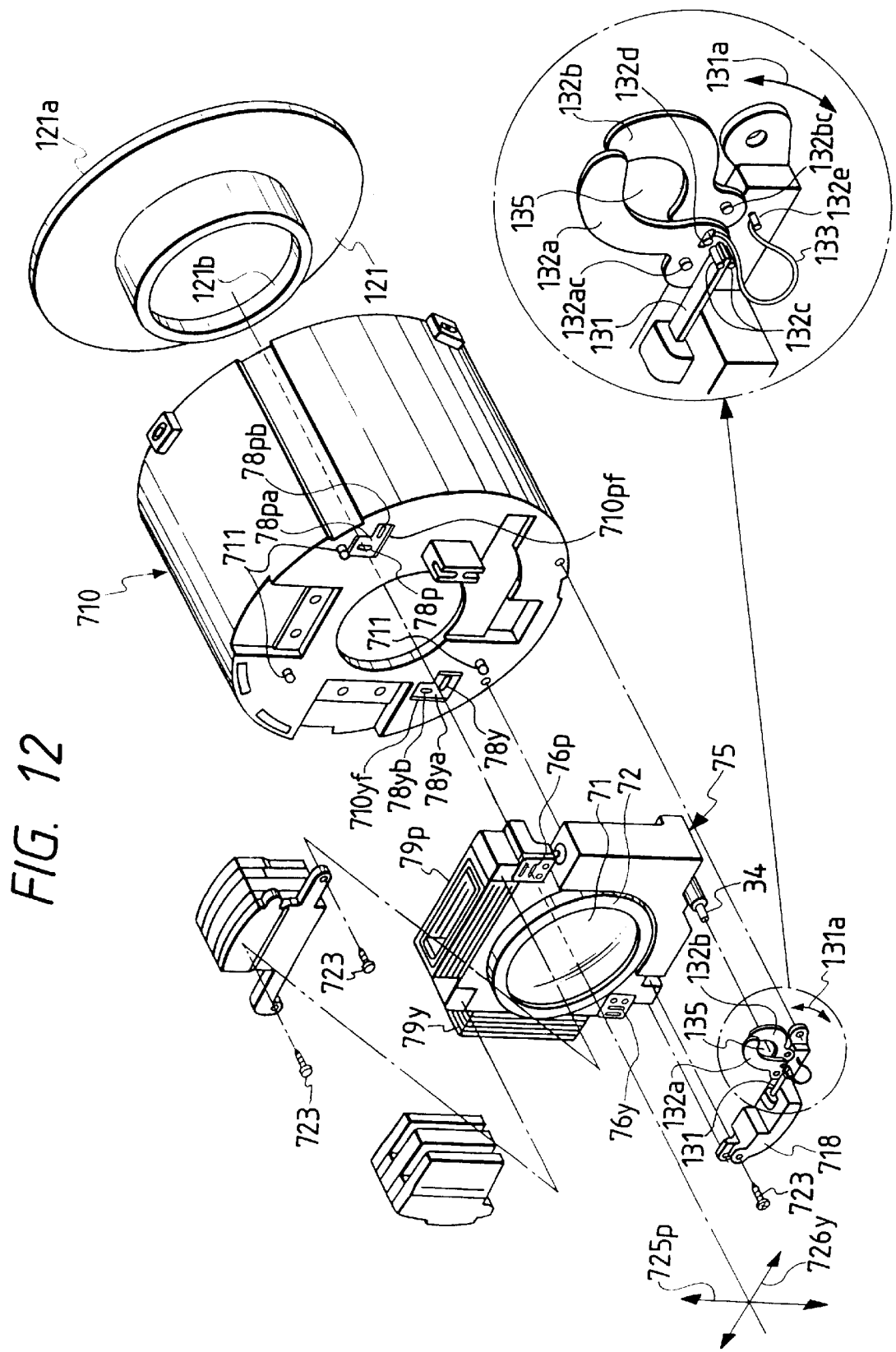
FIG. 12 is a schematic diagram showing principal portions of an image blur prevention apparatus for use with a camera according to a seventh embodiment of the present invention.

FIG. 12 is a schematic diagram showing principal portions of an image blur prevention apparatus for use with a camera according to a seventh embodiment of the present invention. For the simplicity, in FIG. 12, the same portions as FIGS. 8 to 10B are denoted by the same reference numerals.

The seventh embodiment differs from the fifth and sixth embodiments in the construction of a securing means and portions that perform zero adjustments of outputs of position detection devices 78p and 78y.

In FIG. 12, a mechanical lock chassis 718 is provided with known lens-shutter-shaped limit plates 132a and 132b. The limit plates 132a and 132b are rotated about shafts 132ac and 132bc on the mechanical lock chassis 718, respectively. The limit plates 132a and 132b are moved by a pin 132d. As with a lens shutter, the limit plates 132a and 132b vary the size of a hole 135. A toggle spring 133 is fitted to the pin 132d and a pin 132e on the mechanical lock chassis 718 so as to tension the limit plates 132a and 132b. Thus, the size of the hole 135 is increased or decreased.

The mechanical lock chassis 718 is provided with a piezo-bimorph element 131. When a voltage is applied to the piezo-bimorph element 131, it moves in the direction of an arrow 131a. A free end of the piezo-bimorph element 131 is surrounded by two pins 132c on the limit plate 132a. When a voltage is applied to the piezo-bimorph element 131, the size of the hole 135 of the limit plates 132a and 132b is increased or decreased.

A support frame 72 has a pin 134. The diameter of the pin 134 is slightly larger than the diameter of the small size of the hole 135 formed by the limit plates 132a and 132b. The pin 134 is surrounded by the limit plates 132a and 132b. When the hole 135 becomes large, the pin 134 freely moves in the hole 135. In other words, when a voltage is applied to the piezo-bimorph element 131 and a small size of the hole 135 is formed by the limit plates 132a and 132b, the correction optical means is secured. In contrast, when the large size of the hole 135 is formed by the limit plates 132a and 132b, the correction optical means is not secured.

As shown in FIG. 3, when the mechanical lock chassis 718 is secured to the lens barrel 710, with the adjustment base 21, the optical axis of the lens 71 is matched with the optical axis of the lens barrel 710 while the correction optical means is secured.

The position detection devices 78p and 78y are fitted into cavity portions 710pf and 710yf of the lens barrel 710, respectively. The position detection devices 78p and 78y have elongate holes 78pb and 78yb, respectively. Adjusting plates 78pa and 78ya that serve as masks are secured to the position detection devices 78p and 78y. As with the embodiment shown in FIG. 8, with adjustment screws 12, the positions of the position detection devices 78p and 78y to the lens barrel 710 can be adjusted.

In other words, while the correction optical means is secured, the positions of the position detection devices 78p and 78y are adjusted so that outputs of amplifying circuits 727p and 727y (not shown in FIG. 12) become zero or predetermined values.

As with the sixth embodiment of the present invention, when an output adjustment is electrically performed, since the output zero position deviates, the stroke is unbalanced. The drive stroke of the correction optical means deviates from the detection stroke of the position detection devices. However, as with the sixth embodiment, when the positions of the position detection devices 78p and 78y are adjusted, an unbalance does not take place in the stroke.

(Eighth Embodiment)

Figure 13B:
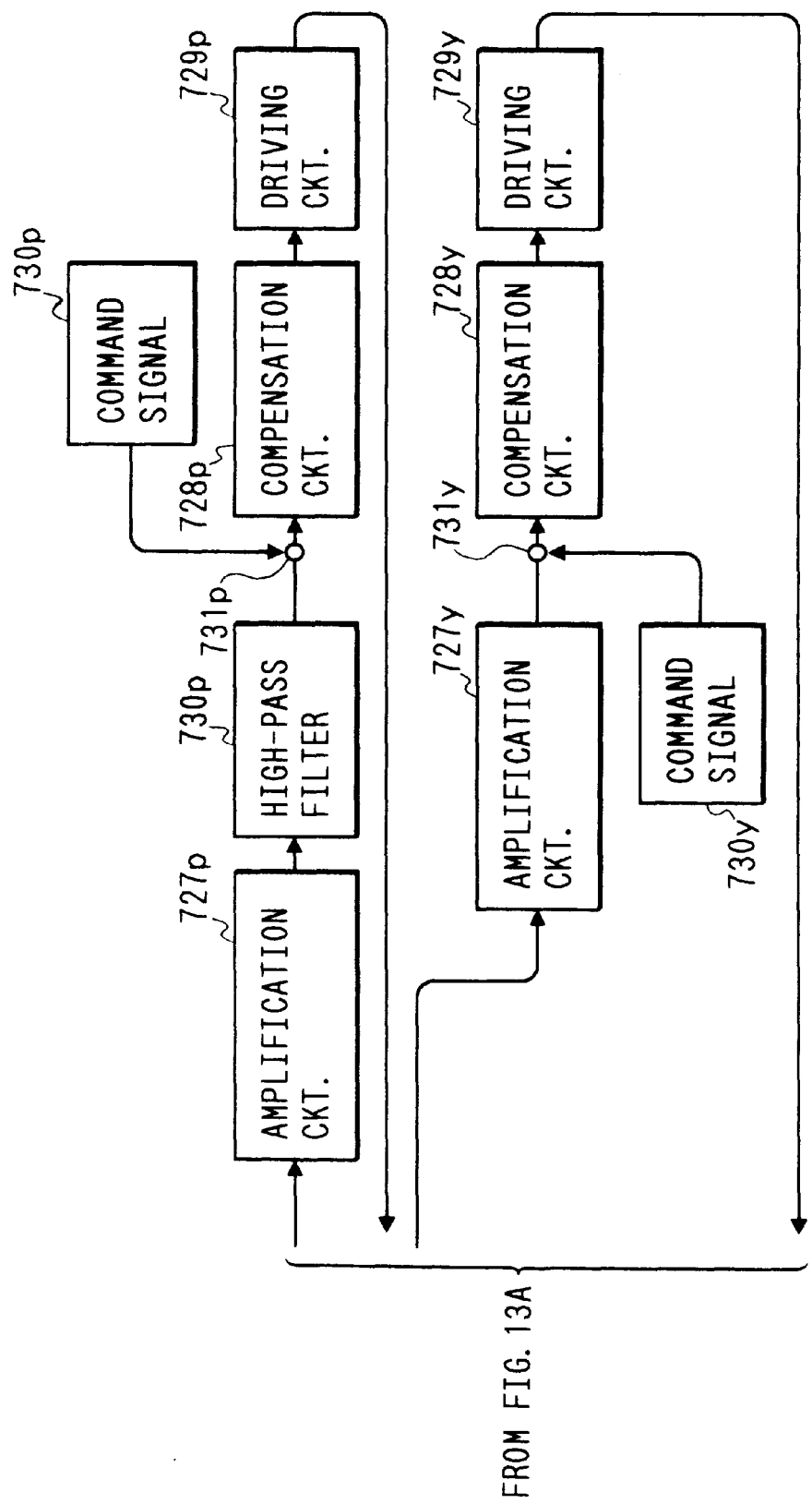
FIG. 13 is comprised of FIGS. 13A and 13B showing schematic diagrams of principal portions of an image blur prevention apparatus for use with a camera according to an eighth embodiment of the present invention.

FIGS. 13A and 13B are schematic diagrams showing principal portions of an image blur prevention apparatus for use with a camera according to an eighth embodiment of the present invention. For the simplicity, in FIGS. 13A and 13B, the same portions as the embodiment shown in FIG. 8 are denoted by the same reference numerals.

The construction of a securing means according to the eighth embodiment is the same as the construction of the securing means shown in FIG. 12. In the eighth embodiment shown in FIGS. 13A and 13B, a high-pass filter 730p is disposed between an amplifying circuit 727p and an addition circuit 731p for a position control loop in a direction 725p.

Thus, this position control does not work for force of a DC component such as gravity. However, the position control works for an alternating command signal such as vibration. However, since the position control does not work for the gravity g, the correction optical means is gravitated in the direction of the gravity g. A spring 137 elastically supports the correction optical means against the gravity g. The spring 137 is disposed between protruded portions 710g and 710h of the lens barrel 710.

One end of the spring 137 is fitted into a hole 138a of an adjustment table 138. By turning a screw 139, the adjusting table 138 is raised or lowered to or from the protruded portion 710h.

A wedge 136 is disposed on a support arm 75. The wedge 136 is placed between pitches of the spring 137. The spring 137 causes the support arm 75 to be placed at a balance point against the gravity.

The balance point can be finely adjusted by turning the screw 139 (this is because the length of the spring 137 varies). In addition, the balance position of the correction optical means against the lens barrel 710 can be coarsely adjusted depending on the pitch position of the spring 137 at which the wedge 136 of the support arm 75 is placed. In other words, the spring balance position of the correction optical means can be coarsely and finely adjusted.

As described above, since the high-pass filter 730p is used, the correction optical means does not work for the gravity g. Thus, the correction optical means is supported by the spring 137. Consequently, a current that flows in a coil 79p for supporting the correction optical means against the gravity g can be eliminated. Thus, the power consumption can be reduced.

The correction optical means is moved based on the balance point of the spring 137. If the spring balance point deviates from the secured position of the correction optical means, a frame varies depending on whether or not the image blur prevention function is working. To prevent this problems with the wedge 136 and the screw 139, the balance point and the secured position are adjusted.

Thus, in the correction optical means, a framing does not vary depending on whether or not the image blur prevention function is working.

According to the fifth to eighth embodiments, since the secured position of the correction optical means accords with the optical axis of the lens barrel, the orientation of the camera accords with a photographed frame. Thus, even if the user does not observe the finder, he can take a picture without a strange feeling.

In addition, since the secured position of the correction optical means accords with the moving center position of the correction optical means while the image blur prevention function is working, a frame does not vary depending on whether or not the image blur prevention function is working. Thus, the user can be freed from complicated operation for correcting the frame.

As described above, according to the fifth to eighth embodiments, a secured position adjustment means adjusts a secured position of a correction optical means by a securing means against a lens barrel. A position detection means detects a relative moving position of the correction optical means against the lens barrel. A detection position adjustment means adjusts an output of the position detection means at the secured position of the correction optical means by the secured means. A position detection means detects a relative moving position of the correction optical means against the lens barrel. A position set means causes the secured position of the correction optical means by the secured means to be matched with an elastic support center position of the correction optical means.

Thus, the secured position of the correction optical means is matched with the optical axis of the lens barrel.

As a result, a frame does not vary depending on whether or not the image blur prevention function is working. Thus, the user can properly and quickly aim the camera at an object.

(Ninth Embodiment)

Figure 14B:
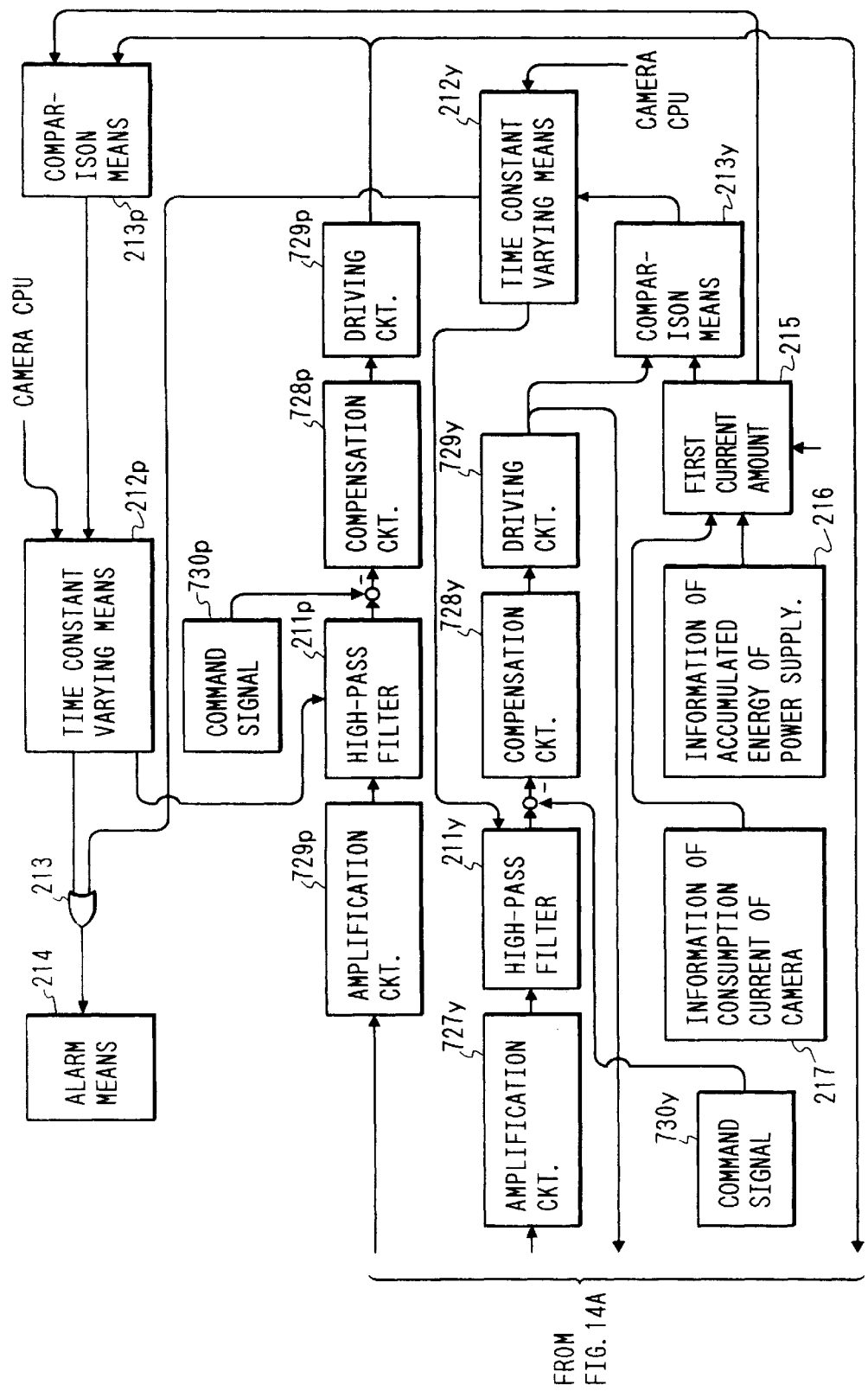
FIG. 14 is comprised of FIGS. 14A and 14B showing schematic diagrams of principal portions of an image blur prevention apparatus for use with a camera according to a ninth embodiment of the present invention.

FIGS. 14A and 14B are schematic diagrams showing principal portions of an image blur prevention apparatus according to a ninth embodiment of the present invention. In the ninth embodiment, known high-pass filters 211p and 211y are disposed in a position control loop. Time constants of the high-pass filters 211p and 211y can be varied by time constant varying means 212p and 212y, respectively. Operations of the time constant varying means 212p and 212y are controlled by comparison means 213p and 213y, respectively. Outputs of the comparison means 213p and 213y depend on an output of a first current amount generation circuit 215. The output (first current amount) of the first current amount generation circuit 215 depends on outputs of a power storage information output circuit 216 and a camera power consumption information output circuit 217.

An elastic rod (rubber rod) 218 is disposed in a lens barrel 710. The rod 218 is inserted into a hole 219 of a support frame 72. The diameter of the hole 219 is larger than the diameter of the rod 218. When the support frame 72 is displaced for a predetermined amount, the rod 218 is in contact with the hole 219. Thus, the support frame 72 is no more displaced. In this manner, a limit means is constructed.

In an apparatus without such a limit means, when the support frame 72 is largely displaced, coils 79p and 79y are brought into contact with magnets 713p and 713y, thereby breaking the coils 79p and 79y. Thus, with the limit means, such a problem can be solved.

Since the limit means is constructed of such an elastic member, when it limits the displacement of the support frame 72, abnormal sound does not take place and the constructional members are prevented from being damaged.

The support frame 72 is connected to a support arm 75 through a coil spring 310y (not shown in FIGS. 14A and 14B). The coil spring 310 serves as an elastic means. A moving center position of the support frame 72 is kept by force of the coil spring 310y. The support arm 75 is connected to the lens barrel 710 through a coil spring 310p that serves as an elastic means. A moving center position of the support arm 75 is kept by force of the coil spring 310p.

With reference to FIGS. 15 and 16A to 16D, spring characteristics of the coil spring 310p (the spring 310y, not shown) will be described.

In FIG. 16A, the coil spring 310p is shown. The coil spring 310p has a double-concave-lens shape. The thinnest portion of the coil spring 310p is in contact with a non-linear type spring support member 311p that is constructed of a rubber tube. The support frame arm 75 is connected to a nail portion 710a of the lens barrel 710 by force of the coil spring 310p and elastic force of the non-linear type spring support member 311p.

When the support arm 75 is displaced in a direction 312, the coil spring 310p is compressed and moves outward. Thus, the coil spring 310p is spaced apart from the non-linear type spring support member 311p. Consequently, the support arm 75 is supported only by spring force of the coil spring 310p. In other words, the support arm 75 is displaced, thereby lowering an increase ratio of the composite spring force.

Figure 15:
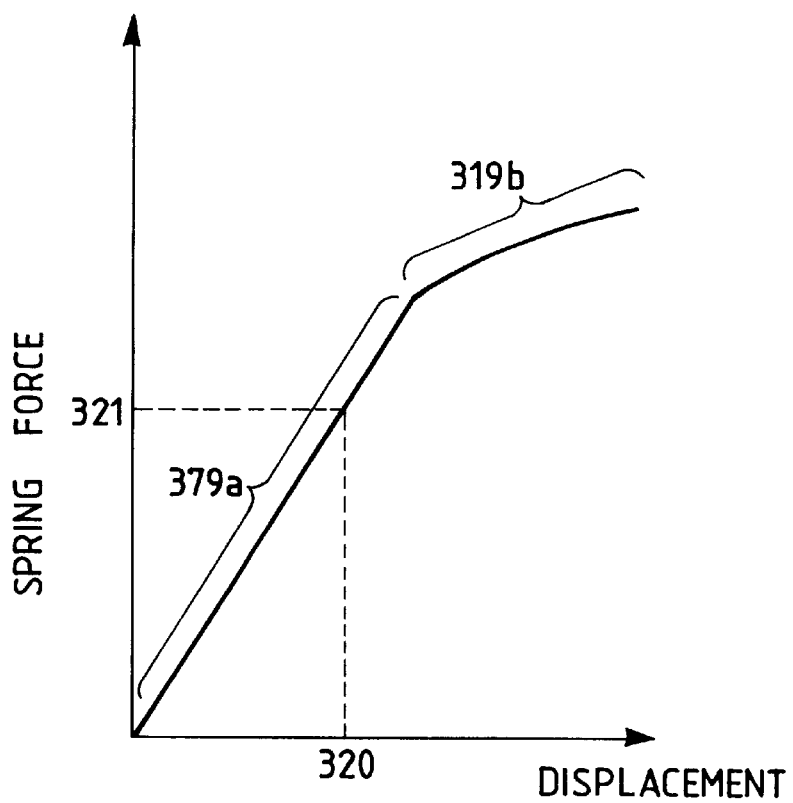
FIG. 15 is a graph showing characteristics of an elastic means disposed between a support frame and a support arm shown in FIGS. 14A and 14B.

FIG. 15 is a graph showing characteristics of the composite spring force. When the support arm 75 is displaced for a predetermined amount, the increase ratio of the spring force varies. In other words, the non-linear type spring takes place.

As shown in FIGS. 46A to 46C, when a correction optical means is supported by a spring, if the correction optical means is largely displaced so as to compensate vibration, the spring force correspondingly becomes strong, thereby requiring a large amount of power (see arrows 761 and 762 of FIGS. 46A to 46C). However, with the non-linear type spring, even if the correction optical means is largely displaced, the power consumption can be reduced.

In FIG. 16A, the support arm 75 is pressed to the nail portion 710a by a pair of springs 310p1 and 310p2. The force of the springs 310p1 and 310p2 causes the support arm 75 to be placed in the moving center position against the gravity g. When the support arm 75 is displaced in the direction 312, the spring 310p1 is compressed and thereby the increase ratio of the spring force lowers. However, the spring 310p2 does not apply force to the support arm 75.

Normally, when a pair of non-linear type springs are tensioned in a push-pull shape, the non-linear characteristics thereof are offset each other. Thus, these non-linear type springs work as liner springs. However, in such a construction, the non-linear characteristics of the springs are not offset.

As shown in FIG. 16B, a coil spring 313p may be curved. By adjusting the winding diameter and free length of the coil spring 313p, it can have non-linear characteristics. In this case, only the coil spring 313p is disposed between the support arm 75 and the nail portion 710a so as to cause the support arm 75 to be placed in a moving center position against the direction 314 of the gravity g.

As shown in FIGS. 16C1 and 16C2, even if a leaf spring 315p is disposed between the support arm 75 and the nail portion 710a, the non-linear characteristics as shown in FIG. 15 can be obtained (the leaf spring has non-linear characteristics as shown in FIG. 15).

In FIG. 16D, springs 317p1 and 317p2 having super elastic characteristics are used as non-linear type springs. The super elastic springs have an elastic region 319p and a super elastic region 319b shown in FIG. 15. The springs 317p1 and 317p2 are pre-charged to a point 320 of FIG. 15 by pre-charge members 316p1 and 316p2 extended from the nail portion 710a. The springs 317p1 and 317p2 press piece members 318p1 and 318p2 that slide on the pre-charge members 316p1 and 316p2, respectively.

The piece members 318p1 and 318p2 press the support arm 75. Spring force 321 (see FIG. 15) against the gravity g causes the support arm 75 to be placed at the center moving position. When the support arm 75 is displaced, the springs 317p1 and 317p2 are compressed through the piece members 318p1 and 318p2, respectively. Thus, the springs 317p1 and 317p2 have the super elastic characteristics. As a result, the increase ratio of the spring force lowers. As a result, even if the support arm 75 is largely displaced, the power consumption is not remarkably increased.

In addition, since the springs 317p1 and 317p2 are pre-charged by the pre-charge members 316p1 and 316p2, as with the construction shown in FIG. 16A, the springs 317p1 and 317p2 do not apply force to the support arm 75. Even if the support arm 75 is supported by the two non-linear type springs, the non-linear characteristics thereof are not offset. When one of the springs has a free end, even if they are not pre-charged, the non-linear characteristics of these springs are not offset. Thus, in this construction, it is not necessary to pre-charge the springs.

In the above description, the correction optical means is supported by non-linear type springs. However, it should be noted that a permanent magnet may be used as a means with non-linear characteristics.

Figure 17:
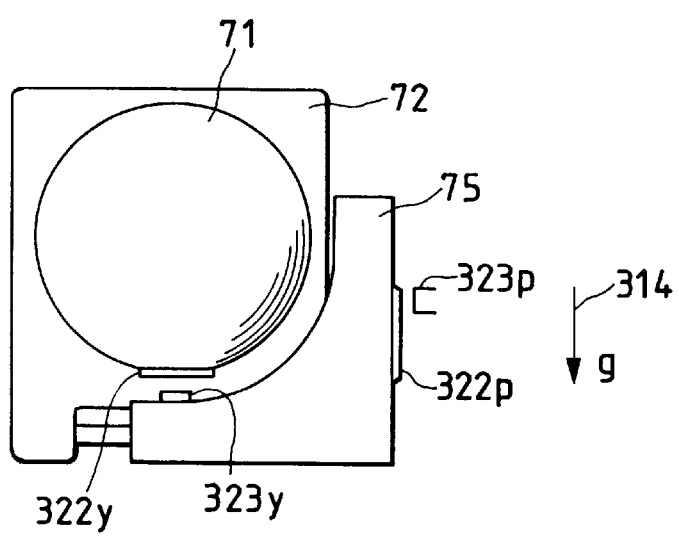
FIG. 17 is a schematic diagram showing the elastic means of FIGS. 16A to 16D constructed of a permanent magnet with non-linear characteristics.

FIG. 17 is a schematic diagram showing a construction using a permanent magnet as a means with non-linear characteristics.

A first surface 322y of a magnetic member is disposed on a support frame 72. A permanent magnet 323y as a second surface is disposed on a support arm 75. The first surface 322y and the second surface are magnetically coupled. A permanent magnet 323p as a second surface is disposed on a lens barrel 710. Likewise, a first surface 323p of a magnetic member disposed on the support arm 75 and a permanent magnet 323p disposed on a lens barrel 710 with a second surface are magnetically coupled.

The length of the first surface 322p, 322y is wider than the length of the permanent magnet 323p, 323y in the moving direction. The correction optical means freely moves for the length on the first surface in the moving direction without being affected by magnetic coupling force.

In FIG. 17, the correction optical means lowers due to the gravity g. The correction optical means is magnetically coupled with the permanent magnet 323p at an edge of the first surface 322p so as to support the correction optical means against the gravity g. To further move the correction optical means, thrusting force larger than the magnetic coupling force is required. The thrusting force is slightly larger than the dead weight of the correction optical means. Thus, a large amount of power is not required. When the first surface is displaced from the second surface, the magnetic coupling force weakens. The magnetic coupling force is inversely proportional to the square of the distance between the first surface and the second surface. Thus, even if the correction optical means is largely displaced, the power consumption is low.

In the directions 322y and 323y, which are free of the gravity g, the correction optical means can be freely moved in the length of the first surface. Thus, in these directions, power consumption is low.

Figure 18A:
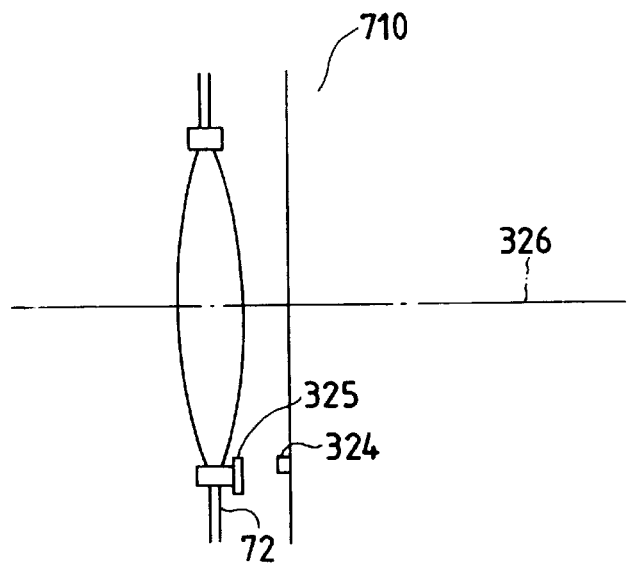
FIGS. 18A and 18B are a schematic diagram and a perspective view showing another example of the elastic means of FIGS. 16A to 16D constructed of a permanent magnet with non-linear characteristics.
Figure 18B:
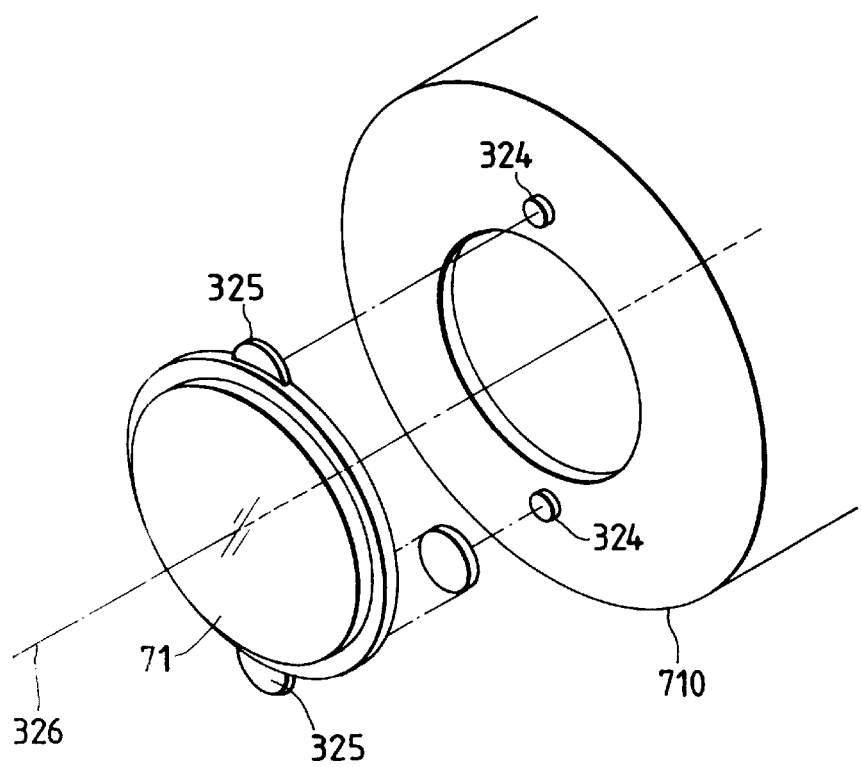

The present invention is not limited in such a construction. Rather, as shown in FIGS. 18A and 18B, a target surface (magnetic member 325) is disposed in a direction of an optical axis 326. A permanent magnet 124 is disposed on a lens barrel 710. The area of the target surface 325 is larger than the area of the permanent magnet 324. In addition, magnets 713p and 713y that produce thrusting force may be used in common with the permanent magnet.

Returning to FIGS. 14A and 14B, time constant varying timings of the high-pass filters 211p and 211y and the time constant varying means 212p and 212y will be described.

Figure 19:
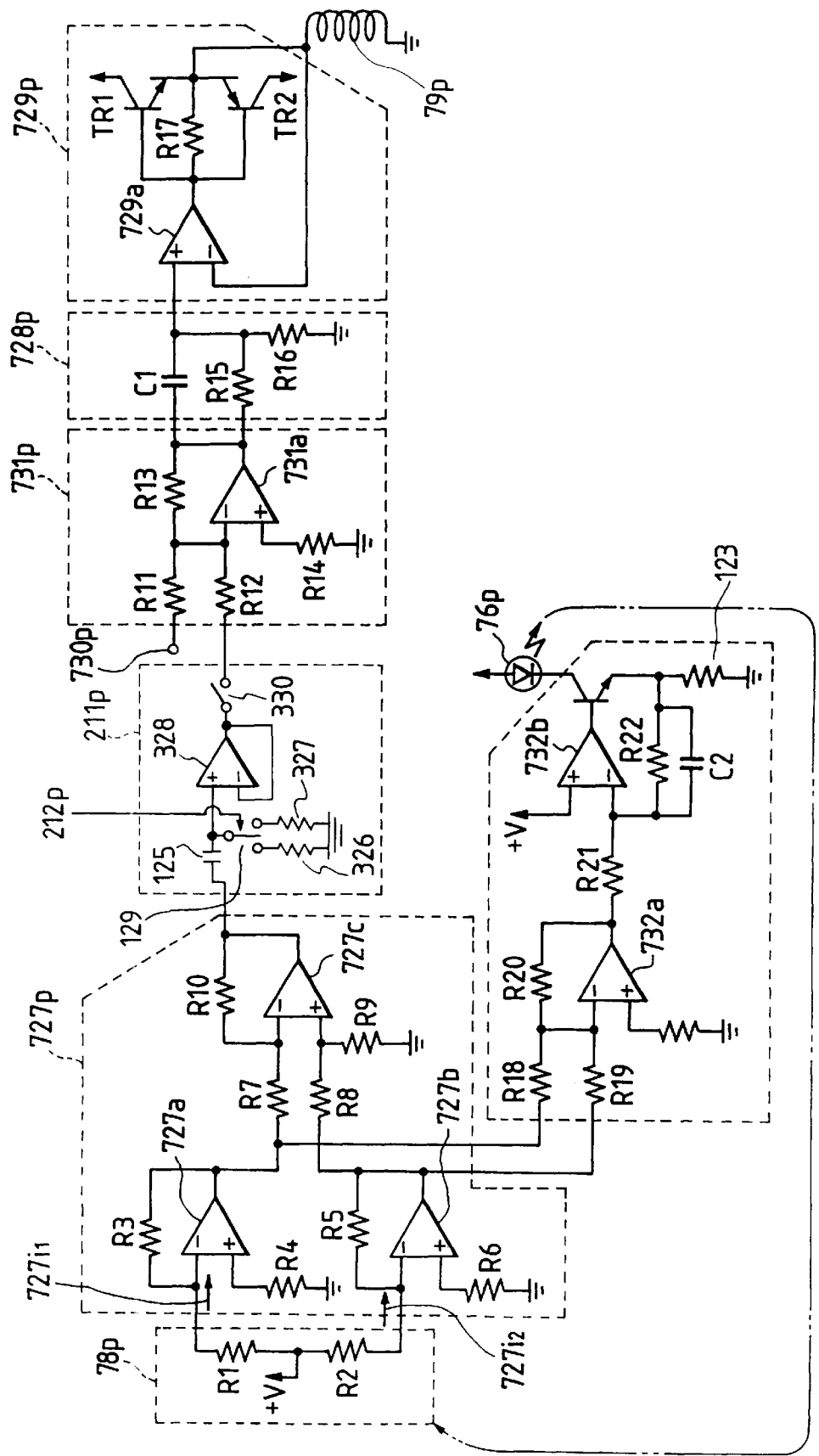
FIG. 19 is a circuit diagram showing a construction of a drive means of the correction optical means of FIGS. 14A and 14B.

In FIG. 19, a high-pass filter 211p (211y) is disposed in a position control loop of a correction-optical means. This high-pass filter is constructed of a condenser 325, and resisters 326 and 327. The capacitance of the condenser 325 is for example 1 μ. The resistance of the resistor 326 is for example 159 kΩ. The resistance of the resistor 327 is for example 15.9 kΩ. One of the resistors 326 and 327 is selected by a switch 329 and the selected resistor is connected to the condenser 325. This switch (analog switch) 329 is controlled by the time constant varying means 312p. Reference numeral 328 is an operational amplifier for a buffer. Reference numeral 330 is a switch that will be described later.

When the resistor 327 is connected to the condenser 325, the time constant of the high-pass filter is low. In this case, the high-pass filter attenuates frequency components of 10 Hz or low.

In FIGS. 20A and 20B, reference numeral 329G represents frequency characteristics of an output of the operational amplifier 328 corresponding to a command signal received from an input terminal 730p (20 log input/output, the switch 330 is turned off). FIG. 20A shows that outputs of frequency components of 10 Hz or lower are attenuated and outputs of frequency components of 10 Hz or higher are also attenuated. The frequency components that are attenuated depend on the weight of the correction optical means and the spring force. Thus, the peak of the outputs is at 10 Hz.

To prevent vibration, the switch 330 is closed so as to form a position control. In this. case, frequency characteristics vary as a curve 331G. In the frequency characteristics, a flat section 332 takes place. This flat section is referred to as correction optical means moving section. The frequencies of this section range from 5 Hz to 100 Hz. Thus, this section is insufficient for vibration section ranging from 1 Hz to 10 Hz. However, since the section 332 does not contain frequency components of 5 Hz or lower, the position control loop does not work for a DC component such as gravity g. In other words, the coil does not produce thrusting force against the gravity g.

When the correction optical means is initially driven, since it is affected by the gravity g as a step-shaped pulse, the coil produces the thrusting force against the gravity g. However, since the time constant of the high-pass filter is low, the coil immediately stops producing the thrusting force against the gravity g. (In the frequency characteristics denoted by the reference numeral 331G, frequency components of 1 Hz or less are attenuated.) Thus, the power consumption can be reduced.

Likewise, when the condenser 325 is connected to the resistor 326, while the switch is open, the frequency characteristics denoted by a curve 333G take place. (In this condition, the high-pass filter attenuates frequency components of 1 Hz or lower.) When the switch 330 is closed so as to form the position control loop, frequency characteristics denoted by a curve 334G take place. In this condition, the high-pass filter attenuates frequency components of 0.01 Hz or lower. Thus, a flat section 335 ranging from 0.1 Hz to 100 Hz takes place. In this condition, the high-pass filter satisfactorily covers the vibration section. In this condition, the high-pass filter attenuates a DC component such as gravity g (namely, frequency components of 0.01 Hz or lower). Thus, the coil does not produce thrusting force against the gravity g. However, since the time constant of the high-pass filter is high, it takes a long time to eliminate initial influence of the gravity g as a step-shaped pulse.

As clear from the relation between curves 329G and 331 and the relation between curves 333G and 334G, when the switch 330 is closed, the shape of the output is flattened (from arrow 336 to arrow 337) (these arrows are referred to loop gains). Thus, the attenuation inflection points vary from 10 Hz to 1 Hz and from 1 Hz to 0.01 Hz.

For example, since the loop gain of the arrow 336 is 40 dB (×100), the frequency at the attenuation inflection point varies from 1 Hz to 0.01 Hz. Thus, by adjusting the loop gain amount, the attenuation inflection point of the high-pass filter in the adjustment loop can be properly set.

FIGS. 21A to 21C show time constant varying timings. In FIG. 21A, a R2 section represents characteristics of a correction optical system in the case that the resistor 327 is connected to the condenser 325 and thereby the time constant is low (characteristics of curves 331G and 331ψ). The other sections represent characteristics of the correction optical system in the case that the resistor 326 is connected to the condenser 325 (curves 334G and 334ψ in FIGS. 20A and 20B).

In FIG. 21A, while the image blur prevention function is working, the correction optical means is placed in the R2 section. In this condition, initial gravity as a step-shape pulse is quickly eliminated. After a predetermined time period has elapsed, the time constant of the high-pass filter becomes large. This operation is performed by a CPU of the camera. The CPU sends predetermined commands to the time constant varying means 212p and 212y. Thus, since the initial gravity can be quickly eliminated, the power consumption can be reduced.

In the R2 section after the image blur prevention function has been turned on, command signals 730p and 730y are not input to the correction optical means. (The command signals are input when the release button is pressed by half. However, in the R2 section after the image blur prevention function has been turned on, even if the release button is pressed by half, the command signals are not input to the correction optical means.) In the R2 section after the image blur prevention function has been turned on, if a vibration signal is input, the high-pass filter cannot selectively eliminate the initial gravity g. In the R2 section, when the release button is pressed by half, the command signals 730p and 730y may be input to the correction optical means so as to perform the image blur prevention function.

As shown in FIG. 21C, when the lease button is pressed by half (SW1 is turned on), vibration command signals 338 and 339 are input. When the vibration command signals 338 and 339 largely deviate from their zero points 340 and 341 (see FIG. 21C), a current flows in a coil that produces thrusting force against the gravity and thereby the power consumption increases. The power consumption and an output of the first current amount generation circuit 215 are compared by comparison circuits 213p and 213y. The output of the first current amount generation circuit 215 depends on the battery consumption state and the total power consumption amount of the camera. When electricity is much consumed in the battery or the total power consumption amount is large, the first current amount decreases. When the power consumption of the correction optical means exceeds the first current amount, the time constant varying means 212p and 212y work and thereby the correction optical means is placed in the R2 section. In other words, the resistor 327 is connected to the condenser 325 and thereby the time constant becomes low.

In FIG. 21C, curves 338 and 339 represent that low frequency components due to vibration take place. Thus, in the R2 section, since the low frequency components are attenuated by a high-pass filter with a low time constant, as with curves 342 and 343, components that largely vary are eliminated. When the power consumption of the correction optical means becomes lower than the first current amount, as the characteristics of the high-pass filter, the time constant becomes large. When the posture of the camera is changed as shown in a section 144, as with the embodiment shown in FIGS. 39A and 39B, a large current flows in the correction optical means. When the current that flows in the correction optical means exceeds the first current amount, the correction optical means is placed in the R2 section. Thus, the component of the gravity is quickly removed. As a result, the power consumption is reduced.

Figure 39B:
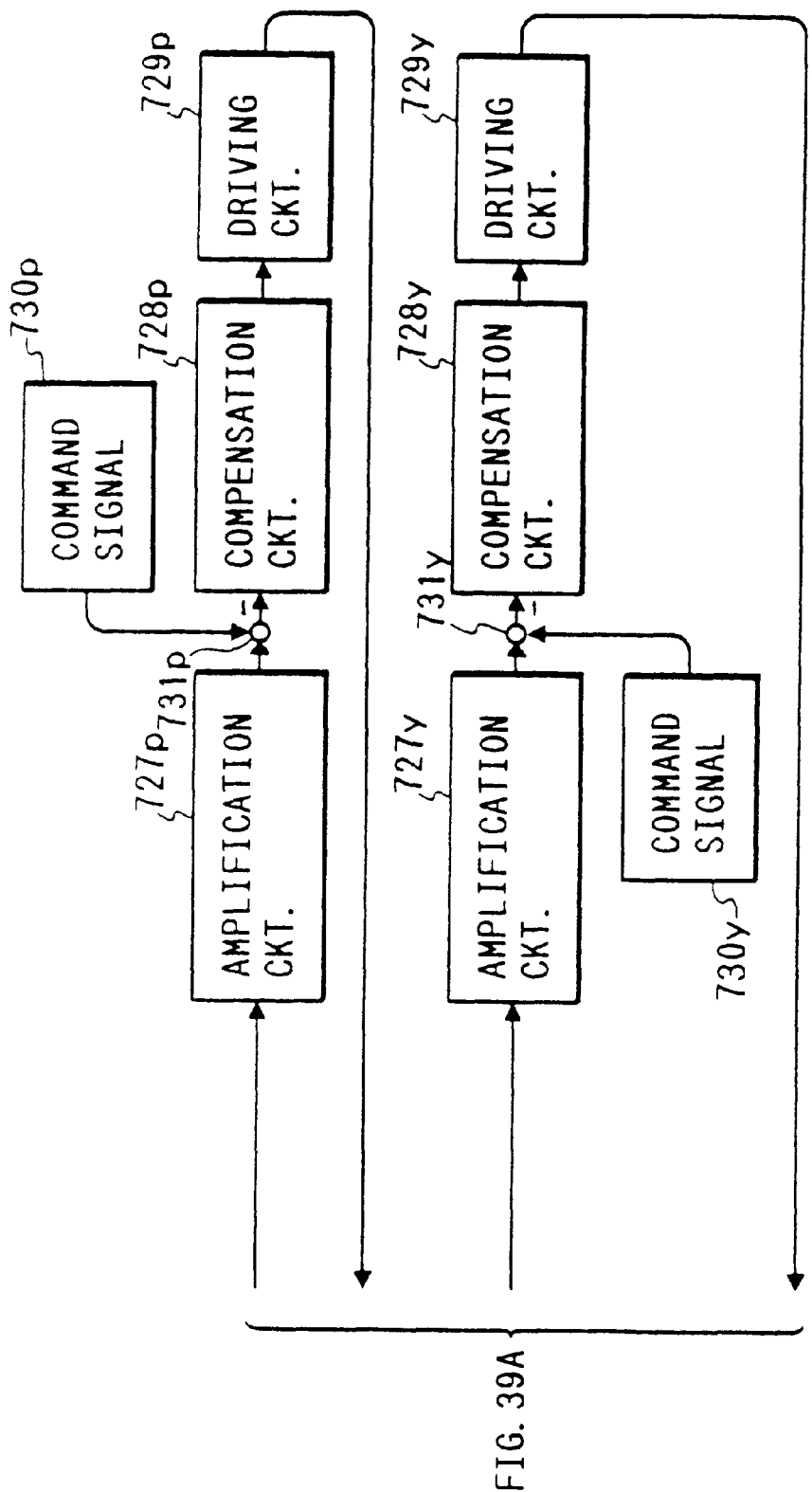
FIG. 39 is comprised of FIGS. 39A and 39B showing schematic diagrams of a correction optical means and its drive control system of FIG. 37.
Figure 40:
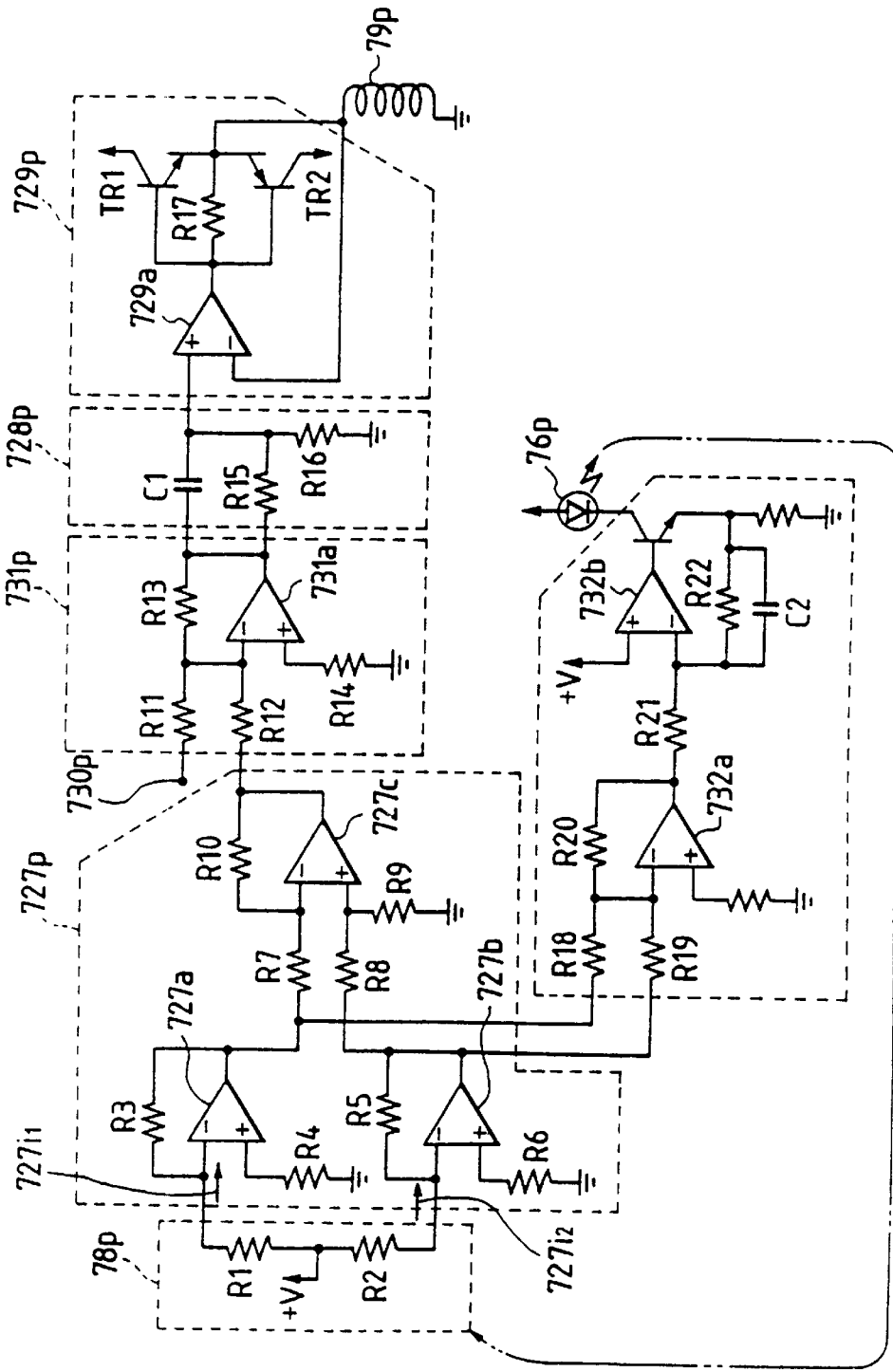
FIG. 40 is a circuit diagram showing a construction of each circuit of FIG. 38.

In such a construction, as shown in FIG. 21B, the power consumption is more reduced than that of the embodiment shown in FIGS. 39A and 39B. In addition, due to the non-linear type spring, unless the correction optical means is largely displaced, the current that flows in the correction optical means exceeds the first current amount. Thus, only when the correction optical means is very largely displaced, it is placed in the R2 section.

Since the correction optical means less works in the R2 section, the user can take photos with high accuracy of image blur prevention. In the R2 section, since the correction optical means has a band ranging from 5 Hz to 100 Hz, the accuracy of image blur prevention function is deteriorated.

In FIGS. 14A and 14B, the outputs of the time constant varying means 212p and 212y are input to an alarm means 214. In the R2 section, the alarm means 214 informs the user that "deterioration of accuracy of image blur prevention". Thus, in this section, the user can steadily hold the camera to prevent mistaken shots.

(Tenth Embodiment)

FIGS. 22A1 and 22A2 are schematic diagrams showing principal portions of an image blur prevention apparatus according to a tenth embodiment of the present invention. For the simplicity, in FIGS. 22A1 and 22A2, the same portions as the embodiment shown in FIGS. 14A and 14B are denoted by the same reference numerals.

In the embodiment shown in FIGS. 14A and 14B, a current that flows in the correction optical means is compared with an output of the first current amount generation circuit 215 and thereby the time constants of the high-pass filters 211p and 211y are varied. In the tenth embodiment, the drive amount of the correction optical means (outputs of amplifying circuits 727p and 727y) are compared with outputs (fiducial drive amount) of fiducial drive amount generation circuits 221p and 221y. When the drive amount exceeds the fiducial drive amount, the time constants of the high-pass filters 211p and 211y are varied.

As described above, the power consumption is proportional to the force against the spring of the correction optical means. Thus, the displacement (force against the spring) of the correction optical means is proportional to the power consumption. As a result, by observing the drive amount (displacement amount) of the correction optical means, the power consumption can be estimated.

A total of two alarm means 222p and 222y are disposed in a pitch direction 725p and a yaw direction 726y. The alarms are displayed on a finder 223 (see FIG. 22B). In other words, the user can know in what direction the accuracy of image blur prevention function is deteriorated. Thus, taking care of the direction alarmed, the user can correctly take a photo.

(Eleventh Embodiment)

FIGS. 23A and 23B are schematic diagrams showing principal portions of an image blur prevention apparatus according to an eleventh embodiment of the present invention. For the simplicity, in FIGS. 23A and 23B, the same portions as FIGS. 4, 22A1, 22A2 and 22B are denoted by the same reference numerals. FIGS. 24A to 24C are timing charts showing an operation of an image blur prevention function of the correction optical means shown in FIGS. 23A and 23B.

In FIGS. 14A and 14B, just after the image blur prevention function has been turned on (in the R2 section), a command signal is not input to the correction optical means. In the R2 section, when vibration takes place, it affects the center of the balance of the gravity and the electric spring (reference numeral 744 of FIGS. 45A to 46C). Thus, only a component of the gravity cannot be charged to the condenser 25 so as to remove it.

However, in the eleventh embodiment, after the image blur prevention function has been turned on, command signals are input. In other words, in a predetermined time period (section 29 of FIG. 24C) after the image blur prevention function has been turned on, command signals 730p and 730y are input to a correction optical means through low-pass filters 224p and 224y by switches 225p and 225y controlled by a CPU of the camera, respectively. The low-pass filters 224p and 224y smooth signal variations caused by the vibration. Only a DC offset component always contained in the command signals is input to the correction optical means (reference numeral 228 of FIG. 24C). Since the DC offset component is always input to the correction optical means, the power consumption increases. However, the component of the gravity and the DC offset component are removed in the R2 section, thereby reducing the power consumption.

In the embodiments shown in FIGS. 14A, 14B, 22A1, 22A2 and 22B, to remove the DC offset component, whenever the release button is pressed by half, a command signal is set at zero (by a known sample hold circuit or the like). The resultant command signal is input to the correction optical means. However, in the eleventh embodiment, such an operation can be eliminated.

In FIGS. 23A and 23B, time constant varying means 212p and 212y cause time constants of high-pass filters 211p and 211y to be low corresponding to signals received from comparison means 213p and 213y. The time constants are restored to the original (large) values corresponding to signals received from timers 226p and 226y.

After the values of the time constants have been decreased, the timers 226p and 226y start counting. After a predetermined time period has elapsed, the timers 226p and 226y output signals.

In the embodiments shown in FIGS. 14A, 14B, 22A1, 22A2 and 22B, the time constants are restored to the original (large) values corresponding to signals received from the comparison means 213p and 213y. However, in this construction, when the consumption current is around the first current amount (fiducial drive amount), the time constants are frequently varied. Thus, the current consumption likely not to decrease from the first current amount. To prevent this problem, with the timers 226p and 226y, after the values of the time constants of the high-pass filters 211p and 211y has been decreased and an enough time period has elapsed, the time constants are restored to the former (large) values.

The time constant varying means 212p and 212y output signals to AND gates 412 and 411 when the values of the time constants of the high-pass filters 211p and 211y are low, respectively. The AND gates 412 and 411 also receive shutter speed information form a shutter speed information output circuit 27. The AND gates 412 and 411 output signals to an OR gate 413 when the time constants are low and the shutter speed is "1/60" sec or less.

The OR gate 413 output a signal to an alarm and release inhibition means when at least one of the AND gates 211 and 212 outputs a signal. Thus, the alarm and release inhibition means informs the user that the accuracy of the image blur prevention function is deteriorated and performs a release inhibition operation.

Next, with reference to FIGS. 25A and 25B, an output of the shutter speed information output circuit 227 will be described.

Figure 25A:
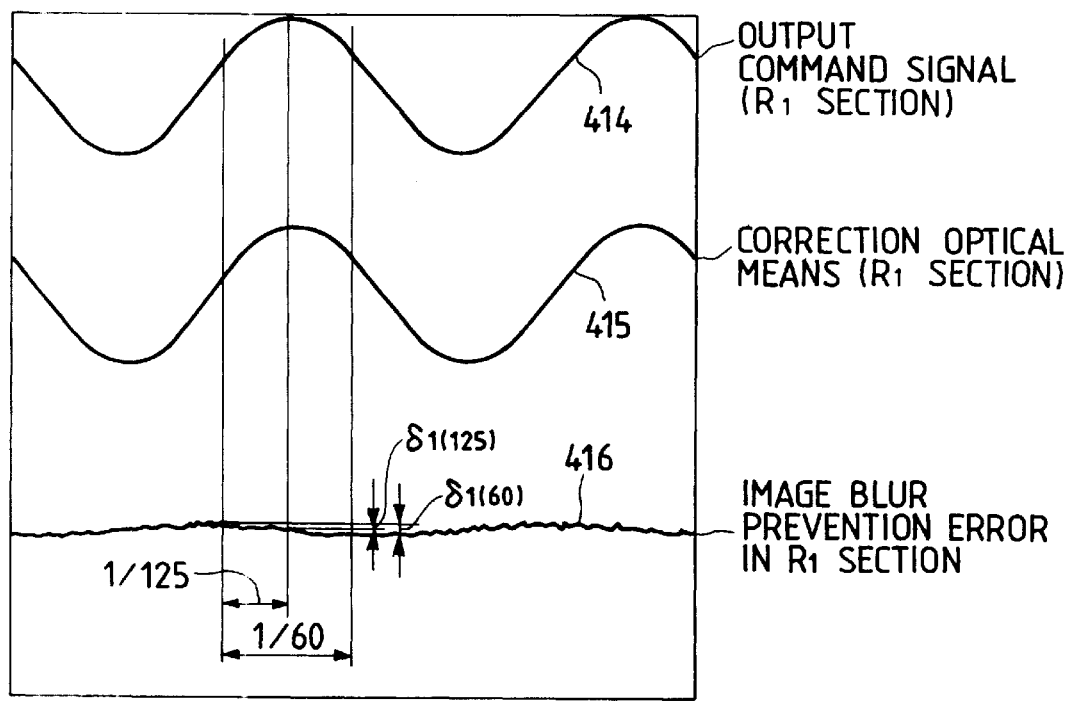
FIGS. 25A and 25B are graphs for explaining a vibration error in varying a time constant of a high-pass filter according to the eleventh embodiment of the present invention.
Figure 25B:
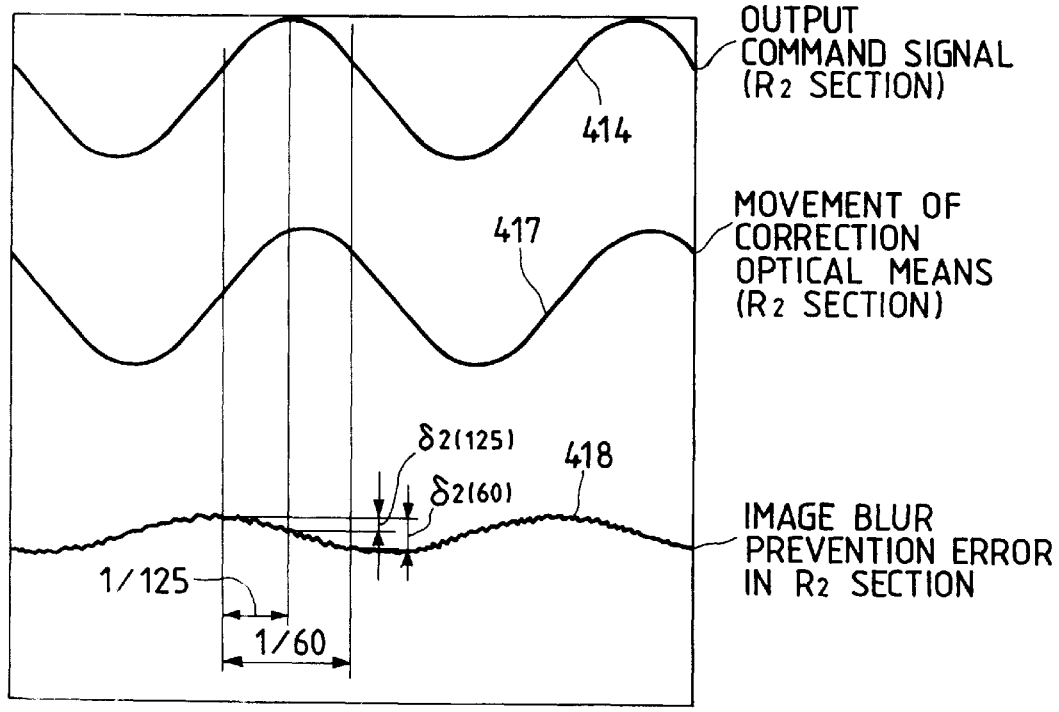

FIG. 25A shows a command signal 414 in an R1 section (in the case that time constants of high-pass filters are large), a motion 415 of a correction optical means, and the difference of the command signal 414 and the motion 415 (image blur prevention error, equivalent to an image free of image blur). The difference 416 shows that the vibration can be satisfactorily prevented. However, in the R2 section shown in FIG. 25B, since the time constants of the high-pass filters are small, the phase of the motion 417 of the correction optical means deviates from the phase of the command signal 414. Thus, the error 418 becomes large.

When the shutter speed is "1/125" sec, this error is as small as $\delta 2(125)$ and thereby ignorable. However, when the shutter speed is "1/60", the error becomes as large as $\delta 2(60)$.

Thus, when the shutter speed is "1/125" sec or higher, an alarm is not issued and the release inhibition is not performed. When the shutter speed is "1/60" sec or lower, the alarm is issued and the release inhibition is performed.

With respect to the release inhibition, when the shutter speed is for example "1/60" sec, only an alarm may be issued. When the shutter speed is for example "1/15" sec or lower, the alarm may be issued and the release inhibition may be performed.

The present invention is not limited to the shutter speed. For example, with respect to amount of deterioration due to vibration, it is clear that the case that the focal length of the lens is 300 mm is inferior to the case that the focal length of the lens is 35 mm.

Thus, when the focal length is 300 mm, an alarm operation and a release lock operation may be performed. When the focal length is 100 mm, such operations may not be performed. When the shutter speed is "1/30" sec and the focal length is 100 mm, neither the alarm operation nor the release lock operation may be performed. When the shutter speed is "1/60" sec and the focal length is 300 mm, both the alarm operation and the release lock operation may be performed. In other words, when the product of the focal length and the shutter speed exceeds a predetermined value, both the alarm operation and the release lock operation may be performed. For example, when the shutter speed is "1/30" sec and the focal length is 100 mm, the product is 3.3; when the shutter speed is "1/60" sec and the focal length is 300 mm, the product is 5.

(Twelfth Embodiment)

Figure 26B:
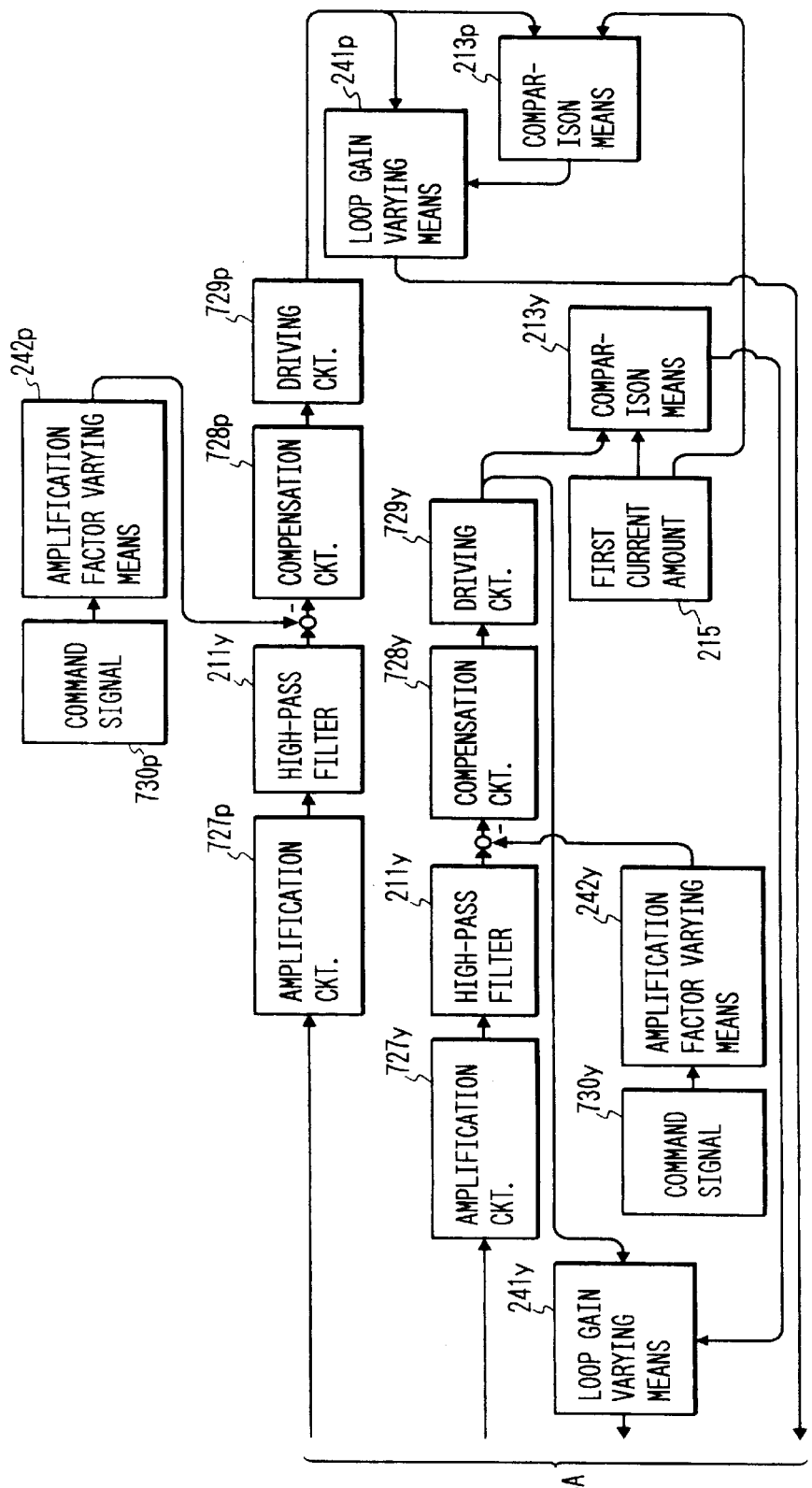
FIG. 26 is comprised of FIGS. 26A and 26B showing schematic diagrams of principal portions of an image blur prevention apparatus according to a twelfth embodiment of the present invention.

FIGS. 26A to 29C show a twelfth embodiment of the present invention. FIGS. 26A and 26B are schematic diagrams showing principal portions of an image blur prevention apparatus according to the twelfth embodiment of the present invention. For the simplicity, in FIGS. 26A and 26B, the same portions as FIGS. 14A and 14B are denoted by the same reference numerals.

In the embodiment shown in FIGS. 14A and 14B, the time constants of the high-pass filters 211p and 211y are varied. However, in the twelfth embodiment shown in FIGS. 26A and 26B, a loop gain of a correction optical means is varied instead of varying time constants of high-pass filters by the time constant varying means (212p and 212y of FIGS. 14A and 14B).

In FIGS. 20A and 20B, the attenuation inflection points of low frequency waves by high-pass filters are varied by the amount of a loop-gain of a position control loop.

Thus, the attenuation inflection points of low frequency waves of the correction optical means can be controlled by the loop gain without need to change the connections of resistors and condensers of high-pass filters.

Figure 27:
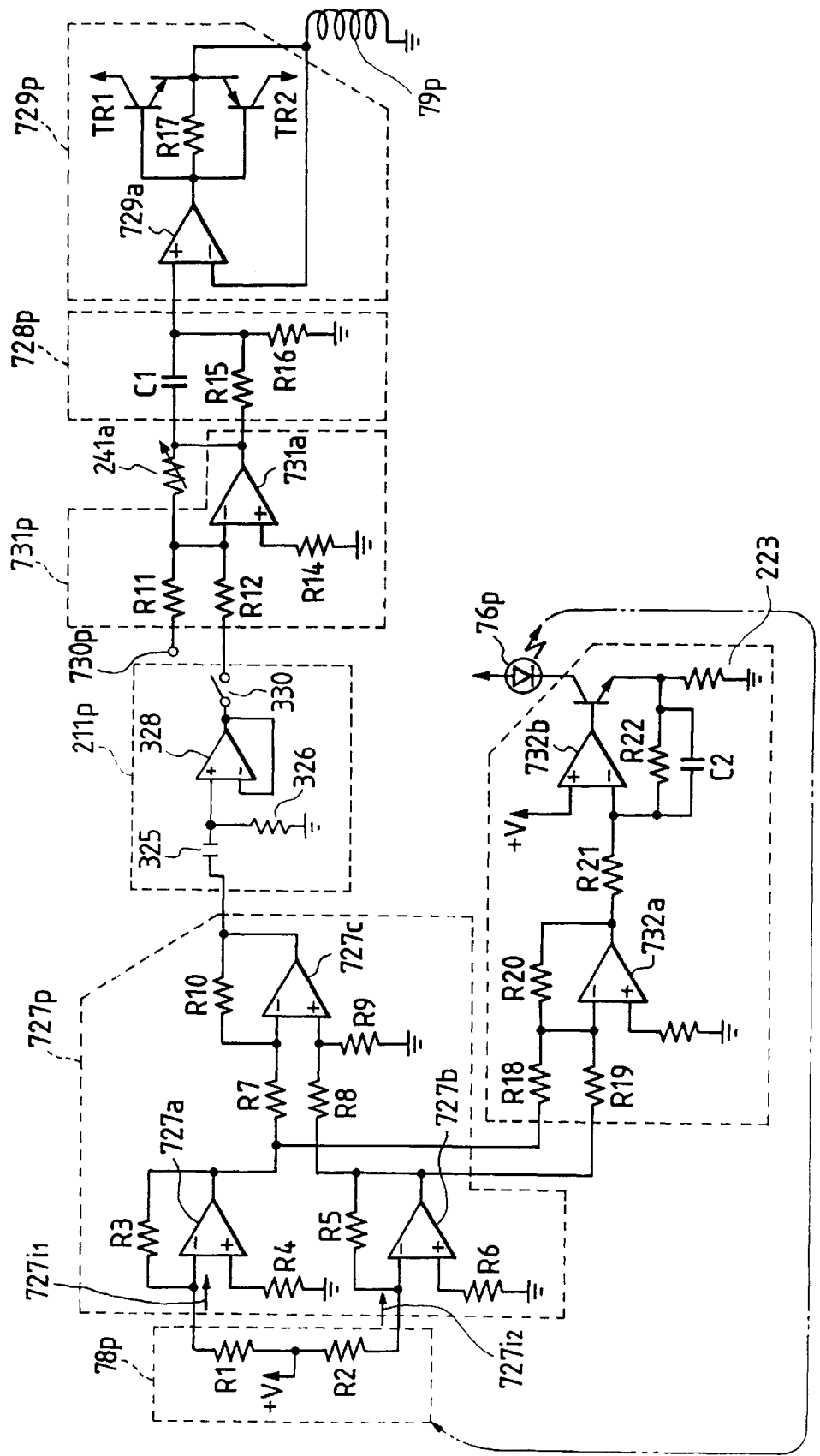
FIG. 27 is a circuit diagram showing an example of a drive means of the correction optical means of FIGS. 26A and 26B.

In FIGS. 26A and 26B, a position control loop of a correction optical means has loop gain varying means 241p and 241y that are equivalent to a variable resistor 241a of FIG. 27. As shown in FIG. 27, high-pass filter 211p (211y) is constructed of a resistor 326 and a condenser 325.

Figure 28A:
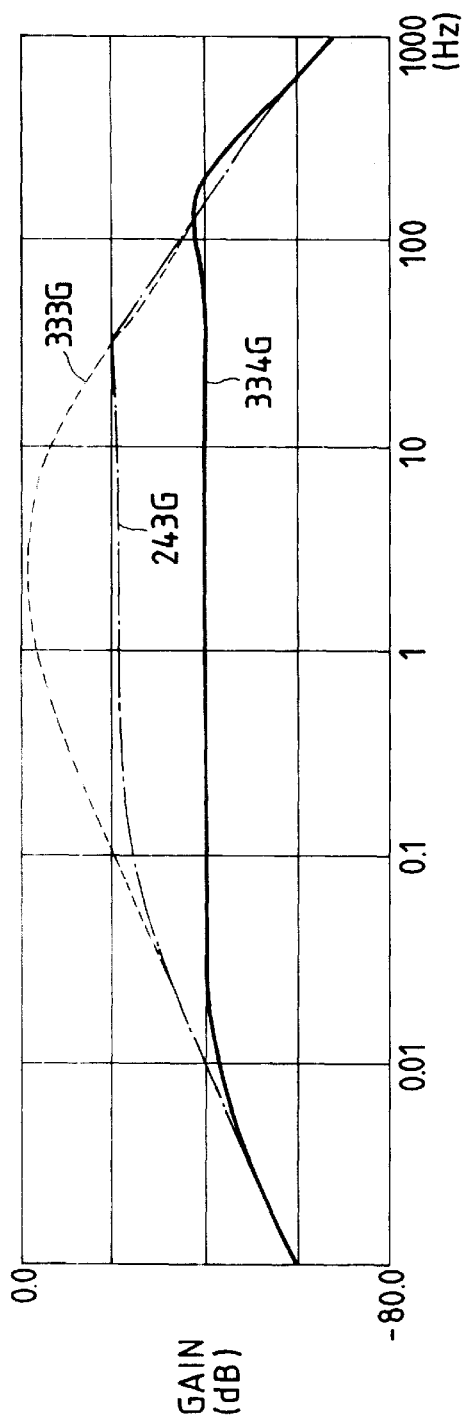
FIGS. 28A and 28B are graphs showing gain and phase of a high-pass filter with different time constants according to the twelfth embodiment of the present invention.
Figure 28B:
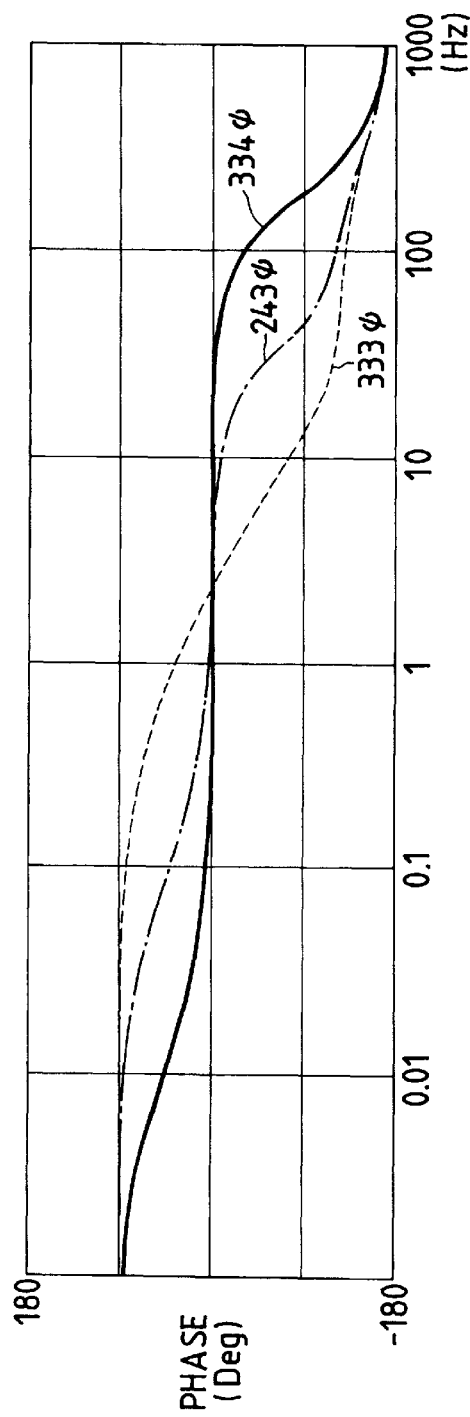

Normally, the resistance of the variable resistor 241a is high (namely, the loop gain is high) so that characteristics denoted by a curve 334G of FIG. 28A (same as characteristics denoted by the curve 334G of FIGS. 20A and 20B) are obtained. This is because the circuit construction of FIG. 27 is the same as the circuit construction of FIGS. 20A and 20B where the time constants of the high-pass filters are large. A curve 333G represents characteristics where a switch 330 is open. The curve 333G of FIG. 28A is the same as the curve 333G of FIG. 20A.

When the resistance of the variable resistor 241a is decreased, the loop gain is decreased. Thus, characteristics denoted by a curve 243G shown in FIG. 28A are obtained. The time constant of the high-pass filter apparently becomes low, where frequency component of 0.1 Hz or lower are attenuated. Thus, in the characteristics, gravity components and large displacement components due to vibration are quickly removed.

Next, with reference to FIGS. 29A to 29C, a resistance varying timing of the variable resistor 241a will be described.

The resistance varying timing is substantially the same as the time constant varying timing of the high-pass filters shown in FIGS. 21A to 21C. However, the time constants are varied by the loop gain rather than the time-constant varying means.

In FIGS. 29A to 29C, when a gravity component is input as a step-shaped pulse while the image blur prevention function is working or when outputs of command signals 338 and 339 are large (thereby, the correction optical means is largely displaced), the loop gain is decreased (the resistance of the resistor 241pa is decreased).

Thus, without need to change the connections of condensers and resistors of high-pass filters, the time constant of the correction optical means can be varied. As a result, even if the correction optical means is largely displaced, the power consumption can be reduced.

When the position loop gain of the correction optical means is varied, the drive amount of the correction optical means corresponding to a command signal slightly varies.

For example, when the loop gain is large, the correction optical means moves for "1" corresponding to a command signal "1". When the loop gain is small, the correction optical means only moves for "0.5" corresponding to the same command signal "1". In other words, the drive gain varies.

In FIGS. 26A and 26B, command signals 730p and 730y are input to the correction optical means through amplification factor varying means 242p and 242y, respectively. When the loop gain is low, the command signals are amplified so as to prevent the drive amount of the correction optical means from decreasing.

When the connections of condensers and resistors are changed for varying time constants, "dielectric loss" of the condensers may adversely take place. However, as shown in FIGS. 26A and 26B, when the loop gain is varied so as to control the time constants, such a problem does not take place.

In this embodiment, as shown in FIGS. 29A to 29C, the user may be informed of a section where the loop gain is low. The release lock may be performed. In addition, the alarm of this section and the release lock operation may be controlled corresponding to the shutter speed and/or zoom focal length.

According to the ninth to twelfth embodiments, the time constants of the high-pass filters in the position control loop of the correction optical means are varied by the time constant varying means or the position control loop gain. Thus, when a gravity component is initially input or the correction optical means is largely displaced due to vibration, the time constants of the high-pass filters are decreased so as to reduce the power consumption.

In addition, since the user is informed of such a section or the release lock is performed, mistaken shots due to improper accuracy of image blur prevention can be prevented. Moreover, when the alarm operation of this section and the release lock operation are controlled corresponding to the shutter speed and the zoom focal length, excessive alarm and release lock operations can be prevented. Thus, a system with a high image blur prevention function can be accomplished.

When an elastic means contained in a correction optical means is a non-linear type spring where the increase ratio of elastic characteristics is inversely proportional to the displacement of the correction optical means, the power consumption at which the correction optical means is largely displaced can be much reduced.

Since an elastic drive limit member is disposed in the correction optical means, the elastic drive limit member prevents the correction optical means from colliding with a coil or the like.

As described above, according to the ninth to twelfth embodiments, the position control loop of the drive means has high-pass filters connected in series therewith and a time constant varying means for varying the time constants of the high-pass filters.

Thus, the power consumption can be quickly reduced, thereby preventing other functions of the equipment with the apparatus from being affected by the power consumption.

The apparatus has a limit means for limiting drive amount of the correction optical means so as to prevent the correction optical means from being excessively driven.

Thus, even if the correction optical means is largely displaced, the limit means prevents a coil or the like contained in the correction optical means from colliding with other members and being broken.

The apparatus has an alarm means for issuing an alarm to the user when the time constants of the high-pass filters are low or when the loop gain of the position control loop is low.

Thus, the user of the equipment with the apparatus is informed that an image blur will take place. Thus, the user can hold the equipment so as to prevent such an image blur from taking place.

The apparatus has a release inhibition means for inhibiting a release operation of the camera from being performed when the time constants of the high-pass filters are low or when the loop gain of the position control loop is low.

Thus, the user can be prevented from taking photos in the case that the image blur prevention does not fully work.

A non-linear type spring means is disposed between a connecting portion of a correction optical means and a lens barrel.

A magnetic coupling portion is formed between the correction optical means and the lens barrel.

The non-linear type spring means may be a non-liner type spring where the increase ratio of elastic characteristics is inversely proportional to the displacement of the correction optical means.

Magnetic coupling force (attracting force) is inversely proportional to the displacement of the correction optical means.

Thus, even if the correction optical means is largely displaced, the power consumption can be reduced.

(Thirteenth Embodiment)

Figure 30:
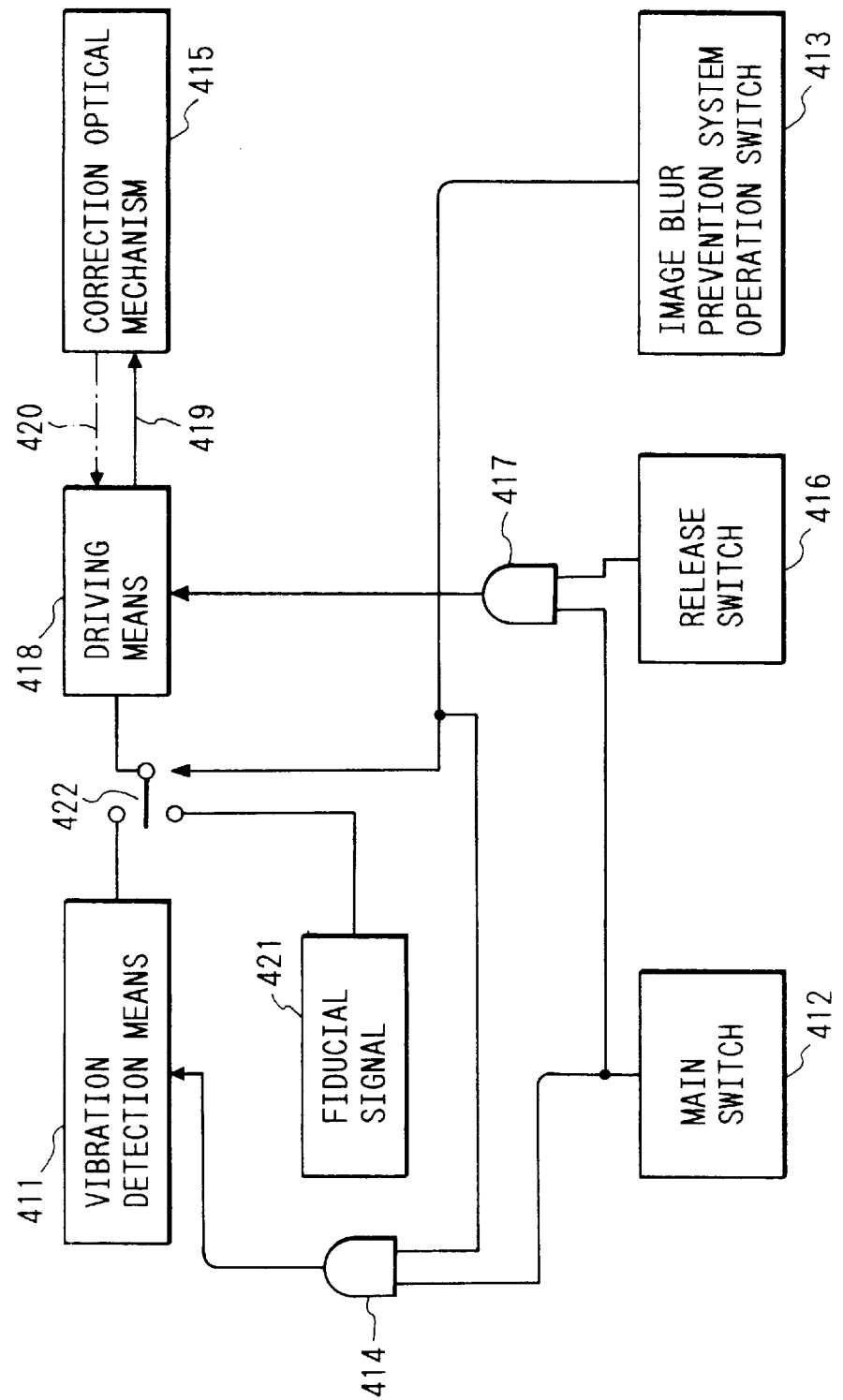
FIG. 30 is a block diagram showing a camera with an image blur prevention function according to a thirteenth embodiment of the present invention.

FIG. 30 is a schematic diagram showing principal portions of a camera with an image blur prevention function according to a thirteenth embodiment of the present invention. When both a main switch 412 of the camera and an image blur prevention system operation switch 413 are turned on and an output of an AND gate 414 becomes "H", a vibration detection means 411 that is a vibration sensor is activated. When the main switch 412 is turned on and a release switch 416 is pressed at least by half, an output of an AND gate 417 becomes "H". When the output of the AND gate 417 becomes "H", a drive means 418 (circuitry from an amplifier 559p, 559y to a drive circuit 561p, 561y shown in FIG. 32) is activated. When the drive circuit 418 is activated, a correction optical mechanism 415 is activated. A solid line 419 that connects the drive means 418 and the correction optical mechanism 415 is an output line connected from the drive circuits 561p and 561y to pitch coil 552p and yaw coil 552y. A one-dashed line 420 is an input line that connects light receiving devices 557p and 557y to amplifiers 559p and 559y.

In this construction, when the image blur prevention system is operated (the image blur prevention system operation switch 413 is turned on), the vibration detection means 411 is activated. When the release switch 416 is pressed at least by half, the correction optical mechanism 415 is activated. At this point, since the image blur prevention system operation switch 413 is turned on, the switch 422 connects the vibration detection means 411 and the drive means 418. Thus, the correction optical mechanism 415 is driven corresponding to an output of the vibration detection means 411 so as to perform the image blur prevention function.

When the image blur prevention system operation switch 413 is turned off, the vibration detection means 411 does not work. However, when the main switch 412 is turned on and the release switch is pressed at least by half, the correction optical mechanism 415 is driven by the drive means 418. At this time, the switch 422 connects the fiducial signal 421 and the drive means 418.

In other words, when the image blur prevention system operation switch 413 is turned off and both the main switch 412 and the release switch 416 are turned on, the position of the correction optical mechanism 415 is placed at a fiducial position corresponding to a fiducial signal 421 (with a voltage of for example 2.5 V) by the pitch coil 552p and yaw coil 552y. Thus, the position of the correction optical mechanism 415 is not affected by outer force.

FIG. 31 is a schematic diagram showing the correction optical mechanism 415 and the drive means 418 (circuitry from the amplifiers 559p and 559y to the drive circuits 561p and 561y).

In FIG. 31, a fixing frame 547 that supports an auxiliary lens 545 is slidable on a pitch slide shaft 549p through a bearing 548p made of polyacetal resin (POM). The fixing frame 547 is surrounded by a pitch slide shaft 549p and a pitch coil spring 551p. The pitch slide shaft 549p is coaxial to the pitch slide shaft 549p. Thus, the fixing frame 547 is kept nearly at a center position. The pitch slide shaft 549p is disposed on a first holding frame 550.

The pitch coil 552p is disposed on the fixing frame 547. The pitch coil 552p is placed in a magnetic circuit formed of a pitch magnet 553p and a pitch yoke 554p. When a current flows in the pitch coil 552p, the fixing frame 547 moves in the pitch direction 546p. The pitch coil 552p has a pitch slit 555p. With a light emitting device 556p (red-color light emitting diode iRED) and a light receiving device 557p (semiconductor position detection device PSD), the position of the fixing frame 547 in the pitch direction 546p is detected.

The first holding frame 550 is fitted to a bearing 548y made of POM or the like. Thus, the first holding frame 550 is slidable on a housing 558 on which a yaw slide shaft 549y is disposed. The housing 558 is disposed on a lens barrel (not shown). Thus, the first holding frame 550 is movable in a yaw direction 546y of the lens barrel. The yaw slide shaft 549y coaxially has a yaw coil spring 551y. Thus, as with the fixing frame 547, the first holding frame 550 is laced nearly at a center position.

A yaw coil 552y is disposed on the fixing frame 547. With the yaw magnet 553y and the yaw yoke 554y that surrounds the yaw coil 552y, the fixing frame 547 is also movable in the yaw direction 546y. The yaw coil 552y has a yaw slit 555y. With the yaw slit 555y, the position of the fixing frame 547 is detected in the yaw direction 546y.

In FIG. 31, outputs of the light receiving devices 557p and 557y are amplified by amplifiers 559p and 559y, respectively. The resultant signals are sent to coils (pitch coil 552p and yoke coil 552y) through various circuits (that will be described later), respectively. Thus, the fixing frame 547 is moved and the outputs of light receiving devices 557p and 557y vary. When the coils 552p and 552y are energized so that the outputs of the light receiving devices 557p and 557y decrease, a closed loop is formed. The fixing frame 547 is placed at a balance position where the outputs of the light receiving devices become almost zero.

Compensation circuits 560p and 560y are used to stabilize the operation of the system shown in FIG. 31. Addition circuits 563p and 563y add outputs of the amplifiers 559p and 559y and command signals 562p and 562y, respectively. The drive circuits 561p and 561y compensate currents that flow in the coils 552p and 552y, respectively.

When the command signals 562p and 562y are sent to such a system, the auxiliary lens 545 is accurately moved corresponding to the command signals 562p and 562y.

Such a drive method is known as a position control method. The amplifiers 559p and 559y, the compensation circuits 560p and 560y, the drive circuits 561p and 561y construct the drive means of the correction optical mechanism.

Figure 32:
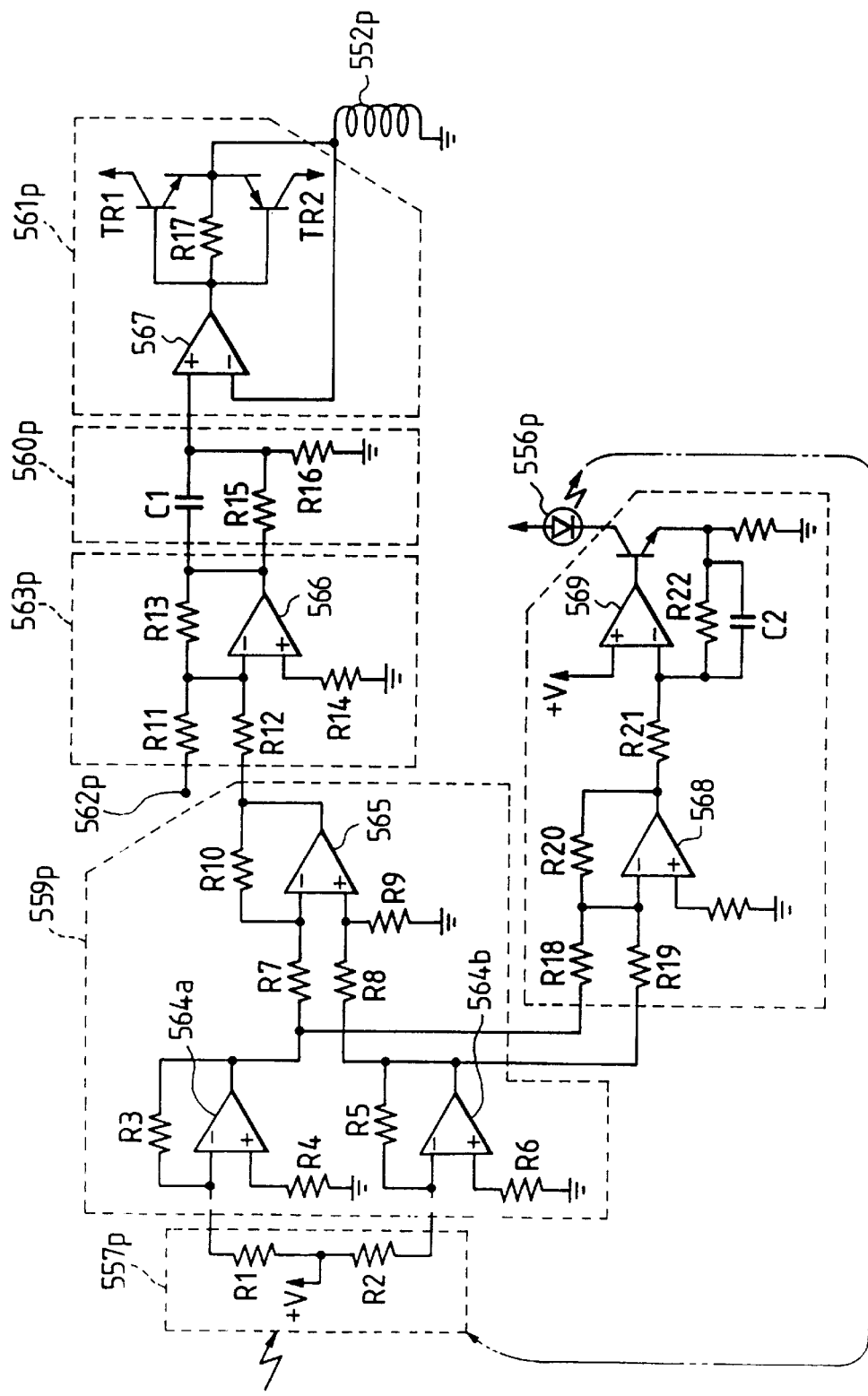
FIG. 32 is a circuit diagram showing the construction of FIG. 31.

FIG. 32 is a circuit diagram showing the drive means, which drives the correction optical mechanism. Next, the operation of the drive means only in the pitch direction 546p will be described.

Current-voltage conversion amplifiers 564a and 564b convert an optical current that flows in the light receiving device 557p (constructed of resisters R1 and R2) into a voltage. A differential amplifier 565 obtains the difference between outputs of the current-voltage conversion amplifiers 564a and 564b. The resultant differential signal represents the position of the auxiliary lens 545 in the pitch direction 546p. The current-voltage amplifiers 564a and 564b, the differential amplifier 565, and resistors R3 to R10 construct the amplifier 559p shown in FIG. 31.

An amplifier 566 adds the command signal 562p and the differential signal of the differential amplifier 565. The amplifier 566 and resistors R11 to R14 construct the addition circuit 563p shown in FIG. 8. Resistors R15, R16 and a condenser C1 construct a known phase advancing circuit. The phase advancing circuit is equivalent to the compensation circuit 560p shown in FIG. 8, which stabilizes the system.

An output of the addition circuit 563p is sent to a drive amplifier 567 through the compensation circuit 560p. The drive circuit 567 generates a drive signal of the coil 552p. With the drive signal, the auxiliary lens 545 is displaced. The drive amplifier 567, a resistor R17, and transistors TR1 and TR2 construct the drive circuit 561p shown in FIG. 31.

An addition amplifier 568 adds the outputs of the current-voltage conversion amplifiers 564a and 564b (namely, the total amount of light received by the light receiving device 557p). A drive amplifier 569 drives the light emitting device 556p corresponding to the output signal of the addition amplifier 568. The addition amplifier 568, the drive amplifier 569, registers R18 to R22, and a condenser C2 construct the drive circuit of the light emitting device 556p (not shown in FIG. 31).

The light emitting amount of the light emitting device 556p is adversely affected by temperature change or the like. Thus, the position sensitivity of the differential amplifier 565 varies. When the light emitting device 556p is controlled by the drive circuit so that the total light amount received becomes constant, the position sensitivity does not vary.

While the image blur prevention system is working, the switches 422p and 422y connect the command signals 562p and 562y to the drive means, respectively. Thus, the correction optical mechanism is driven corresponding to the command signal (according to vibration).

On the other hand, while the image blur prevention system is not working, if the main switch 412 and the release switch 416 are turned on, the switches 422p and 422y connect the fiducial signals 421p and 421y to the drive means, respectively. Thus, the correction optical mechanism is always held at a predetermined position.

In this construction, while the image blur prevention function is not working, the correction optical mechanism 415 is supported with strong force at the fiducial position. Thus, the correction optical mechanism 15 is not moved by outer force such as vibration and release shock.

(Fourteenth Embodiment)

Figure 33:
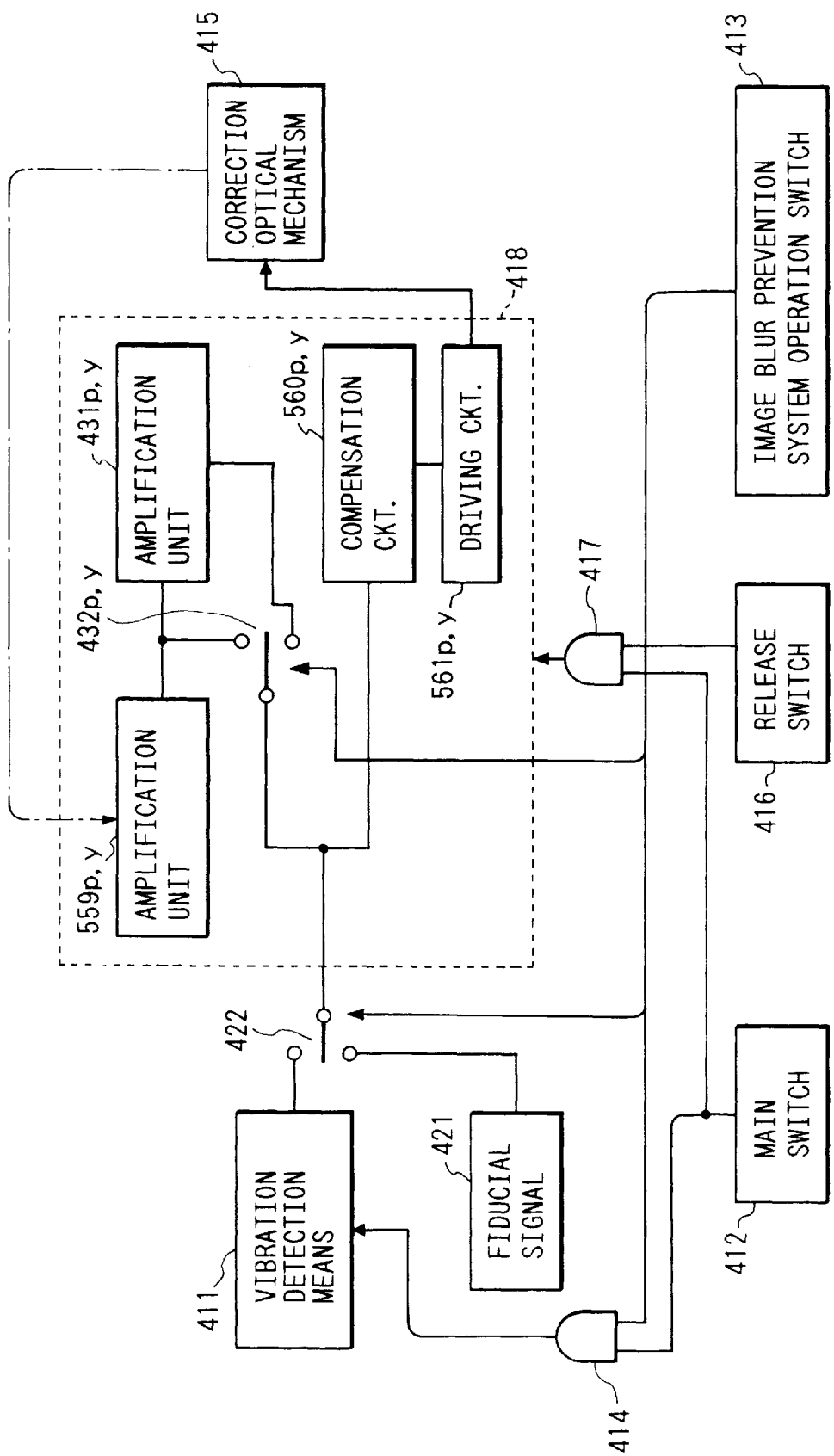
FIG. 33 is a block diagram showing a camera with an image blur prevention function according to a fourteenth embodiment of the present invention.

FIG. 33 is a block diagram showing principal portions of a camera with an image blur prevention function according to a fourteenth embodiment of the present invention. For the simplicity, in FIG. 33, the same portions as FIG. 30 are denoted by the same reference numerals.

In the fourteenth embodiment, while an image blur prevention system is working, the drive control of the correction optical mechanism 415 by the drive means 418 is switched to "position control". While the image blur prevention system is not working, the drive control is switch to "speed control".

In FIG. 33, when an image blur prevention system operation switch 413 is turned off, since switches 432p and 432y connect differential units 431p and 431y and compensation circuits 560p and 560y, outputs of amplifiers 559p and 559y of a drive means 418 are disconnected. The differential units 431p and 431y differentiate position detection signals received from the amplifiers 559p and 559y and output speed signals of the correction optical mechanism 415. Drive circuits 561p and 561y drive a pitch coil 552p and a yaw coil 552y corresponding to the speed signal. Thus, the speed control is performed. While the image blur prevention system is not working, the switch 422 connects a fiducial signal 421 to the drive means 418. When the fiducial signal 421 is set at "0" (namely, speed zero), the drive control is performed so that the speed of the correction optical mechanism 415 always becomes zero. Thus, even if outer force such as vibration or release shock is applied, the correction optical mechanism 415 does not easily move.

Figure 34:
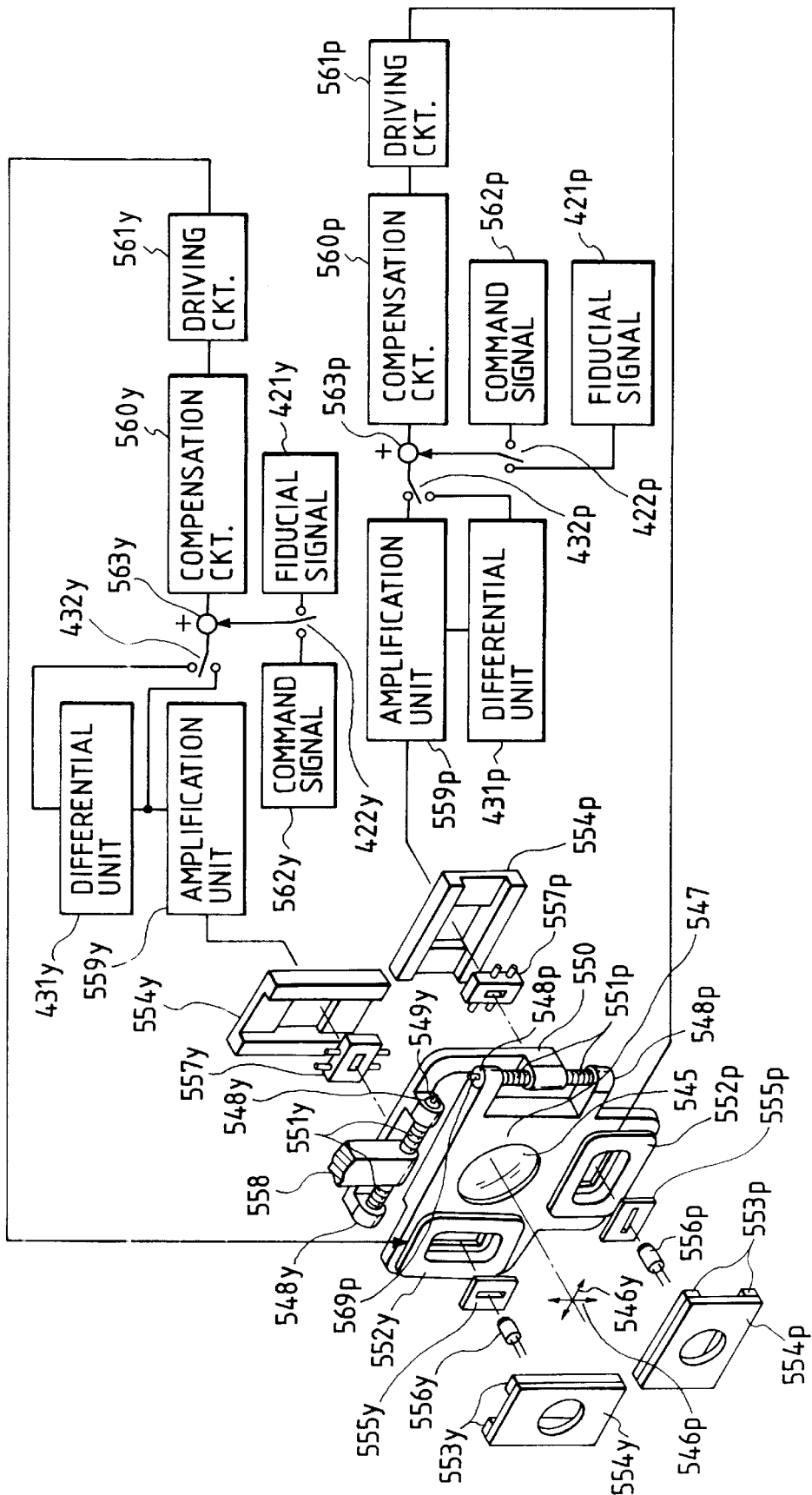
FIG. 34 is a schematic diagram showing a construction of a correction optical mechanism and its drive means of FIG. 32.

FIG. 34 is a schematic diagram showing the correction optical mechanism 415 and the drive means 418 shown in FIG. 32.

While the image blur prevention function is working, the switches 422p and 422y connect command signals 562p and 562y to the drive means, respectively. In addition, switches 432p and 432y connect the amplifiers 559p and 559y to the compensation circuits 560p and 560y, respectively. Thus, as with the related art reference, the position control is performed. Consequently, the correction optical mechanism 415 is driven corresponding to the command signals 562p and 562y so as to prevent an image blur from taking place.

On the other hand, while the image blur prevention system is not working, the switches 422p and 422y connect the fiducial signals 421p and 421y (speed zero) to the drive means, respectively. In addition, the switches 432p and 432y connect a speed signal of the correction optical mechanism 415 to the compensation circuits 560p and 560y, respectively. Thus, the speed of the correction optical means 415 always becomes zero.

In such a construction, the fourteenth embodiment has advantages over the thirteenth embodiment.

In the thirteenth embodiment shown in FIGS. 30 and 31, while the image blur prevention system is not working, the correction optical mechanism 415 is moved to a position corresponding to the fiducial signals 421p and 421y. At this point, the correction optical mechanism 415 is held by thrusting force of the pitch coil 552p and the yoke coil 552y. Thus, large currents flow in the pitch coil 552p and the yoke coil 552y so as to hold the correction optical mechanism 415 against the gravity. The power consumption of the battery becomes large and the battery quickly runs out.

However, as shown in FIGS. 33 and 34, according to the fourteenth embodiment, while the image blur prevention system is not working, the correction optical mechanism 415 is controlled at a speed (zero) corresponding to the fiducial signals 421p and 421y. Thus, the correction optical mechanism 415 is held at a balance position of the gravity, the pitch coil spring 551p, and the yaw coil spring 551y. Thus, currents that flow in the pitch coil 552p and the yaw coil 552y against the gravity are not required. Only when the correction optical mechanism 415 moves due to vibration or release shock, currents flow in the pitch coil 552p and the yaw coil 552y. Thus, the power consumption can be much reduced.

(Fifteenth Embodiment)

Figure 35:
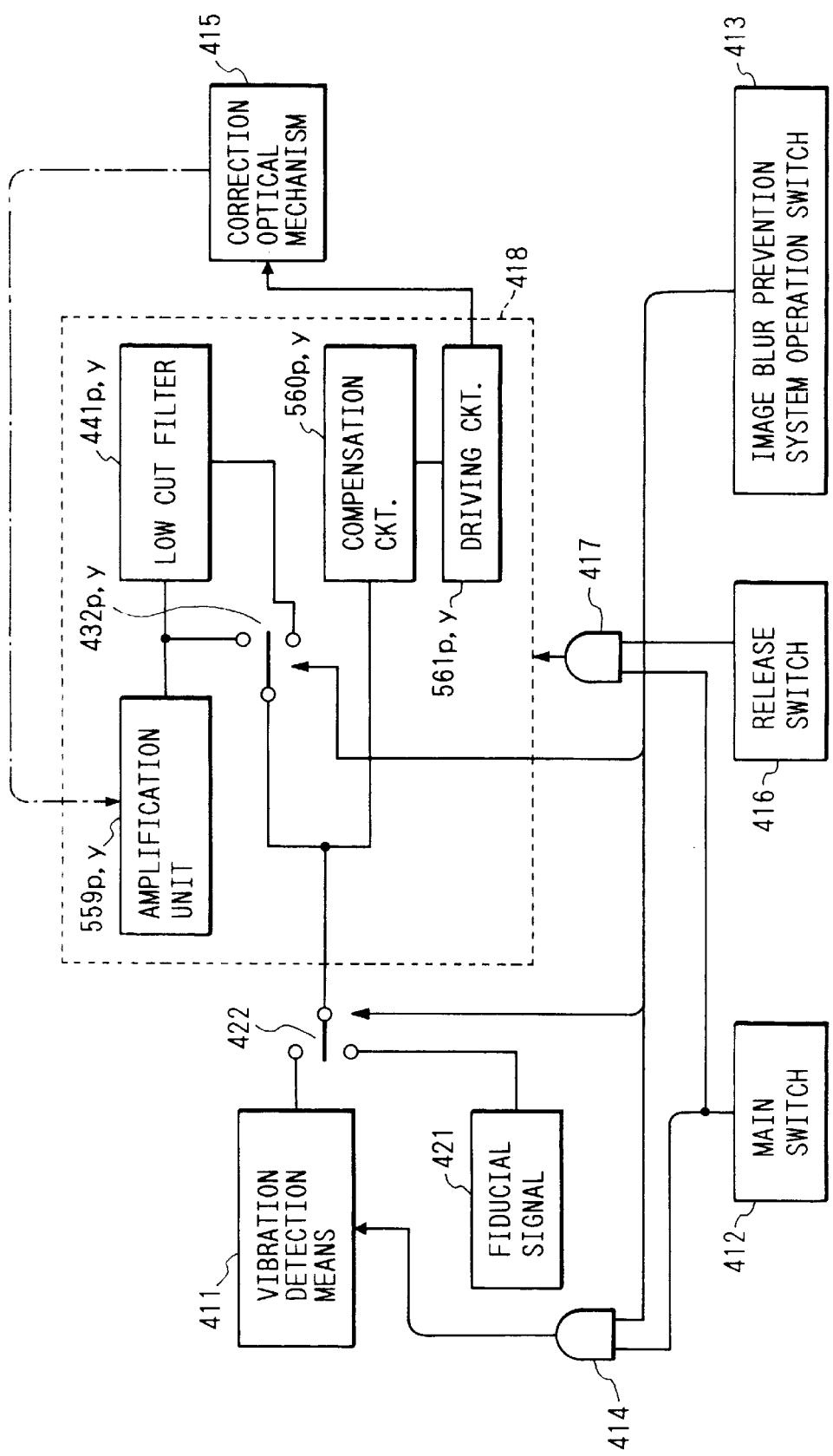
FIG. 35 is a block diagram showing a camera with an image blur prevention function according to a fifteenth embodiment of the present invention.
Figure 36:
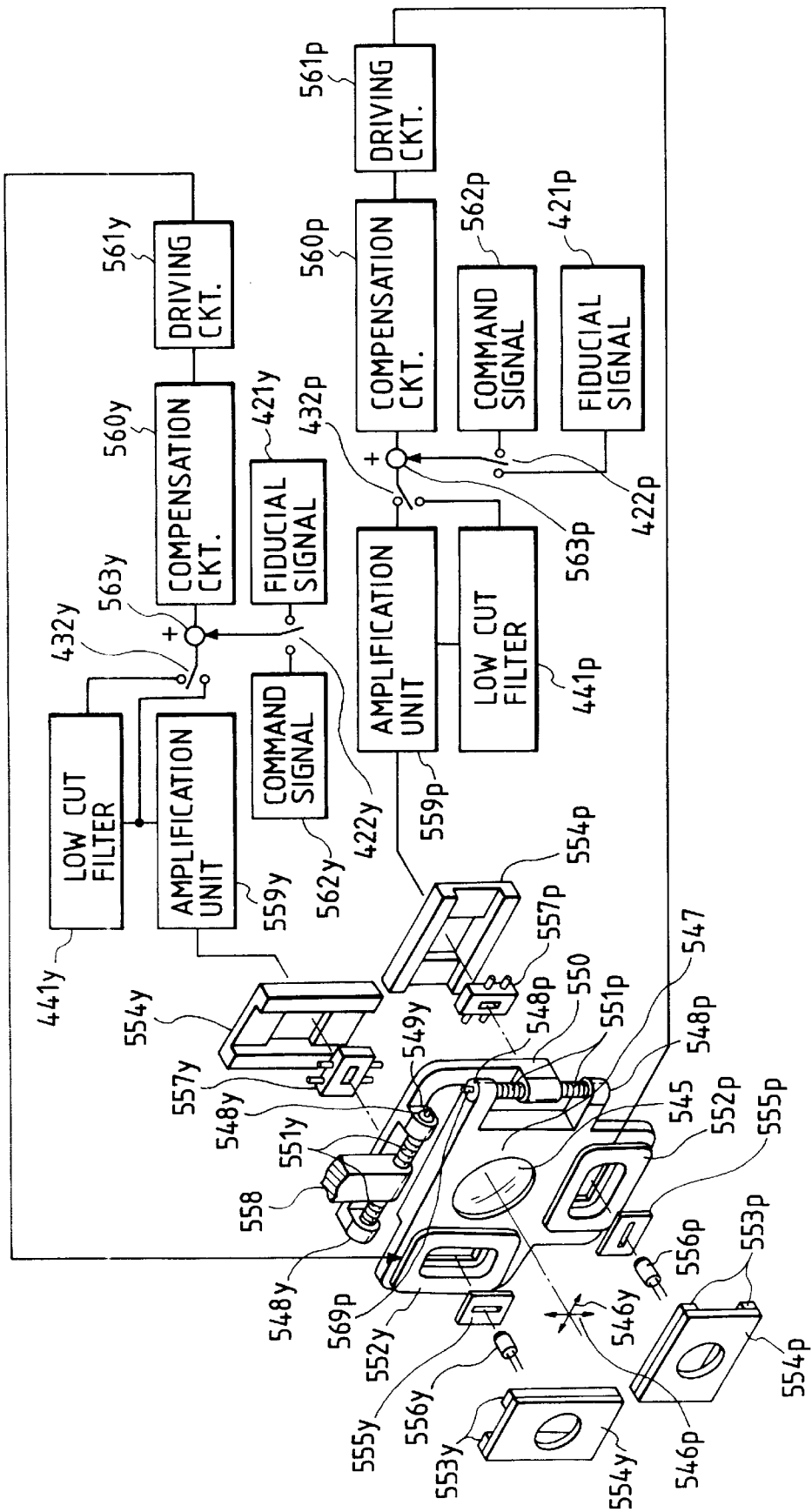
FIG. 36 is a schematic diagram showing a construction of a correction optical mechanism and its drive means of FIG. 34.
Figure 37:
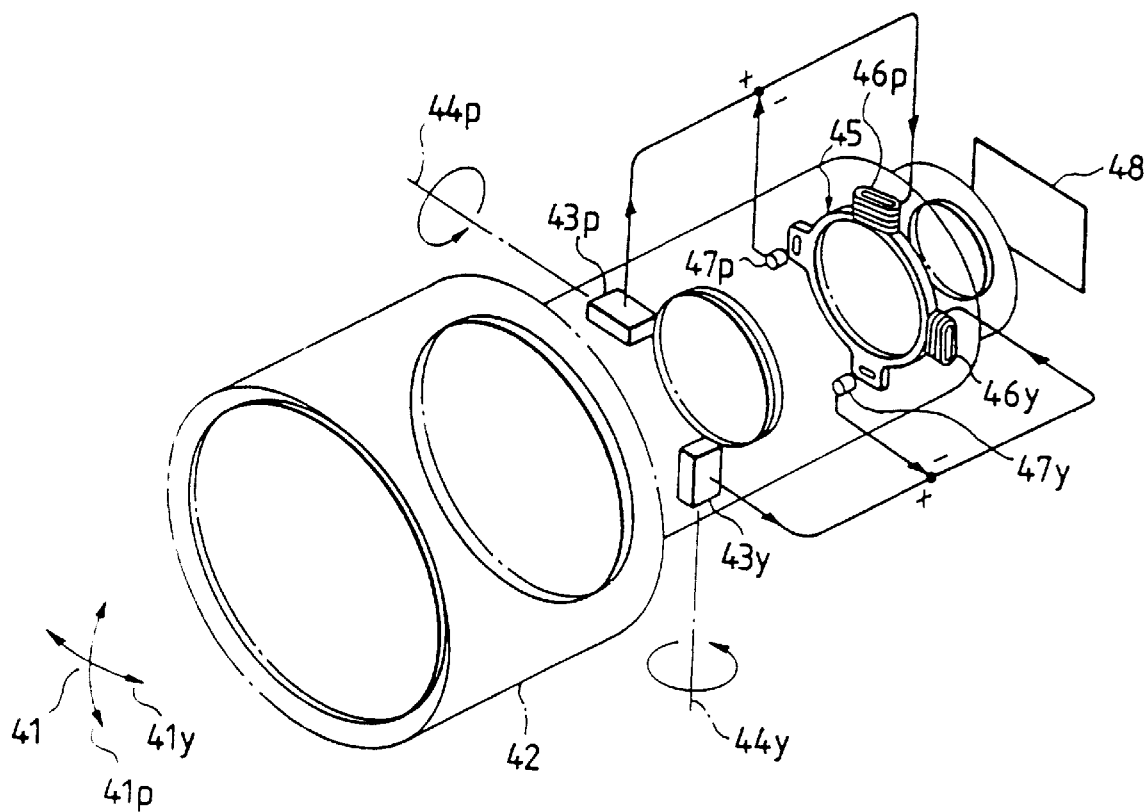
FIG. 37 is a perspective view showing a construction of a conventional image blur prevention system.
Figure 38:
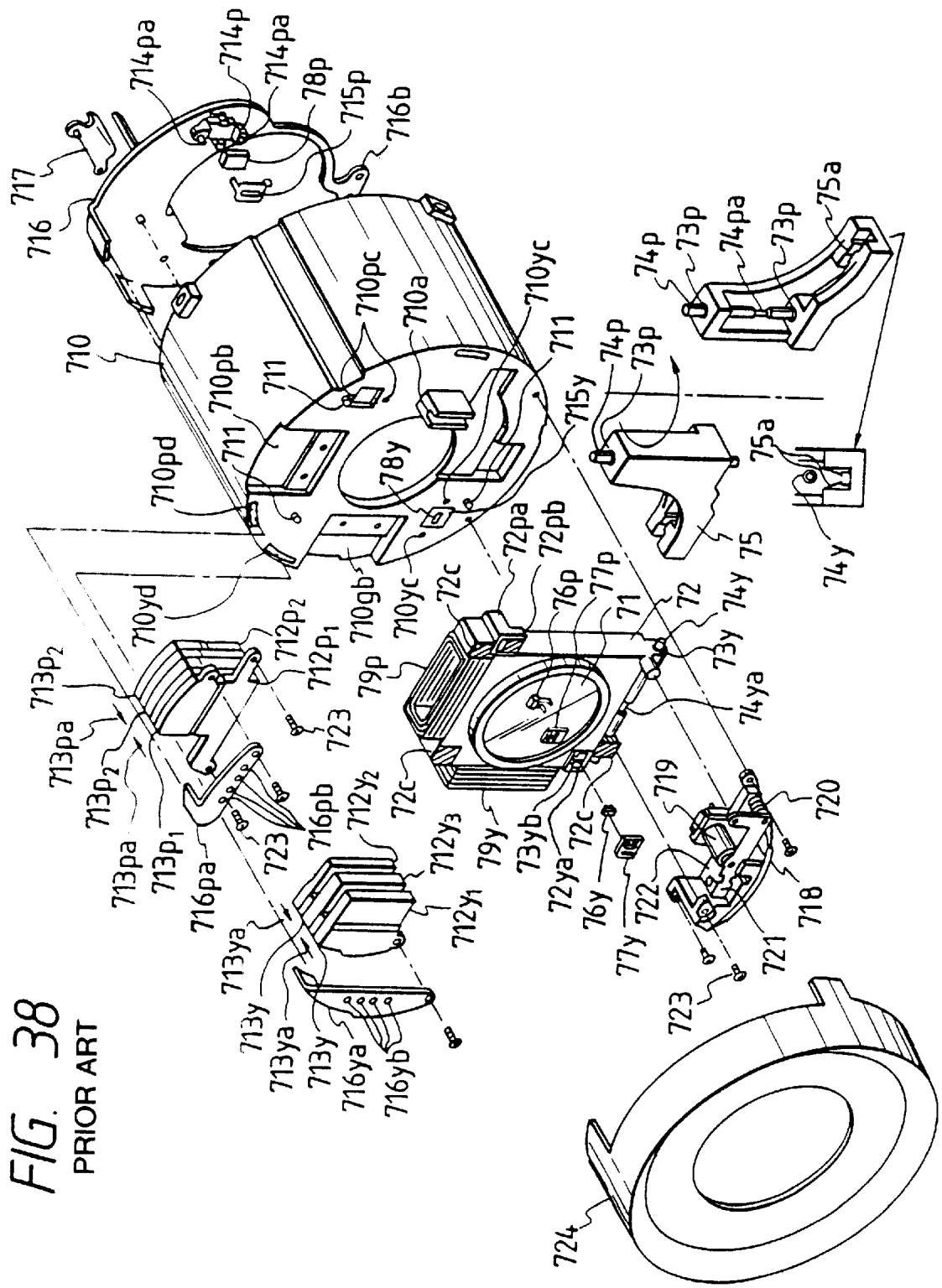
FIG. 38 is an exploded perspective view showing a construction of a conventional correction optical means.

FIGS. 35 and 36 show a fifteenth embodiment of the present invention. FIG. 35 is a block diagram showing principal portions of a camera with an image blur prevention function according to the fifteenth embodiment of the present invention. FIG. 36 is a schematic diagram of FIG. 35. For the simplicity, in FIGS. 35 and 36, the same portions as FIGS. 30 and 33 are denoted by the same reference numerals.

In the fifteenth embodiment, low-pass filters 441p and 441y are used instead of differential circuits 431p and 431y, respectively.

Low-pass filters block frequency components of 10 Hz or lower. A position control loop gain of a drive means 418 and a correction optical mechanism 415 is set at "100". When the correction optical mechanism 415 is not driven, amplifiers 559p and 559y are disconnected from compensation circuits 560p and 560y, respectively. When the correction optical mechanism is driven corresponding to command signals 559p and 559y, the amplitude of the amplifiers 559p and 559y are 60 times higher than the amplitude of the command signals 562p and 562y, respectively. At this point, outputs of the amplifiers 559p and 559y are connected to outputs of the compensation circuits 560p and 560y, respectively. Thus, the correction optical mechanism 415 does not work for frequency components of "10/100=0.1 Hz".

In this construction, although the correction optical mechanism 415 is held with strong force by the pitch coil 552p and the yoke coil 552y, the correction optical mechanism 415 does not work for low frequency components such as gravity. Thus, the correction optical mechanism 415 is stably placed at a balance point of the gravity and the springs 551p and 551y. Thus, the correction optical mechanism 415 is not moved by outer force such as vibration or release shock. The frequency band of vibration ranges from 1 Hz to 12 Hz. Thus, the response limit band of the low-pass filters 441p and 441y is 0.1 Hz or higher. In addition, currents that flow in coils against the gravity can be eliminated. Thus, the power consumption can be reduced.

While the image blur prevention system is working, the low-pass filters 441p and 441y are disconnected from the position control loop. Instead, the conventional drive control is performed. While the image blur prevention system is working, the low-pass filters 441p and 441y may be connected to the position control loop. In this case, since the correction optical mechanism 415 does not work for the gravity, the power consumption may be reduced. However, because of the low-pass filters 441p and 441y, the drive means 418 does not work for frequency components of 0.1 Hz or lower. Thus, when the low-pass filters 441p and 441y are connected, the accuracy of the image blur prevention function slightly deteriorates. To solve this problem, only while the image blur prevention system is not working, the low-pass filters 441p and 441y are connected.

According to the thirteenth and fourteenth embodiments, even while the image blur prevention system is not working (the image blur prevention function is turned off), the drive means 418 drives the correction optical mechanism 415. Thus, while the image blur prevention system is not working, since the correction optical mechanism 415 is not moved by outer force (such as vibration or release shock), image deterioration (image blur) can be prevented. In addition, when the camera is carried, if such a drive control is performed, the correction optical mechanism 415 can be prevented from moving.

According to the fourteenth and fifteenth embodiments, while the image blur prevention system is not working, the correction optical mechanism 415 is driven by the drive means 418 with low-pass filters included in a closed loop, currents that flow in coils that support the correction optical mechanism 415 against gravity can be eliminated. Thus, the power consumption can be remarkably reduced.

As described above, according to the thirteen and fourteenth embodiments, the image blur prevention operation that relatively displaces the correction optical mechanism against the lens barrel is performed corresponding to an output of the vibration detection output. While the image blur prevention function is not working, with the control means, the correction optical system can be prevented from moving by outer force such as vibration or release shock.

Thus, while the image blur prevention function is not working, since the correction optical mechanism does not move due to outer force, image deterioration can be prevented.

According to the present invention, as the vibration detection means, an angular velocity sensor or another sensor (such as angular displacement sensor, acceleration sensor, angular acceleration sensor, or area sensor) may be used as well as vibration gyro.

In the above-described embodiments, as movable optical unit, an optical member is moved on a plane substantially perpendicular to an optical axis so as to deflect a light beam. However, the present invention is not limited to such a construction. Rather, as a movable optical unit, a prism with a variable vertical angle may be used.

The present invention may be applied to photographic apparatuses (such as still cameras and video cameras) and optical apparatuses (such as lens systems attached to photographic apparatuses and binoculars).

Optical units as the image blur detection means and image blur prevention means may be divided into a plurality of units such as a camera and a lens attachable thereto.

In addition, according to the present invention, while the orientation of the movable optical apparatus is fixed, the apparatus may be used for varying a field direction or vibrating a movable optical unit so as to take photos with special effects.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical apparatus comprising:
   position detection means for detecting a position of a movable optical unit;
   matching means for removing a deviation between a mechanical initial position of the optical unit and a center position determined by said position detection means from an output of said position detection means so as to substantially match the mechanical initial position of the optical unit with the center position;
   varying means for varying offset characteristics of said matching means; and
   wherein said matching means includes a high-pass filter connected to the output of said position detection means and, wherein said varying means includes means for varying a value of a time constant of the high-pass filter.

2. An optical apparatus according to claim 1, wherein said varying means includes means for varying the value of the time constant when a status of the optical unit varies.

3. An optical apparatus according to claim 2, wherein said varying means includes means for decreasing the value of the time constant when an operation of the optical unit is started or stopped.

4. An optical apparatus according to claim 3, wherein said varying means includes means for restoring a decreased value of the time constant to an original value after a predetermined time period has elapsed.

5. An image blur prevention apparatus, comprising:
   a movable member that is movable for effecting an image blur prevention operation;
   displacement state detection means for detecting a displacement state of said movable member;
   a driving device that drives said movable member in accordance with a fluctuation signal corresponding to fluctuation that causes image blur, said driving device comprising means for performing a driving control operation of said movable member in accordance with an output signal of said displacement state detection means; and
   an adjusting portion that adjusts a fiducial position at which said driving device positions said movable member when a value of the fluctuation signal indicates that a substantial fluctuation is not present, said adjusting portion comprising means for substantially matching a detection standard position of said displacement state detection means, as a center position of a range of movement of said movable member, with the fiducial position, said adjusting portion further comprising means for adjusting said displacement state detection means so as to output a signal indicating that said movable member is positioned at the detection standard position when said movable member is at the fiducial position, means for correcting the output signal of said displacement state detection means according to a predetermined state, a high pass filter connected to an output of said displacement state detection means and means for changing a time constant of said high pass filter.

6. The apparatus of claim 5, wherein said adjusting portion comprises means for decreasing the time constant when an image blur prevention operation is started or stopped.

7. An image blur prevention apparatus, comprising:
a movable member that is movable for effecting an image blur prevention operation;
an urging portion that applies an urging force to said movable member;
a driving device that drives said movable member;
a driving control portion that generates a driving signal for driving said driving device, the driving signal including a fluctuation signal component corresponding to a fluctuation state for driving said driving device in accordance with said fluctuation signal and, in the case that no fluctuation is generated, the driving signal having a nominal signal component for driving said driving device to drive said movable member to a predetermined fiducial position; and
an adjusting portion that varies a signal generating characteristic of said driving control portion so as to adjust a relative relation between an initial position, at which said movable member is positioned by the effect of the urging force of said urging portion when said driving device is not driving said movable member, and the fiducial position.

8. An apparatus according to claim 7, wherein said fluctuation state is a fluctuation state of said apparatus.

9. An apparatus according to claim 8, wherein said adjusting portion includes means for adjusting the relative relation between said fiducial position, at which said driving device positions said movable member, and said initial position, when a value of said fluctuation signal indicates that a substantial fluctuation is not present.

10. An apparatus according to claim 7, wherein said urging portion includes an elastic member.

11. An apparatus according to claim 7, wherein said adjusting portion includes means for adjusting said relative relation by changing said initial position.

12. An apparatus according to claim 7, wherein said adjusting portion includes means for adjusting said relative relation by changing said fiducial position.

13. An apparatus according to claim 7, wherein said movable member includes an optical member.

14. An image blur prevention apparatus, comprising:
a movable member that is movable for effecting an image blur prevention operation;
a support portion that supports said movable member for movement, said support portion comprising an urging portion that applies an urging force to said movable member to bias said movable member toward an initial position;
a driving device that drives said movable member to effect an image blur prevention operation; and
an adjusting portion that mechanically adjusts said support portion so as to adjust the initial position toward which said movable member is biased by the urging force of said urging portion, said adjusting portion comprising a first member, a second member and an adjustable retainer, said retainer maintaining a positional relationship between the first member and the second member, the positional relationship being mechanically adjustable.

15. An apparatus according to claim 14, wherein said driving device includes means for driving said movable member in accordance with a fluctuation signal corresponding to a fluctuation state of said apparatus.

16. An apparatus according to claim 15, wherein said adjusting portion adjusts said initial position relative to a fiducial position, at which said driving device positions said movable member when a value of said fluctuation signal indicates that a substantial fluctuation is not present.

17. An apparatus according to claim 14, wherein said driving device drives said movable member against the urging force of said urging portion.

18. An apparatus according to claim 14, wherein said urging portion includes an elastic member.

19. An apparatus according to claim 14, wherein said adjusting portion adjusts said initial position along a direction in which said driving device drives said movable member.

20. An apparatus according to claim 14, wherein said movable member includes an optical member.

21. An image blur prevention apparatus, comprising:
a movable member that is movable for effecting an image blur prevention operation;
a position detection device that detects a position of said movable member;
a driving device that drives said movable member in accordance with at least an output of said position detection device corresponding to the position detected by said position detection device; and
an adjusting portion that adjustably sets a position of at least a part of said position detection device.

22. An apparatus according to claim 21, wherein said position detection device includes means for detecting a displacement of said movable member in a predetermined direction, and said adjusting portion includes means for adjusting the position of said part of said position detection device in the predetermined direction.

23. An apparatus according to claim 22, wherein said driving device includes a driving portion that drives said movable member in the predetermined direction.

24. An apparatus according to claim 21, wherein said position detection device includes a detection portion and a detected portion, and a correlative positional relationship between the detection portion and the detected portion changes in accordance with a displacement of said movable member detected by said detecting means.

25. An apparatus according to claim 24, wherein said adjusting portion includes means for adjusting a position of said detection portion.

26. An apparatus according to claim 24, wherein said adjusting portion includes means for adjusting a position of said detected portion.

27. An apparatus according to claim 24, wherein said detection portion includes a light receiving element, and a light receiving state of said light receiving element changes in accordance with movement of said movable member.

28. An apparatus according to claim 21, wherein said adjusting portion includes a moving area for effecting a movement of said part of said detection device and means for maintaining said part of said detection device in a fixed state at a position in said moving area.

29. An apparatus according to claim 21, wherein said adjusting portion includes means for displacing said part of said detection device relative to said movable member and, during normal operation, said part of said detection device moves integrally with said movable member.

30. An apparatus according to claim 21, wherein said adjusting portion includes means for displacing said part of said detection device relative to an apparatus body and, during normal operation, said part of said detection device moves integrally with said apparatus body.

* * * * *

UNITED STATES PATENT AND TRADEMARK OFFICE
CERTIFICATE OF CORRECTION

PATENT NO. : 6,047,133
DATED : April 4, 2000
INVENTOR(S) : KOICHI WASHISU, ET AL.   Page 1 of 2

It is certified that error appears in the above-identified patent and that said Letters Patent is hereby corrected as shown below:

Column 3

Line 53, "the.pitch" should read --the pitch--.

Column 8

Line 3, "abovementiond" should read --above-mentioned--.

Column 11

Line 18, "lip" should read --11p--.
Line 20, "lip" should read --11p--.
Line 29, "lip" should read --11p--.
Line 57, "lip" should read --11p--.

UNITED STATES PATENT AND TRADEMARK OFFICE
CERTIFICATE OF CORRECTION

PATENT NO. : 6,047,133
DATED : April 4, 2000
INVENTOR(S) : KOICHI WASHISU, ET AL.

Page 2 of 2

It is certified that error appears in the above-identified patent and that said Letters Patent is hereby corrected as shown below:

Column 24

Line 12, "this." should read --this--.

Column 27

Line 47, "form" should read --from--.

Column 33

Line 40, "switch" should read --switched--.

Signed and Sealed this

Third Day of April, 2001

Attest:

NICHOLAS P. GODICI

Attesting Officer

Acting Director of the United States Patent and Trademark Office